United States Patent
Adachi et al.

(10) Patent No.: US 12,275,648 B2
(45) Date of Patent: *Apr. 15, 2025

(54) NEAR-INFRARED ABSORBING PARTICLES, METHOD FOR PRODUCING NEAR-INFRARED ABSORBING PARTICLES, NEAR-INFRARED ABSORBING PARTICLE DISPERSION BODY, NEAR-INFRARED ABSORBING LAMINATE, AND NEAR-INFRARED ABSORBING TRANSPARENT BASE MATERIAL

(71) Applicant: SUMITOMO METAL MINING CO., LTD., Tokyo (JP)

(72) Inventors: Kenji Adachi, Chiba (JP); Masao Wakabayashi, Chiba (JP); Satoshi Yoshio, Ehime (JP); Hirofumi Tsunematsu, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 18/248,583
(22) PCT Filed: Oct. 13, 2021
(86) PCT No.: PCT/JP2021/037923
§ 371 (c)(1),
(2) Date: Apr. 11, 2023
(87) PCT Pub. No.: WO2022/080420
PCT Pub. Date: Apr. 21, 2022

(65) Prior Publication Data
US 2023/0382759 A1 Nov. 30, 2023

(30) Foreign Application Priority Data
Oct. 14, 2020 (JP) .................................. 2020-173574

(51) Int. Cl.
*C01G 41/00* (2006.01)
*C09C 1/00* (2006.01)
(Continued)

(52) U.S. Cl.
CPC .............. *C01G 41/006* (2013.01); *C09C 1/00* (2013.01); *C09C 3/063* (2013.01); *C09D 5/32* (2013.01);
(Continued)

(58) Field of Classification Search
None
See application file for complete search history.

(56) References Cited

U.S. PATENT DOCUMENTS

| 2006/0178254 | A1 | 8/2006 | Takeda et al. |
| 2015/0030802 | A1* | 1/2015 | Chen ................... G02B 5/208 428/432 |

(Continued)

FOREIGN PATENT DOCUMENTS

| CN | 105016392 | 11/2015 |
| CN | 109761282 | 5/2019 |

(Continued)

OTHER PUBLICATIONS

K. Machida, M. Okada, and K. Adachi, "Excitations of free and localized electrons at nearby energies in reduced cesium tungsten bronze nanocrystals," Journal of Applied Physics, vol. 125, 103103 (Mar. 12, 2019).

(Continued)

*Primary Examiner* — Kim S. Horger
(74) *Attorney, Agent, or Firm* — IPUSA, PLLC

(57) ABSTRACT

Near-infrared absorbing particles that includes a cesium tungstate is provided. In the near-infrared absorbing particles, the cesium tungstate has a pseudo hexagonal crystal structure modulated to one or more crystal structures selected from orthorhombic crystal, rhombohedral crystal, and cubic crystal. The cesium tungstate is represented by a general formula $Cs_xW_yO_z$, and has a composition within a region surrounded by four straight lines of $x=0.6y$, $z=2.5y$, (Continued)

y=5x, and $Cs_2O:WO_3$=m:n (m and n are integers) in a ternary composition diagram with Cs, W, and O at each vertex.

18 Claims, 14 Drawing Sheets

(51) Int. Cl.
    *C09C 3/06*     (2006.01)
    *C09D 5/32*     (2006.01)
    *C09D 7/40*     (2018.01)
    *C09D 7/62*     (2018.01)
    *G02B 5/20*     (2006.01)
    *C08K 3/22*     (2006.01)

(52) U.S. Cl.
CPC .................. *C09D 7/62* (2018.01); *C09D 7/67* (2018.01); *C09D 7/68* (2018.01); *G02B 5/206* (2013.01); *G02B 5/208* (2013.01); *C01P 2002/52* (2013.01); *C01P 2002/72* (2013.01); *C01P 2002/76* (2013.01); *C01P 2002/84* (2013.01); *C01P 2004/04* (2013.01); *C01P 2004/62* (2013.01); *C01P 2004/64* (2013.01); *C01P 2004/80* (2013.01); *C01P 2006/62* (2013.01); *C01P 2006/63* (2013.01); *C01P 2006/64* (2013.01); *C08K 2003/2258* (2013.01); *C08K 2201/005* (2013.01); *C08K 2201/011* (2013.01)

(56) References Cited

U.S. PATENT DOCUMENTS

| | | | |
|---|---|---|---|
| 2015/0153478 A1* | 6/2015 | Takeda | H01B 1/20 427/126.3 |
| 2019/0077676 A1 | 3/2019 | Nakayama et al. | |
| 2019/0161361 A1 | 5/2019 | Tsunematsu et al. | |
| 2019/0225503 A1 | 7/2019 | Okada et al. | |
| 2020/0170150 A1* | 5/2020 | Okada | C08L 101/12 |
| 2020/0198984 A1 | 6/2020 | Okada et al. | |
| 2021/0087070 A1* | 3/2021 | Nakayama | G02B 5/223 |
| 2023/0052771 A1 | 2/2023 | Adachi et al. | |

FOREIGN PATENT DOCUMENTS

| | | |
|---|---|---|
| EP | 3431565 | 1/2019 |
| EP | 3757632 | 12/2020 |
| JP | H09-107815 | 4/1997 |
| JP | 2003-029314 | 1/2003 |
| JP | 2013-173642 | 9/2013 |
| JP | 2016-083903 | 5/2016 |
| JP | 2019-142762 | 8/2019 |
| JP | 6743226 | 8/2020 |
| KR | 10-2011-0136274 | 12/2011 |
| KR | 10-1182194 | 9/2012 |
| WO | 2005/037932 | 4/2005 |
| WO | 2017/159791 | 9/2017 |
| WO | 2017/161423 | 9/2017 |
| WO | 2019/031246 | 2/2019 |
| WO | WO-2019031243 A1 * | 2/2019 ............. B32B 27/18 |
| WO | WO-2019155996 A1 * | 8/2019 ............. C01G 41/00 |
| WO | 2021/153692 | 8/2021 |

OTHER PUBLICATIONS

S. Yoshio and K. Adachi, "Polarons in reduced cesium tungsten bronzes studied using the DFT + U method," Materials Research Express, vol. 6, 026548, 1-14 (2019).
S. F. Solodovnikov, N.V. Ivannikova, Z.A. Solodovnikova, E.S. Zolotova, "Synthesis and X-ray diffraction study of potassium, rubidium, and cesium polytungstates with defect pyrochlore and hexagonal tungsten bronze structures," Inorganic Materials, vol. 34, No. 8, 845-853 (1998).
S. Nakakura, A. F. Arif, K. Machida, K. Adachi, T. Ogi, "Cationic Defect Engineering for Controlling the Infrared Absorption of Hexagonal Cesium Tungsten Bronze Nanoparticles", Inorganic Chemistry, 58, 9101-9107 (2019).
International Search Report mailed on Nov. 30, 2021 with respect to PCT/JP2021/037923.
Jing-Xiao Liu et al., "Materials Characterization", 2013, 84, pp. 182-187, fig. 1, table 1, Results and Discussion.
Qiming Zhong et al., "Thin Solid Films", 1991, 205, pp. 85-88, fig. 1-4, tables 1-2.
International Search Report mailed on Mar. 16, 2021 with respect to PCT/JP2020/048402.
Extended European Search Report mailed on May 23, 2023 with respect to the corresponding European patent application No. 20906352.8.
Kumagai N et al: "Thermodynamics and kinetics of electrochemical intercalation of Lithium into Li0.50WO3.25 with a hexagonal tungsten bronze structure", Solid State Ionics, col. 98, No. 3-4, 1997, pp. 159-166, XP004126142.
Wagata Hajime et al: "Fabrication of Combined One-Dimensional and Three-Dimensional Structure of Potassium Tungstate Crystal Layers by Spray Deposition with Polystyrene Colloidal Crystal Templates", Crystal Growth & Design, vol. 13, 2013, pp. 3294-3298, XP055945310.
International Search Report issued for related International Patent Application No. PCT/JP2021/003100 on Apr. 20, 2021.
Extended European Search Report mailed on Nov. 16, 2023 issued with respect to the corresponding European patent application No. 21747227.3.
Zeng Xianzhe et al: "The preparation of a high performance near-infrared shielding Cs x WO 3 / SiO 2 composite resin coating and research on its optical stability under ultraviolet illumination", Journal of Materials Chemistry C, vol. 3, No. 31, Jan. 1, 2015 (Jan. 1, 2015), pp. 8050-8060, XP055774005, GB ISSN: 2050-7526, DOI: 10.1039/C5TC01411E, Retrieved from the Internet: URL: <https://pubs.rsc.org/en/content/articlepdf/2015/tc/c5tc01411e>.
K. Adachi and T. Asahi, "Activation of plasmons and polarons in solar control cesium tungsten bronze and reduced tungsten oxide nanoparticles," Journal of Material Research, vol. 27, 965-970 (Mar. 28, 2012).
M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, vol. 102, 5386-5400 (2019).
S. Yoshio, M. Okada, K. Adachi, "Destabilization of Pseudo Jahn-Teller Distortion in Cesium-doped hexagonal tungsten bronzes", J. Appl. Phys., vol. 124, 063109-1-8 (Aug. 14, 2018).
International Search Report issued for related International Patent Application No. PCT/JP2021/003098 on Apr. 6, 2021.
Yamada, H. et al., "Lithium insertion to ReO3-type metastable phase in the Nb2O5-WO3 system", Solid State Ionics, 2001, 140, 249-255 entire text.
Yoshio, S. et. al., "Cesium polytungstates with blue-tint-tunable near-infrared absorption", RSC Advances, Mar. 11, 2020, 10, 10491-10501. abstract, II Experimental, III Results and discussion.
Informal Comments filed on Aug. 27, 2021 in response to the Written Opinion of the International Searching Authority with respect to PCT/JP2021/003098.
Nakamura Keisuke et al: "Monolayered Nanodots of Transition Metal Oxides", Journal of the American Chemical Society, vol. 135, No. 11, Mar. 7, 2013 (Mar. 7, 2013), pp. 4501-4508, XP093059376, ISSN: 0002-7863, DOI: 10.1021/ja400443a, Retrieved from the Internet: URL: https://pubs.acs.org/doi/pdf/10.1021/ja400443a, *p. 4501-p. 4505; figures*.
Miyauchi Masahiro et al: "Tungstate nanosheet ink as a photonless and electroless chromic device", Journal of Materials Chemistry C, vol. 2, No. 19, Jan. 1, 14 (Jan. 1, 2014), pp. 3732-3737, XP093059338, GB, ISSN: 2050-7526, DOI: 10.1039/C3TC32513J, Retrieved from the Internet: URL: https://pubs.rsc.org/en/content/articlepdf/2014/tc/c3tc32513j> *p. 3732-p. 3736; figures*.

(56) References Cited

OTHER PUBLICATIONS

Da Silva K. Pereira et al: "Vibrational properties of Cs 4 W 11 O 35 and Rb 4 W 11 O 35 systems: high pressure and polarized Raman spectra: Vibrational properties of Cs 4 W 11 O 35 and Rb 4 W 11 O 35 systems", Journal of Raman Spectroscopy, vol. 42, No. 3, Mar. 1, 2011 (Mar. 1, 2011), pp. 474-481, XP093059362, GB, ISSN: 0377-0486, DOI: 10.1002/jrs.2737, Retrieved from the Internet: URL: https://api.wiley.com/onlinelibrary/tdm/v1/articles/10.1002%2Fjrs.2737> *p. 474-p. 481; figures*.

Pereira Da Silva K. et al: "Temperature-dependent Raman scattering study on Cs4W11O35 and Rb4W11O35 systems", Journal of Solid State Chemistry, vol. 199, Mar. 1, 2013 (Mar. 1, 2013), pp. 7-14, XP093059369, US, ISSN: 0022-4596, DOI: 10.1016/j.jssc.2012.09.021, Retrieved from the Internet: URL: https://pdf.cciencedirectassets.com/272605/1-s2.0-S0022459612X0015X/1-s2.0-S0022459612006160/main.pdf?X-Amz-Security-Token=IQoJb3JpZ21uX2VjECYaCXVzLWVhc3QtMSJHMEUCIQD8sEUrJFePiCjJXZuM88qE4MAdLgJkSvyWXEQQO.

* cited by examiner

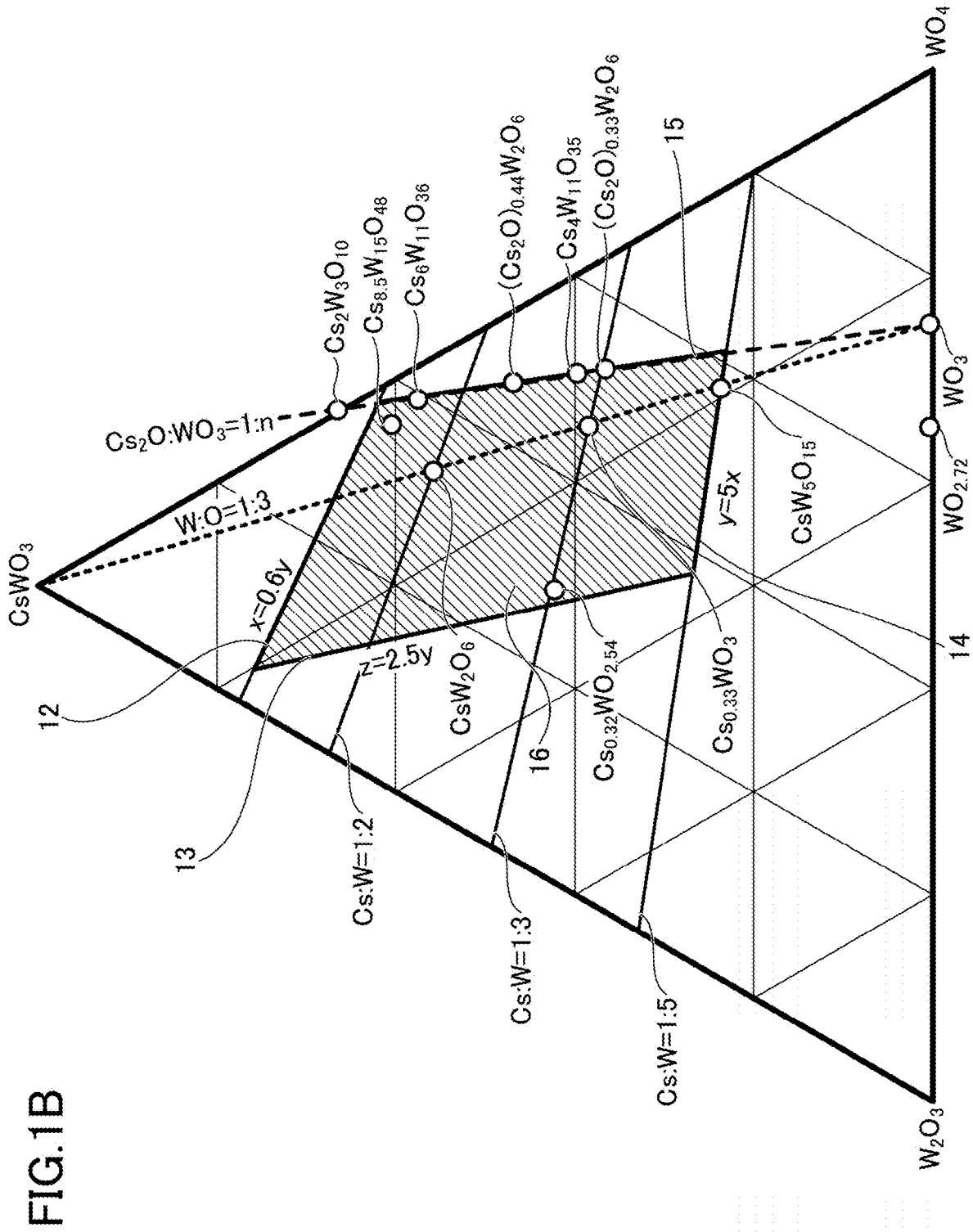

NEAR-INFRARED ABSORBING PARTICLES, METHOD FOR PRODUCING NEAR-INFRARED ABSORBING PARTICLES, NEAR-INFRARED ABSORBING PARTICLE DISPERSION BODY, NEAR-INFRARED ABSORBING LAMINATE, AND NEAR-INFRARED ABSORBING TRANSPARENT BASE MATERIAL

TECHNICAL FIELD

The present invention relates to near-infrared absorbing particles, a method for producing near-infrared absorbing particles, a near-infrared absorbing particle dispersion body, a near-infrared absorbing laminate, and a near-infrared absorbing transparent base material.

BACKGROUND ART

The Rikagaku Jiten 5th edition describes the definition that "electromagnetic waves with wavelengths in the range of approximately 1 nm to 1 mm are called light". These wavelength ranges include the visible light region and the infrared region.

Near-infrared light contained in sunlight penetrates window materials and the like, and enters the room, raising the surface temperature of the interior walls and floors, which also raises the indoor temperature. Conventionally, in order to make the indoor thermal environment comfortable, a light shielding member is used as a window material and the like to block near-infrared light entering through a window, thereby preventing the indoor temperature from rising.

As the light shielding member used for the window material and the like, PTL 1 proposes a light shielding film containing black fine powder containing inorganic pigments such as carbon black and titanium black, and organic pigments such as aniline black.

PTL 2 discloses a thermal insulation sheet in which a strip film having infrared reflectivity and a strip film having infrared absorption are woven as warp or weft, respectively. It also describes a strip film having infrared reflectivity, which is obtained by subjecting a synthetic resin film to aluminum vapor deposition process and then laminating with a synthetic resin film.

In PTL 3, the applicant proposed an infrared shielding material fine particle dispersion body in which infrared material fine particles are dispersed in a medium. The infrared material fine particles contain tungsten oxide fine particles or/and composite tungsten oxide fine particles. The particle diameter of the infrared material fine particles is 1 nm or more and 800 nm or less.

CITATION LIST

Patent Literature

[PTL 1] Japanese Laid-Open Patent Publication No. 2003-029314
[PTL 2] Japanese Laid-Open Patent Publication No. H9-107815
[PTL 3] WO 2005/037932

Non-Patent Literature

[NPL 1] K. Machida, M. Okada, and K. Adachi, "Excitations of free and localized electrons at nearby energies in reduced cesium tungsten bronze nanocrystals", Journal of Applied Physics, Vol. 125, 103103 (2019)
[NPL 2] S. Yoshio and K. Adachi, "Polarons in reduced cesium tungsten bronzes studied using the DFT+U method", Materials Research Express, Vol. 6, 026548 (2019)
[NPL 3] S. F. Solodovnikov, N. V. Ivannikova, Z. A. Solodovnikova, E. S. Zolotova, "Synthesis and X-ray diffraction study of potassium, rubidium, and cesium polytungstates with defect pyrochlore and hexagonal tungsten bronze structures", Inorganic Materials, Vol. 34, 845-853 (1998)
[NPL 4] S. Nakakura, A. F. Arif, K. Machida, K. Adachi, T. Ogi, Cationic defect engineering for controlling the infrared absorption of hexagonal cesium tungsten bronze nanoparticles, Inorg. Chem., 58, 9101-9107 (2019)

SUMMARY OF INVENTION

Technical Problem

In the above PTL 3, tungsten oxide fine particles or/and composite tungsten oxide fine particles are disclosed as the infrared shielding material fine particles. Transmission films in which these tungsten oxides are dispersed are accompanied by blue coloration, and the degree of blue color becomes stronger as the amount added increases.

However, in recent years, for example, in applications such as automotive glass and photothermal conversion materials, there is a demand for a neutral color that does not have blue or other coloring in the transmission color while increasing the near-infrared absorbing rate, that is, decreasing the solar transmittance.

If a blue material such as the transmission films in which the tungsten oxides are dispersed is used as a base, the hue obtained when the glass is toned with various pigments or dyes is limited. In particular, it is difficult to obtain a yellow transmission color, which is a complementary color.

In addition, a pure white color is required for photothermal conversion materials, specifically, for applications such as bonding transparent resin members by photothermal conversion, for example. However, it is difficult to develop the pure white color with materials such as the tungsten oxides described above.

In the case of a transmission film in which the composite tungsten oxide is dispersed, for example, when the transmission color is neutral, that is, a transparent color tone, its application can be widened. However, there have been no previous reports on composite tungsten oxides that, when used as a dispersion body, can achieve neutral colors while decreasing the solar transmittance.

In addition, various types of sensors are being used in automobiles, which are an industrially important application. Examples of the sensors include a rain sensor that detects rain, a light sensor that detects sunset, and an Orbis sensor, which is a record detection sensor in traffic networks. For this reason, windows for automobiles are required to transmit near-infrared light in specific wavelength bands in order to transmit sensor information.

Sensing infrared light used by the above sensors is near-infrared light with wavelengths close to red around 800 nm to 900 nm. Windows for automobiles are required to transmit the sensing infrared light, which is contrary to the solar shielding function of shielding near-infrared light whose wavelengths are adjacent to the infrared light.

When noble metal fine particles or compound fine particles such as $LaB_6$, which are conventionally known for shielding films, are used, the absorption wavelength overlaps with the visible light range, so the transmittance of the sensing infrared light used by the above sensors is very low. In addition, in the case of near-infrared absorbing fine particles such as ATO and ITO, because the absorption wavelength of near-infrared light is too long, there is a problem that the solar shielding function is too low even when the transmittance of the sensor wavelength is satisfied.

Therefore, according to one aspect of the present invention, it is an object to provide novel near-infrared absorbing particles that have a more neutral tone of transmission color while decreasing the solar transmittance and can also ensure the transmission of the sensor wavelength.

Solution to Problem

One aspect of the present invention provides: near-infrared absorbing particles including: a cesium tungstate, wherein the cesium tungstate has a pseudo hexagonal crystal structure modulated to one or more crystal structures selected from orthorhombic crystal, rhombohedral crystal, and cubic crystal, and the cesium tungstate is represented by a general formula $Cs_xW_yO_z$, and has a composition within a region surrounded by four straight lines of x=0.6y, z=2.5y, y=5x, and $Cs_2O:WO_3$=m:n (m and n are integers) in a ternary composition diagram with Cs, W, and O at each vertex.

Advantageous Effects of Invention

According to one aspect of the present invention, novel near-infrared absorbing particles that have a more neutral tone of transmission color while decreasing the solar transmittance and can also ensure the transmission of the sensor wavelength, can be provided.

BRIEF DESCRIPTION OF THE DRAWINGS

FIG. 1B is an enlarged view of a portion of the Cs—W—O composition diagram with Cs, W, and O as vertices;

DESCRIPTION OF EMBODIMENTS

Figure 1A:
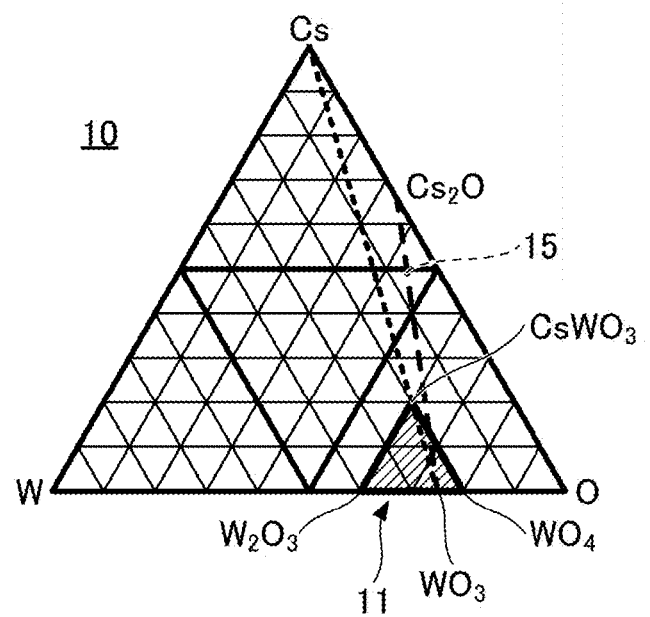
FIG. 1A is a Cs—W—O composition diagram with Cs, W, and O as vertices.

Hereinafter, the embodiments for carrying out the present invention will be described with reference to the drawings, but the present invention is not limited to the following embodiments, and various modifications and replacements can be made to the following embodiments without departing from the scope of the present invention.

[Near-Infrared Absorbing Particles]

The near-infrared absorbing particles of the present embodiment are near-infrared absorbing particles including a cesium tungstate. The near-infrared absorbing particles of the present embodiment can also be near-infrared absorbing particles composed of the cesium tungstate. However, even in this case, the inclusion of unavoidable impurities is not excluded.

(1) Cesium Tungstate

The cesium tungstate (cesium polytungstate) included in the near-infrared absorbing particles of the present embodiment may have a pseudo hexagonal crystal structure modulated to one or more crystal structures selected from orthorhombic crystal, rhombohedral crystal, and cubic crystal. Specifically, the cesium tungstate may have a pseudo hexagonal crystal structure, which is a partially modified hexagonal alkaline tungsten bronze structure and is modified to one or more crystal structures selected from the orthorhombic crystal, the rhombohedral crystal, and the cubic crystal.

The transmission color and light absorption of cesium-doped hexagonal tungsten bronze particles used as near-infrared absorbing particles are conventionally defined by the dielectric function imaginary part ($\varepsilon_2$) and the band structure.

In the energy region of visible light (1.6 eV to 3.3 eV), the band gap of cesium-doped hexagonal tungsten bronze (hereinafter also referred to as Cs-HTB) is sufficiently large, and light absorption in the visible light region is basically reduced. In addition, because electron transitions between d-d orbitals of tungsten and between p-p orbitals of oxygen are prohibited by the Fermi golden rule, the probability of electron transitions decreases. Due to these two actions, $\varepsilon_2$ takes a small value at wavelengths in the visible light region. Because $\varepsilon_2$ represents the absorption of photons by electrons, a small $\varepsilon_2$ at wavelengths in the visible light region means visible light transmission. However, it has recently been clarified that in the vicinity of the blue wavelength, which is the shortest wavelength in the visible light region, there is absorption due to band edge transitions, and in the vicinity of the red wavelength, which is the longest wavelength, there is localized surface plasmon resonance (LSPR)

absorption and polaronic electronic transition absorption (NPL 1). For this reason, in each of the wavelengths, light transmission is limited.

As described above, because the Cs-HTB has a sufficiently large band gap, the band edge transition is higher than the energy of blue wavelength light, resulting in blue transmission. Conversely, on the red wavelength side, the Cs-HTB has strong LSPR absorption and polaronic absorption due to the large number of conduction electrons, and its absorption base extends to the red wavelength, resulting in low red transmission. Therefore, the transmission color of the Cs-HTB nanoparticle dispersion film looks blue due to the balance between the two colors.

In other words, in order to neutralize the blue transmission color of the Cs-HTB, the absorption on the blue side needs to be increased and the transmission on the red side needs to be increased.

Increasing the blue side absorption of the Cs-HTB may be achieved, for example, by shifting the absorption position of the band edge transition to the lower energy side. Shifting the absorption position of the band edge transition to the lower energy side corresponds to narrowing the band gap of the Cs-HTB. Therefore, it may be achieved by selecting a material with a slightly smaller band gap.

Decreasing the red side absorption of the Cs-HTB may be achieved by reducing the concentration of surface plasmon resonance electrons or the concentration of polaron bound electrons.

Based on the above considerations, the inventors of the present invention have investigated various cesium tungsten oxides, which are oxides containing cesium (Cs) and tungsten (W), and improved the materials while performing band structure calculations based on first-principles calculations in combination. As a result, the inventors of the present invention found that when the cesium tungsten oxide has a pseudo hexagonal structure in which the conventional hexagonal crystal structure is modulated to the orthorhombic crystal, the rhombohedral crystal, or the cubic crystal, due to changes in the microstructure, the band structure changes, and the amount of free electrons or bound electrons changes, resulting in a color change.

Here, "the pseudo hexagonal crystal structure modulated to one or more crystal structures selected from the orthorhombic crystal, the rhombohedral crystal, and the cubic crystal" refers to a pseudo hexagonal crystal in which a hexagonal crystal is modulated by regular or random insertion of Cs-rich planes into the prismatic plane or the basal plane. The Cs-rich plane is synonymous with a plane deficient in W or O. As described below, O, OH, $OH_2$, and $OH_3$ ions may be substituted for the Cs site, and the introduction of these ions to the prismatic plane or the basal plane can promote the modulation to the pseudo hexagonal crystal structure in a similar manner to Cs.

The crystal structures of the orthorhombic crystal, the rhombohedral crystal, and the cubic crystal may be identified, for example, by electron diffraction. For example, the crystal structures may be distinguished by attending to the symmetry of diffraction spots when the c-axis direction is the electron beam incidence direction, that is, when observed with the electron beam incident from the (0001) direction.

In the hexagonal crystal, the diffraction spots of three types of prismatic planes, (10-10), (01-10), and (1-100), appear at the same distance from the incident spot in the reciprocal lattice plane. That is, the hexagonal crystal has the same crystal plane spacing. The same distance described above includes those that can be regarded as the same distance within the error range of electron diffraction spot distance measurement. Therefore, the hexagonal crystal has an electron diffraction pattern that is hexagonally symmetrical, that is, does not change with respect to a 60° rotation.

In the orthorhombic crystal, one type of prismatic plane spot appears closer to the incident spot than the other two types of prismatic plane spots. That is, in the orthorhombic crystal, only one type of the prismatic planes has a long crystal plane spacing.

In the rhombohedral crystal, three types of prismatic plane spots have different crystal plane spacings.

The cubic crystal has the same hexagonal symmetry pattern as the hexagonal crystal, but the cubic symmetry is readily identified by observation from other crystal zone axis directions.

The XRD powder pattern of the pseudo hexagonal crystal is often regarded as a mixed pattern of the orthorhombic crystal and the hexagonal crystal, the rhombohedral crystal and the hexagonal crystal, or the cubic crystal and the hexagonal crystal, but the position and intensity of diffraction peaks of the pseudo hexagonal crystal slightly change due to the insertion of the planar lattice defects described above.

One method for obtaining the pseudo hexagonal crystal structure modulated to one or more crystal structures selected from the orthorhombic crystal, the rhombohedral crystal, and the cubic crystal described above, is to add one or more additive components selected from O, OH, $OH_2$, and $OH_3$. Therefore, it is preferable that the near-infrared absorbing particles of the present embodiment include one or more additive components selected from O, OH, $OH_2$, and $OH_3$.

The one or more additive components selected from O, OH, $OH_2$, and $OH_3$ described above are preferably present in one or more positions selected from a hexagonal window, a hexagonal cavity, and a trigonal cavity in the crystal of the cesium tungstate. The hexagonal window and the hexagonal cavity are positioned in a hexagonal tunnel that penetrates the c-axis of a hexagon formed by six aligned $WO_6$ octahedrons constituting the hexagonal alkaline tungsten bronze structure. The trigonal cavity is positioned in a triangle formed by three aligned $WO_6$ octahedrons.

The hexagonal tunnel has two voids, a large size hexagonal cavity and a hexagonal window. The hexagonal window is the second largest void in the hexagonal crystal after the hexagonal cavity and is surrounded by six oxygens constituting the $WO_6$ octahedron. The top and bottom of the hexagonal window in the c-axis direction are adjacent to the Cs ions placed in the hexagonal cavity. The trigonal cavity is the next largest void after the hexagonal window and penetrates the c-axis direction of the hexagonal crystal. One or more additive components selected from O, OH, $OH_2$, and $OH_3$ may substitute Cs and may enter the hexagonal cavity. When there is a sufficient amount of Cs or a large amount of moisture, the additive components may enter the hexagonal window. In some cases, the additive components may enter the trigonal cavity on the basal plane or the cavity on the prismatic plane in addition to the hexagonal window void, and also substitute Cs. By containing the above additive components, a defective plane is generated on the basal plane or on the prismatic plane, and the crystal structure shifts from the hexagonal crystal to the orthorhombic crystal or to the rhombohedral crystal, and further to the cubic crystal, resulting in narrowing of the band gap and reduction in conduction band electron density. Therefore, the cesium tungstate having the pseudo hexagonal crystal structure can enhance absorption on the blue side and transmission on the red side, and can neutralize the blue transmission color, compared with the Cs-HTB.

In this case, the orthorhombic crystal, the rhombohedral crystal, and the cubic crystal can also be regarded as pseudo hexagonal crystals with atomic arrangements similar to that of the tungsten bronze hexagonal crystal but with a different symmetry from that of the hexagonal crystal. By avoiding rigor and describing in broad strokes, the orthorhombic crystal in this case is the one in which the hexagonal symmetry is broken by the regular or random insertion of W- and O-deficient planes into one of the three prismatic planes of the hexagonal crystal. Therefore, in the orthorhombic crystal, only one prismatic plane has a long plane spacing. Based on this, modulation to the orthorhombic crystal is readily identified by, for example, the (0001) electron diffraction pattern.

The rhombohedral crystal in this case is the one in which the hexagonal symmetry is broken by inserting a plane that accepts excess Cs, that is, a plane deficient in W and O, into the basal plane of the hexagonal crystal and by regularly displacing the c-axis lamination of the basal plane. The excess Cs plane in this case involves expansion perpendicular to the plane along with displacement on the plane, resulting in a change in the prismatic plane spacing and a change in the c-axis lattice constant. Therefore, in the rhombohedral crystal, all three prismatic planes have different plane spacings. Based on this, modulation to the rhombohedral crystal is readily identified by, for example, the (0001) electron diffraction pattern.

Furthermore, when the three axes of the rhombohedron intersect at 90 degrees, it becomes a cubic crystal. The cubic crystal has a pyrochlore structure, and the typical composition thereof includes $CsW_2O_6$.

Therefore, the voids corresponding to the hexagonal window, the hexagonal cavity, and the trigonal cavity described above are still present in the orthorhombic crystal, the rhombohedral crystal, and the cubic crystal. Therefore, the hexagonal window, the hexagonal cavity, and the trigonal cavity in the cesium tungstate contained in the near-infrared absorbing particles of the present embodiment includes the corresponding voids in the orthorhombic crystal, the rhombohedral crystal, and the cubic crystal (the pyrochlore phase).

Hereinafter, configuration examples of the method for producing the near-infrared absorbing particles of the present embodiment will be described, mainly taking the case of the hexagonal window as a site or void that can be substituted or penetrated by O, OH, $OH_2$, and $OH_3$.

One of the methods for obtaining the orthorhombic crystal, the rhombohedral crystal, and the cubic crystal, in which one or more components selected from O, OH, $OH_2$, and $OH_3$ are present in the hexagonal window, is to crystallize in saturated water vapor during crystallization when synthesizing the cesium tungstate. Typically, in the Cs-HTB structure, the ionic radius of Cs is slightly larger than the hexagonal cavity, so Cs is less likely to move. Therefore, once crystallized into a hexagonal crystal, it becomes difficult to diffusely insert oxygen atoms or the like into the hexagonal window by subsequent heat treatment or the like. Therefore, a method is devised in which the atmosphere is filled with saturated water vapor before the cesium tungstate crystallizes, and water molecules or O, OH, and $OH_3$ ions derived from water molecules are inserted into the hexagonal window at the timing of the cesium tungstate crystallization. Therefore, as described later, it is preferable that the method for producing the near-infrared absorbing particles of the present embodiment includes a step of introducing water vapor at a heating temperature near the crystallization of the cesium tungstate and crystallizing the cesium tungstate in an atmosphere containing water vapor. When a dispersion film, which is a near-infrared absorbing particle dispersion body, is prepared using the near-infrared absorbing particles synthesized through the above step and, if necessary, the near-infrared absorbing particles that is further heat-treated in a reducing atmosphere, it is possible to reduce the blueness from the color tone while retaining high transmittance of the visible light and sufficient shielding effect against the near-infrared light. That is, the blue transmission color can be neutralized.

In contrast, once the hexagonal crystal of the cesium tungstate is produced, even when the cesium tungstate is heated in a water vapor atmosphere or held and heated in a high-temperature and high-humidity environment, the effect of neutralizing the transmission color cannot be obtained. This is because an element with a large ionic radius such as Cs inhibits the diffusion of oxygen atoms and the like through the hexagonal tunnel, so that once crystallized into the hexagonal crystal, it is difficult for the oxygen atoms and the like to diffuse into the hexagonal window of the voids by the subsequent heat treatment. Therefore, the heat treatment in water vapor described above needs to be performed at the time of initial crystallization during synthesis.

When it is heated in an atmosphere containing water vapor during crystallization, it is possible to mix a reducing gas such as a hydrogen gas and to perform crystallization in the atmosphere of the reducing gas. In addition, once a crystal is crystallized in the water vapor atmosphere, it is also possible to further heat the crystal at a high temperature of 500° C. or more and 950° C. or less in an atmosphere containing the reducing gas including the hydrogen gas and the like, or in an atmosphere of an inert gas and the like. In either case, the near-infrared absorbing particles with a neutralized transmission color and a large near-infrared absorption effect can be obtained. By setting the temperature to 500° C. or more, the orthorhombic structure and the like that contains the defect is sufficiently aligned to equilibrium atomic positions to enhance the near-infrared absorption effect. In addition, by setting the temperature to 950° C. or less, the speed of crystal structure change can be appropriately maintained, and the crystal state and the electronic state can be readily controlled to be appropriate. When the heating temperature described above is set to above 950° C. and, for example, when the reduction is excessive, lower oxides such as W metal and $WO_2$ may be generated, which is also undesirable from this point of view.

The incorporation of O, OH, $OH_2$, and $OH_3$ during the first crystallization by heating with water vapor leads to the formation of one or more crystals selected from the orthorhombic crystal, the rhombohedral crystal, and the cubic crystal (the pyrochlore phase), which are microscopically modified from the hexagonal crystal. By heating the crystals in atmospheres with different degrees of reduction, one or more various crystal structures selected from the orthorhombic crystal, the rhombohedral crystal, and the cubic crystal with different amounts and distributions of lattice defects is produced.

The cesium tungstate contained in the near-infrared absorbing particles of the present embodiment may have lattice defects of Cs, W, and O. The reason why the lattice defects of Cs, W, and O are introduced into the cesium tungstate is explained below.

In the composition near the hexagonal $Cs_{0.33}WO_3$, crystal stability is determined by the competitiveness of structural stability derived from high crystal symmetry and charge balance stability in which charge transfer between elements produces charge neutrality as a whole. For example, the charge-neutral $2Cs_2O \cdot 11WO_3 = Cs_4W_{11}O_{35}$ is considered to be a thermodynamically stable phase, but when heated in a reducing atmosphere, it easily undergoes a phase change to the hexagonal $Cs_{0.32}WO_{3-y}$ with high crystal symmetry (NPL 2). While $Cs_{0.32}WO_{3-y}$ is a metastable structure with high crystal symmetry, $Cs_4W_{11}O_{35}$ has a charge-balanced stable composition. However, $Cs_4W_{11}O_{35}$ has poor symmetry in the atomic configuration in the crystal, for example, in the model of Solodovnikov (NPL 3), the hexagonal (1, 1, −2, 0) plane (that is, the orthorhombic (010) plane) deficient in W and O at the b/8 pitch of the orthorhombic unit cell, is inserted into the hexagonal arrangement of $WO_6$ octahedron, which is the same as the hexagonal tungsten bronze, and the crystal as a whole is orthorhombic. In other words, the defects of Cs, W, and O were necessarily introduced to locally satisfy both the crystal structure and the charge balance, and have actually been observed recently in TEM and XRD (NPL 4).

In the near-infrared absorbing particles of the present embodiment, O, OH, $OH_2$, and $OH_3$ incorporated into the hexagonal window, the hexagonal cavity, and the trigonal cavity in the orthorhombic crystal, the rhombohedral crystal, and the cubic crystal disturb the local charge balance, and thus the crystal microstructure is further modified. In other words, $H^+$ and $H_3O^+$ are introduced into the crystal in the process of introducing components derived from moisture, but because these ions compete with $Cs^+$ and $W^{6+}$ in the crystal, local charge neutrality is attempted by the deficiency of Cs and W. As a result, lattice defects including the deficiency of Cs and W are introduced. O, OH, $OH_2$, and $OH_3$ may enter the trigonal cavity as well as the hexagonal window. Furthermore, $OH_2$ and $OH_3$ may substitute alkali elements (Cs) in the hexagonal cavity, and when charge-neutral $OH_2$ substitutes, the electron provided by the originally existed alkali ion ($Cs^+$) disappear, so the conduction band electrons of the crystal decrease.

Among the cesium tungstates with the pseudo hexagonal crystal structure modulated to one or more crystal structures selected from the orthorhombic crystal, the rhombohedral crystal, and the cubic crystal as described above, those satisfying the excellent near-infrared absorption effect and the visible light transmittance have a predetermined composition.

Here, FIG. 1A illustrates a ternary composition diagram 10 with Cs—W—O as three vertices. FIG. 1B illustrates an enlarged view of a region 11 with $CsWO_3$, $W_2O_3$, and $WO_4$ as vertices in the ternary composition diagram 10 in FIG. 1A. It should be noted that the diagram is not a phase diagram illustrating the thermodynamic equilibrium phase, but a convenient composition diagram to illustrate the compositional spread of the system. Therefore, $CsWO_3$, $W_2O_3$, $WO_4$, and the like, are the compositions illustrated for convenience, and there is no mention of whether they are actually obtained compounds.

The cesium tungstate contained in the near-infrared absorbing particles of the present embodiment is represented by the general formula $Cs_xW_yO_z$, and preferably has a composition within a region surrounded by four straight lines of x=0.6y, z=2.5y, y=5x, and $Cs_2O:WO_3$=m:n (m and n are integers) in a ternary composition diagram with Cs, W, and O at each vertex. Specifically, the composition within a region 16 surrounded by a straight line 12 satisfying x=0.6y, a straight line 13 satisfying z=2.5y, a straight line 14 satisfying y=5x, and a straight line 15 satisfying $Cs_2O:WO_3$=m:n (m and n are integers) in the ternary composition diagram illustrated in FIGS. 1A and 1B is preferred. The region 16 also includes points on the above straight lines 12 to 15. In addition, the straight line 15, which satisfies $Cs_2O:WO_3$=m:n (m and n are integers), is a straight line connecting $Cs_2O$ and $WO_3$ in the ternary composition diagram 10, as illustrated in FIG. 1A.

In the above ternary composition diagram, when x>0.6y, the cesium tungstate has a crystal structure mainly composed of the tetragonal crystal, and the near-infrared absorption effect disappears. Also, when z<2.5y, the cesium tungstate has a hexagonal-based structure mixed with lower oxides of W, which significantly impairs the near-infrared absorption effect and the visible light transmittance. When y>5x, the cesium tungstate has a crystal structure called intergrowth in which $WO_3$ is mixed in a hexagonal substructure, and the near-infrared absorption effect disappears. Further, on the O-rich side on the right of the straight line 15 where $Cs_2O:WO_3$ is an integer ratio, the near-infrared absorption effect is not obtained at all. Therefore, the cesium tungstate preferably satisfies the aforementioned range.

The cesium tungstate contained in the near-infrared absorbing particles of the present embodiment may have defects in each element of cesium, tungsten, and oxygen, but the atomic ratio (x/y) of cesium to tungsten may be any value in the range of 0.2 or more and 0.6 or less. That is, the near-infrared absorbing particles of the present embodiment have a defect in a part of one or more elements selected from Cs and W that constitute the crystal of the cesium tungstate, and it is preferable that x and y of the general formula $Cs_xW_yO_z$ satisfy the relationship of $0.2 \leq x/y \leq 0.6$.

Because cesium and tungsten supply electrons to the crystal, by setting x/y to 0.2 or more, the near-infrared absorption function can be enhanced. Also, by setting x/y to 0.2 or more, a hexagonal crystal or a crystal structure in which the hexagonal crystal is modulated can be obtained. When x/y is larger than 0.33, Cs ions can no longer fit into the hexagonal cavity and begin to occupy the trigonal cavity as well, and because modulation occurs on the prismatic plane and the basal plane, it gradually changes locally to a laminated structure of the orthorhombic crystal, the rhombohedral crystal, or the cubic pyrochlore. Further, when x/y exceeds 0.6, it changes to a crystal structure of tetragonal $Cs_2W_3O_{10}$, which significantly impairs the visible light transmittance and reduces its usefulness.

The near-infrared absorbing particles of the present embodiment can have defects in at least a part of W of the $WO_6$ octahedron constituting the crystal, with reference to the hexagonal cesium tungsten bronze structure $Cs_{0.33}WO_3$. The W defect is mainly introduced as a planar defect in the hexagonal prismatic plane or the basal plane. Because the plane spacing is increased due to the ion repulsion between the atomic rows on both sides of the defective plane, the crystal symmetry changes from the hexagonal crystal to the orthorhombic crystal, the rhombohedral crystal, or the cubic crystal.

The near-infrared absorbing particles of the present embodiment may have a defect in at least a part of the O of the $WO_6$ octahedron that constitutes the crystal of the cesium tungstate based on the hexagonal alkaline tungsten bronze structure $CsW_3O_9$. The O defect is randomly introduced, and because of the deficiency, localized electrons can be supplied to the system to enhance the near-infrared absorption function. In the known hexagonal tungsten bronze $Cs_{0.32}WO_{3-y}$, it is known that y=0.46 or the deficiency is up to 15% of the total O lattice points of the octahedron (NPL 3). When the amount of defect exceeds 0.5, the crystal becomes unstable and decomposes by forming different phases. In the cesium tungstate $Cs_xW_yO_z$ contained in the near-infrared absorbing particles of the present embodiment, the amount of O defects corresponding to up to $z/y=2.5$ can be included. It should be noted that when excess O, OH, $OH_2$, and $OH_3$ are introduced into voids such as the hexagonal window and the like, the identified value of O obtained by chemical analysis includes these excess elements.

In the cesium tungstate contained in the near-infrared absorbing particles of the present embodiment, a part of Cs may be substituted by an additive element. In this case, it is preferable that the additive element is one or more elements selected from Na, Tl, In, Li, Be, Mg, Ca, Sr, Ba, Al, and Ga.

These additive elements described above are electron-donating and assist in donating electrons to the conduction band of the W—O octahedral framework at the Cs site.

(2) Wet and Heat Resistance of Near-Infrared Absorbing Particles

The near-infrared absorbing particles of the present embodiment exhibit improved wet and heat resistance compared to cesium-added hexagonal tungsten bronze. This effect is a reasonable result considering that some of the near-infrared absorbing particles of the present embodiment contain one or more selected from the orthorhombic crystal, the rhombohedral crystal, and the cubic crystal (the pyrochlore phase) modulated by interstitial substitution of O, OH, $OH_2$, and $OH_3$. That is, the humidity and moisture degradation of the cesium-doped hexagonal tungsten bronze is essentially a substitution reaction of Cs with water molecules, but when both the cavity and the window of the hexagonal tunnel, which is the main diffusion path of oxygen diffusion, are filled with Cs, O, OH, $OH_2$, and $OH_3$, this substitution reaction is significantly slowed down. Therefore, in the near-infrared absorbing particles of the present embodiment, not only the loss of the near-infrared absorption function in a high-humidity environment is prevented, but also the degradation reaction through moisture in the atmosphere is slowed down even in a high-temperature heat resistance test at normal humidity, resulting in the improvement of wet and heat resistance.

(3) Average Particle Diameter of Near-Infrared Absorbing Particles

The average particle diameter of the near-infrared absorbing particles of the present embodiment is not particularly limited, but it is preferable that the average particle diameter is 0.1 nm or more and 200 nm or less. This is because, by setting the average particle diameter of the near-infrared absorbing particles to 200 nm or less, the localized surface plasmon resonance is more prominently expressed, so that the near-infrared absorption characteristics can be particularly enhanced, that is, the solar transmittance can be particularly reduced. In addition, by setting the average particle diameter of the near-infrared absorbing particles to 0.1 nm or more, it is readily manufactured industrially. Also, the particle size is closely related to the color of the dispersion-transmission film, that is, the near-infrared absorbing particle dispersion body, and in the particle size range in which Mie scattering is dominant, the smaller the particle size, the less the scattering at shorter wavelengths in the visible light region. Therefore, increasing the particle size has the effect of decreasing the blue color tone, but when the particle size exceeds 100 nm, the haze of the film due to light scattering becomes non-negligible, and when it exceeds 200 nm, in addition to increasing the haze of the film, the generation of surface plasmon is reduced and the LSPR absorption becomes excessively small.

Here, the average particle diameter of the near-infrared absorbing particles may be obtained from the median size of the multiple near-infrared absorbing particles measured from the transmission electron microscope image and the dispersion particle diameter measured by a particle size measurement device based on the dynamic light scattering method for the dispersion liquid.

It is preferable to further consider the reduction of scattering by the near-infrared absorbing particles when applying to applications where transmittance in the visible light region is particularly important, such as automobile front glass. When the scattering reduction is important, it is particularly preferable that the average particle diameter of the near-infrared absorbing particles is 30 nm or less.

The average particle diameter means the particle size at an integrated value of 50% in the particle size distribution, and the average particle diameter has the same meaning in other parts of the specification. As a measurement method for the particle size distribution for calculating the average particle diameter, direct measurement of the particle size for each particle can be used, for example, by using a transmission electron microscope. In addition, the average particle diameter may also be measured by a particle size measurement device based on the dynamic light scattering method for the dispersion liquid as described above.

(4) Arbitrary Configuration of Near-Infrared Absorbing Particles

The near-infrared absorbing particles may also be surface-treated for surface protection, durability enhancement, antioxidation, water resistance enhancement, and the like. While the specific content of the surface treatment is not particularly limited, for example, in the near-infrared absorbing particles of the present embodiment, the surface of the near-infrared absorbing particles may be coated with a compound containing one or more atoms selected from Si, Ti, Zr, and Al. That is, the near-infrared absorbing particles may have a coating with the above compound. In this case, examples of the compound containing one or more atoms selected from Si, Ti, Zr, and Al include one or more compounds selected from oxides, nitrides, carbides, and the like.

Figure 10:
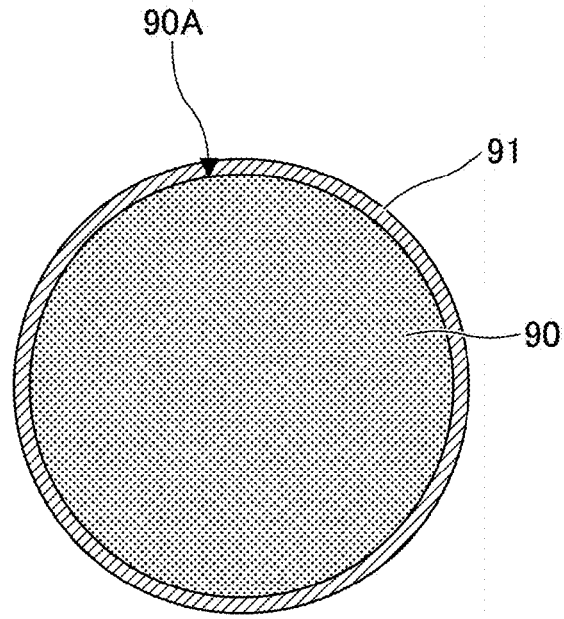
FIG. 10 is a schematic diagram of a near-infrared absorbing particle having a coating.

Specifically, as illustrated schematically in FIG. 10, for example, a near-infrared absorbing particle 90 may also include a coating 91 described above on its surface 90A. FIG. 10 is a cross-sectional view of the near-infrared absorbing particle 90 including the coating 91 in a plane passing through the center of the particle. FIG. 10 illustrates an example in which the coating 91 is uniformly arranged over the entire surface 90A of the near-infrared absorbing particle 90, but the coating 91 may be arranged to cover a part of the surface of the near-infrared absorbing particle 90, for example, it may be scattered. Moreover, the thickness of the coating 91 is not limited to a uniform form, and it may be varied depending on the position.

[Method for Producing Near-Infrared Absorbing Particles]

Next, a configuration example of the method for producing the near-infrared absorbing particles according to the present embodiment will be described. Because the method for producing the near-infrared absorbing particles according to the present embodiment may produce the aforementioned near-infrared absorbing particles, a part of the description will be omitted.

There is no particular limitation on the method for producing the near-infrared absorbing particles, and any method that can produce the near-infrared absorbing particles satisfying the aforementioned characteristics can be used without any particular limitation. An example of the method for producing the near-infrared absorbing particles is described here.

(1) First Heat Treatment Step

The method for producing the near-infrared absorbing particles of the present embodiment may include, for example, the following steps.

The first heat treatment step for heating a compound raw material containing Cs and W in an atmosphere containing water vapor or in an atmosphere containing water vapor and a reducing gas at a temperature of 400° C. or more and 650° C. or less.

In the first heat treatment step, cesium tungstate can be crystallized by heating at a temperature of 400° C. or more and 650° C. or less.

In order to make the cesium tungstate the pseudo hexagonal crystal, it is preferable to contain sufficient water vapor in the atmosphere when the cesium tungstate is crystallized, that is, when the $WO_6$ unit forms a hexagonal crystal with Cs. During this crystallization process, Cs is mainly incorporated into the hexagonal cavity, and water molecules or their decomposition products, $OH_3^+$, $OH^-$ and $O^{2-}$, are mainly incorporated into the hexagonal window. When Cs or water molecules are relatively abundant in the composition, Cs or water molecules and the like are also incorporated into the trigonal cavity.

As the compound raw material containing Cs and W, a mixture of a compound raw material containing Cs and a compound raw material containing W may be used. As the compound raw material containing Cs and W, a material containing Cs and W is sufficient, for example, a mixture of $Cs_2CO_3$ and $WO_3$ and the like may be used.

In the crystallization process of the first heat treatment step, the purpose is to incorporate water molecules, OH, O, and the like into the crystal during crystallization. For this reason, it is preferable not to use cesium tungsten oxide, such as crystalline powder of $nCs_2O \cdot mWO_3$ (n and m are integers, $3.6 \leq m/n \leq 9.0$), which has already formed a hexagonal crystal structure, as the raw material of the compound containing Cs and W. It is also preferable not to use as the raw material of the compound containing Cs and W, such as cesium-tungstate obtained by other methods such as sol-gel method or complex polymerization method, non-equilibrium cesium-tungstate obtained by gas phase synthesis, powder by thermal plasma method or powder by electron beam melting. This is because in the raw material which has already formed a hexagonal frame structure, it becomes difficult for water molecules and the like to be incorporated into the crystal because Cs inhibits the diffusion of oxygen atoms and the like. In other words, it is preferable that the cesium tungstate with a hexagonal crystal structure is not used from the compound raw material containing Cs and W.

The supply of water vapor in the crystallization process of the first heat treatment step is preferably realized by supplying superheated stream into the heating furnace, for example. The superheated stream is high-enthalpy water vapor produced by adding heat to saturated water vapor vaporized at 100° C. to raise the temperature to 100° C. or more, and may be supplied with a carrier gas. When the carrier gas is an inert gas, an atmosphere of near anoxia is formed. The superheated stream may be supplied at a temperature of 400° C. or more, where crystallization is active, but it is preferable to supply it from a sufficiently low temperature before crystallization. A mixture gas of superheated stream and the inert gas or a mixture gas of superheated stream, the inert gas, and a reducing gas such as hydrogen may be supplied. When the reducing gas is mixed, the speed of hexagonal crystal alignment tends to increase. Therefore, the same orthorhombic crystal, rhombohedral crystal, or cubic crystal with different microscopic defect structures may be obtained.

In the first heat treatment step, the cesium tungstate may be heated in an atmosphere that does not contain water vapor, such as an inert atmosphere, before or after crystallization.

The method for producing the near-infrared absorbing particles of the present embodiment may further include optional steps.

(2) Second Heat Treatment Step

The method for producing the near-infrared absorbing particles of the present embodiment may also include a second heat treatment step for heating at a temperature of 500° C. or more and 950° C. or less in an atmosphere containing the reducing gas, after the first heat treatment step.

The second heat treatment step is a step in which, for example, the material powder after the first heat treatment step is reduced by heating at a temperature of 500° C. or more and 950° C. or less. Along with the annealing stabilization of the orthorhombic crystal, the rhombohedral crystal, and the cubic crystal with the defective structures, it is meaningful to remove a part of oxygen of the $WO_6$ octahedron by high temperature reduction. By the reductive removal of the octahedral oxygen, bound electrons are generated in adjacent W atoms, giving structural treatment that enhances the near-infrared absorption properties.

When the heat reduction treatment is performed, it is preferable to perform under a flow of a reducing gas. As the reducing gas, a mixed gas containing a reducing gas such as hydrogen and one or more inert gases selected from nitrogen, argon, and the like, may be used. In addition, mild heating and reducing conditions such as heating in a water vapor atmosphere or in a vacuum atmosphere may also be used in combination.

The second heat treatment step may consist of multiple steps, and after heating in the atmosphere of the above reducing gas, further heating in the atmosphere of inert gas may be performed.

In addition, in the second heat treatment step, when it is not intended to remove part of the oxygen of the $WO_6$ octahedron, heating may be performed in the atmosphere of inert gas instead of the atmosphere containing the reducing gas, in the above temperature range. That is, in the second heat treatment step, it can be heated in the atmosphere containing the reducing gas or in the atmosphere of inert gas at a temperature of 500° C. or more and 950° C. or less.

As mentioned above, the method for producing the near-infrared absorbing particles of the present embodiment is not particularly limited. As the method for producing the near-infrared absorbing particles, various methods that can provide the predetermined structure including the defective microstructure may be used.

As the method for producing the near-infrared absorbing particles, a method for synthesizing tungstate by a solid-phase method, a liquid-phase method, or a gas-phase method in an atmosphere in which water molecules coexist may be used.

(3) Pulverizing Step

As mentioned above, the near-infrared absorbing particles are preferably refined into fine particles. Therefore, the method for producing the near-infrared absorbing particles may include a pulverizing step for pulverizing the powder obtained by the first heat treatment step or the second heat treatment step.

Specific means of pulverizing and refining are not particularly limited, and various means that can mechanically perform pulverization may be used. As the mechanical pulverizing method, a dry pulverizing method using a jet mill or the like may be used. The pulverization may also be mechanically performed in a solvent in the process of obtaining the near-infrared absorbing particle dispersions, which will be described later.

If necessary, sieving or the like may be further performed.

(4) Modification Step

As mentioned above, the near-infrared absorbing particles may have their surfaces modified with the compound containing one or more atoms selected from Si, Ti, Zr, and Al. Therefore, the method for producing the near-infrared absorbing particles may further include a modification step for modifying, for example, the near-infrared absorbing particles with the compound containing one or more atoms selected from Si, Ti, Zr, and Al.

In the modification step, specific conditions for modifying the near-infrared absorbing particles are not particularly limited. For example, it is also possible to have a modification step in which alkoxides and the like containing one or more metals selected from the above metal groups are added to the near-infrared absorbing particles to be modified, and a coating is formed on the surface of the near-infrared absorbing particles.

[Near-Infrared Absorbing Particle Dispersion Liquid]

Next, a configuration example of the near-infrared absorbing particle dispersion liquid of the present embodiment will be described.

Figure 11:
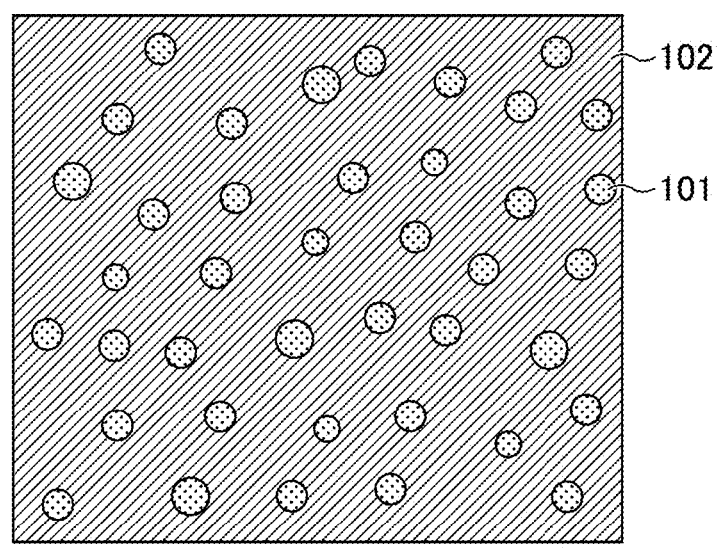
FIG. 11 is a schematic diagram of a near-infrared absorbing particle dispersion liquid.

The near-infrared absorbing particle dispersion liquid of the present embodiment may contain the aforementioned near-infrared absorbing particles and one or more liquid media selected from water, organic solvents, oils and fats, liquid resins, and liquid plasticizers. That is, for example, as illustrated in FIG. 11, a near-infrared absorbing particle dispersion liquid 100 of the present embodiment may contain the aforementioned near-infrared absorbing particles 101 and a liquid medium 102. The near-infrared absorbing particle dispersion liquid preferably has a configuration in which the near-infrared absorbing particles are dispersed in the liquid medium.

FIG. 11 is a schematic diagram and the near-infrared absorbing particle dispersion liquid of the present embodiment is not limited to such a configuration. For example, the near-infrared absorbing particles 101 are described as spherical particles in FIG. 11, but the shape of the near-infrared absorbing particles 101 is not limited to such a configuration and may have any shape. As mentioned above, each of the near-infrared absorbing particles 101 may also have, for example, a coating on its surface. In addition to the near-infrared absorbing particles 101 and the liquid medium 102, the near-infrared absorbing particle dispersion liquid 100 may also contain other additives as needed.

As the liquid medium, one or more liquid media selected from water, organic solvent, oil and fat, liquid resin, and liquid plasticizer may be used, as described above.

As the organic solvent, various solvents such as alcohol-based, ketone-based, hydrocarbon-based, glycol-based, and water-based solvents may be selected. Specifically, one or more solvents selected from the alcohol-based solvents such as isopropyl alcohol, methanol, ethanol, 1-propanol, isopropanol, butanol, pentanol, benzyl alcohol, diacetone alcohol, 1-methoxy-2-propanol, and the like; the ketone-based solvents such as dimethyl ketone, acetone, methyl ethyl ketone, methylpropylketone, methyl isobutyl ketone, cyclohexanone, isophone, and the like; the ester-based solvents such as 3-methyl methoxy-propionate, butyl acetate, and the like; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate, and the like; amides such as formamide, N-methyl formamide, dimethylformamide, dimethyl acetamide, N-methyl-2 pyrrolidone, and the like; aromatic hydrocarbons such as toluene, xylene, and the like; halogenated hydrocarbons such as ethylene chloride, chlorobenzene, and the like; may be used.

Among these, less polar organic solvents are preferred, especially isopropyl alcohol, ethanol, 1-methoxy-2 propanol, dimethyl ketone, methyl ethyl ketone, methyl isobutyl ketone, toluene, propylene glycol monomethyl ether acetate, n-butyl acetate, and the like are preferred. One or more of these organic solvents may be used in combination.

As the oil and fat, for example, one or more kinds selected from dry oils such as linseed oil, sunflower oil, and tung oil, semi-dry oils such as sesame oil, cottonseed oil, rapeseed oil, soybean oil, and rice bran oil, non-dry oils such as olive oil, coconut oil, palm oil, and dehydrated castor oil, fatty acid monoesters made by direct esterification of vegetable oil fatty acids with monoalcohols, ethers, Isopar (registered trademark) E, Exor (registered trademark) Hexane, Heptane, E, D30, D40, D60, D80, D95, D110, and D130 (manufactured by ExxonMobil Corporation), and other petroleum-based solvents may be used.

As the liquid resin, for example, one or more resins selected from liquid acrylic resin, liquid epoxy resin, liquid polyester resin, and liquid urethane resin may be used.

As the liquid plasticizer, for example, a liquid plasticizer for plastics may be used.

The components contained in the near-infrared absorbing particle dispersion liquid are not limited to the near-infrared absorbing particles and the liquid medium described above. The near-infrared absorbing particle dispersion liquid may also contain additional optional components as needed.

For example, acid or alkali may be added to the near-infrared absorbing particle dispersion liquid as needed to adjust the pH of the dispersion.

In addition, in the near-infrared absorbing particle dispersion liquid described above, various surfactants, coupling agents, and the like may be added to the near-infrared absorbing particle dispersion liquid as dispersants in order to further improve the dispersion stability of the near-infrared absorbing particles and to avoid coarsening of the dispersion particle diameter due to re-aggregation.

While the dispersants such as the surfactants and coupling agents may be selected according to the application, the dispersants are preferably those that have one or more groups selected from amine-containing groups, hydroxyl groups, carboxyl groups, and epoxy groups as functional groups. These functional groups adsorb onto the surface of the near-infrared absorbing particles to prevent aggregation, and have the effect of dispersing the near-infrared absorbing particles uniformly even in the infrared shielding film formed using the near-infrared absorbing particles. Polymeric dispersants with one or more groups selected from the above functional groups in the molecule are more preferable.

Examples of the commercial dispersants which may be suitably used include Solspar (registered trademark) 9000, 12000, 17000, 20000, 21000, 24000, 26000, 27000, 28000, 32000, 35100, 54000, 250 (manufactured by Japan Lubrizol Corporation); EFKA (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, 8503 (manufactured by EFKA Additives B. V.); AJISPER (registered trademark) PA111, PB821, PB822, PN411, Faymex L-12 (manufactured by Ajinomoto Fine-Techno Co., Inc.); DisperBYK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, 430 (manufactured by BYK Japan KK), Disparlon (registered trademark) 1751N, 1831, 1850, 1860, 1934, DA-400N, DA-703-50, DA-725, DA-705, DA-7301, DN-900, NS-5210, NVI-8514L (manufactured by Kusumoto Chemicals, Ltd.), Arufon (registered trademark) UC-3000, UF-5022, UG-4010, UG-4035, UG-4070 (manufactured by Toagosei Co., Ltd.), and the like.

The method for dispersing the near-infrared absorbing particles into the liquid medium is not particularly limited as long as the near-infrared absorbing particles can be dispersed into the liquid medium. In this case, it is preferable that the near-infrared absorbing particles are dispersed so that the average particle diameter of the near-infrared absorbing particles is 200 nm or less, and more preferably 0.1 nm or more and 200 nm or less.

As a dispersion processing method for the near-infrared absorbing particles into the liquid medium, for example, dispersion processing methods using equipment such as a bead mill, a ball mill, a sand mill, a paint shaker, an ultrasonic homogenizer, and the like may be used. Among them, it is preferable to pulverize and disperse with a medium stirring mill such as a bead mill, a ball mill, a sand mill, a paint shaker, and the like, that uses media (beads, balls, Ottawa sand) from the viewpoint of reducing the time required to obtain the desired average particle diameter. By the pulverization-dispersion treatment using the medium stirring mill, the near-infrared absorbing particles can be dispersed into the liquid medium, and simultaneously the particles can be atomized by collisions of the near-infrared absorbing particles and collisions of the medium with the near-infrared absorbing particles, so that the near-infrared absorbing particles can be further atomized and dispersed. That is, the pulverization-dispersion treatment is performed.

The average particle diameter of the near-infrared absorbing particles is preferably 0.1 nm or more and 200 nm or less as described above. This is because, when the average particle diameter is small, the scattering of light in the visible light region of wavelength of 400 nm or more and 780 nm or less due to geometric scattering or Mie scattering is reduced, and as a result, it can be avoided that the near-infrared absorbing particle dispersion in which the near-infrared absorbing particles are dispersed in a resin or the like become like a frosted glass and clear transparency cannot be obtained. That is, when the average particle diameter is 200 nm or less, the light scattering becomes the Rayleigh scattering mode due to the weakening of the above geometric scattering or Mie scattering mode. This is because, in the Rayleigh scattering region, the scattered light is proportional to the sixth power of the dispersion particle diameter, and as the dispersion particle diameter decreases, the scattering decreases and the transparency is improved. Then, when the average particle diameter is 100 nm or less, the scattered light becomes very small and is preferable.

The dispersion state of the near-infrared absorbing particles in the near-infrared absorbing particle dispersion body in which the near-infrared absorbing particles are dispersed in a solid medium such as a resin, obtained by using the near-infrared absorbing particle dispersion liquid of the present embodiment, does not aggregate more than the average particle diameter of the near-infrared absorbing particles of the dispersion as long as the known addition method for the dispersion liquid to the solid medium is performed.

When the average particle diameter of the near-infrared absorbing particles is 0.1 nm or more and 200 nm or less, it is possible to prevent the produced near-infrared absorbing particle dispersion body and its molded product (plates, sheets, and the like) from becoming grayish with a monotonically reduced transmittance.

The content of the near-infrared absorbing particles in the near-infrared absorbing particle dispersion liquid of the present embodiment is not particularly limited, but it is preferable, for example, to be 0.01% by mass or more and 80% by mass or less. This is because sufficient solar transmittance can be exerted when the content of the near-infrared absorbing particles is 0.01% by mass or more. In addition, when the content of the near-infrared absorbing particles is 80% by mass or less, the near-infrared absorbing particles can be dispersed uniformly in the dispersion medium.

[Near-Infrared Absorbing Particle Dispersion Body]

Next, a configuration example of the near-infrared absorbing particle dispersion body of the present embodiment will be described.

Figure 12:
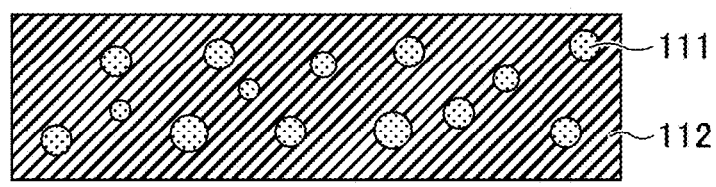
FIG. 12 is a schematic diagram of a near-infrared absorbing particle dispersion body.

The near-infrared absorbing particle dispersion body of the present embodiment includes the aforementioned near-infrared absorbing particles and a solid medium. Specifically, for example, as schematically illustrated in FIG. 12, a near-infrared absorbing particle dispersion body 110 may include the aforementioned near-infrared absorbing particles 111 and a solid medium 112, and the near-infrared absorbing particles 111 may be placed in the solid medium 112. In the near-infrared absorbing particle dispersion body of the present embodiment, it is preferable that the near-infrared absorbing particles are dispersed in the solid medium. FIG. 12 is a schematic diagram and the near-infrared absorbing particle dispersion body of the present embodiment is not limited to the embodiment. For example, although the near-infrared absorbing particles 111 are described as spherical particles in FIG. 12, the shape of the near-infrared absorbing particles 111 is not limited to the form and may have any shape. The near-infrared absorbing particles 111 may also have, for example, a coating on the surface. In addition to the near-infrared absorbing particles 111 and the solid medium 112, the near-infrared absorbing particle dispersion body 110 may also contain other additives as needed.

The near-infrared absorbing particle dispersion body according to the present embodiment is described below in the following order: (1) Characteristics of Solid Medium and Near-Infrared Absorbing Particle Dispersion, (2) Method for Producing Near-Infrared Absorbing Particle Dispersion body, (3) Additives, and (4) Application Examples.

(1) Characteristics of Solid Medium and Near-Infrared Absorbing Particle Dispersion The solid medium may be a medium resin such as a thermoplastic resin, a thermosetting resin, an ultraviolet curing resin, and the like. That is, resins can be suitably used as the solid medium.

The specific material of the resin used for the solid medium is not particularly limited, but it is preferable to use, for example, a resin selected from a resin group consisting of polyester resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer, polyvinyl acetal resin, and ultraviolet curing resin, or a mixture of two or more of the resins selected from the above resin group. Polyethylene terephthalate resin can be suitably used as the polyester resin.

These medium resins may also contain a polymer-based dispersant with one or more groups selected from amine-containing groups in the main skeleton, hydroxyl groups, carboxyl groups, and epoxy groups, as functional groups.

The solid medium is not limited to the medium resins, but binders using metal alkoxides may also be used as the solid medium. Examples of typical metal alkoxides include alkoxides of Si, Ti, Al, Zr, and the like. A binder using these metal alkoxides may be hydrolyzed and depolymerized by heating and the like, so that the near-infrared absorbing particle dispersion body in which the solid medium contains the oxides can be obtained.

The content of the near-infrared absorbing particles in the near-infrared absorbing particle dispersion body according to the present embodiment is not particularly limited, but the near-infrared absorbing particle dispersion body preferably contains 0.001% by mass or more and 80% by mass or less of the near-infrared absorbing particles.

The shape of the near-infrared absorbing particle dispersion body of the present embodiment is not particularly limited, but it is preferable that the near-infrared absorbing particle dispersion body of the present embodiment is provided in the form of a sheet, a board, or a film. This is because the near-infrared absorbing particle dispersion body can be applied to various applications when provided in the form of a sheet, a board, or a film.

The color tone of the near-infrared absorbing particle dispersion body of the present embodiment varies depending on the concentration of the near-infrared absorbing particles contained. When the Hunter color index of the near-infrared absorbing particle dispersion body of the present embodiment is evaluated by the color tone of the concentration that is, for example, $L^*=88$, that is, in the $L^*=88$ section of the Hunter color index, it is preferable that the near-infrared absorbing particle dispersion body of the present embodiment has the near-infrared shielding property with the solar transmittance of 67% or less and exhibits the color neutrality that satisfies $b^* \geq 0$, $b^* \geq 1.6 \times a^* + 8.0$. When the color index $b^*$ is a negative value, the blueness is too strong to appear a neutral color. Even when $b^*$ is a positive value, the larger the color index $a^*$, the larger the $b^*$ value is necessary for the dispersion liquid to appear a neutral color. The determination criterion is $b^* \geq 1.6 \times a^* + 8.0$. It is more preferable that the solar transmittance is 50% or less.

The near-infrared absorbing particle dispersion body of the present embodiment exhibits high sensor wavelength transmittance. The sensor wavelength transmittance varies depending on the concentration of the near-infrared absorbing particles contained in the near-infrared absorbing particle dispersion body. The lower the concentration, naturally, the higher the transmittance, but the higher the solar transmittance as well and the lower the solar shielding. Because the near-infrared absorbing particles described above have the effect of moving the near-infrared absorption peak to the longer wavelength side by their own electronic structure change, it is possible to improve the sensor wavelength transmittance without lowering the particle concentration and without changing the size of the near-infrared absorption peak. When evaluating the index that satisfies both of the solar shielding and the sensor wavelength transmittance, it is preferable that the near-infrared absorbing particle dispersion body of the present embodiment exhibits the sensor wavelength transmittance that has T900, which is the transmittance at a wavelength of 900 nm, of 10% or more, ST21(%), which is the solar transmittance, of 67% or less, and T900(%) and ST21(%) satisfy $T900 \geq 1.4 \times ST21 - 41.0$, when evaluated in the $L^*=88$ section of the Hunter color index.

The wavelengths of various sensors are in the vicinity of 800 nm to 1000 nm, and the required signal intensity varies according to the sensor species, but when the transmittance is less than 10% for light at a wavelength of 900 nm with the approximate brightness of $L^*=88$, the signal intensity cannot be sufficiently secured. When the dispersion body is diluted to reduce the particle concentration, T900 naturally increases, but ST21 also increases as well. It is preferable that the slope of increase in T900 with respect to the increase in ST21 is higher than the criterion, which is determined by $ST21(\%) \leq 67$ and $T900(\%) \geq 1.4 \times ST21(\%) - 41.0$.

By using the near-infrared absorbing particles described above, the near-infrared absorbing particle dispersion body of the present embodiment can satisfy the above color tone and the sensor wavelength transmittance.

(2) Method for Producing Near-Infrared Absorbing Particle Dispersion Body

The method for producing the near-infrared absorbing particle dispersion body of the present embodiment is described below. It should be noted that only a configuration example of the method for producing the near-infrared absorbing particle dispersion body is described here, and the aforementioned method for producing the near-infrared absorbing particle dispersion body is not limited to the following configuration example.

The near-infrared absorbing particle dispersion body of the present embodiment may be produced using, for example, a masterbatch. In this case, the method for producing the near-infrared absorbing particle dispersion body of the present embodiment may also have, for example, the following masterbatch preparation step.

A masterbatch preparation step to obtain a masterbatch in which the near-infrared absorbing particles are dispersed in the solid medium.

In the masterbatch preparation step, a masterbatch in which the near-infrared absorbing particles are dispersed in the solid medium may be prepared.

The specific preparing method for the masterbatch is not particularly limited. For example, the masterbatch may be prepared by dispersing the near-infrared absorbing particle dispersion liquid or the near-infrared absorbing particles in the solid medium and pelletizing the solid medium.

As the near-infrared absorbing particles, a near-infrared absorbing particle dispersion powder obtained by removing the liquid medium from the near-infrared absorbing particle dispersion liquid may also be used.

For example, a mixture is prepared by uniformly mixing a powder or pellet of the near-infrared absorbing particle dispersion liquid, the near-infrared absorbing particles, or the near-infrared absorbing particle dispersion powder, with a solid medium and, if necessary, other additives. The mixture is then kneaded in a vent type single-screw or twin-screw extruder and processed into pellets by a method for cutting the melt-extruded strands to produce a masterbatch. In this case, the shape of the pellets may be cylindrical or prismatic. When making pellets, the method known as a hot cut method may be used in which the molten extrudate is directly cut. In this case, it is common for the shape to be a substantially spherical shape.

In the masterbatch preparation step, when the near-infrared absorbing particle dispersion liquid is used as a raw material, it is preferable to reduce and remove the liquid medium derived from the near-infrared absorbing particle dispersion liquid. In this case, the extent to which the liquid medium contained in the near-infrared absorbing particle dispersion liquid is removed is not particularly limited. For example, it is preferable to remove the liquid medium from the near-infrared absorbing particle dispersion liquid or the like to an allowable amount remaining in the masterbatch. When a liquid plasticizer is used as the liquid medium, the entire amount of the liquid plasticizer may remain in the near-infrared absorbing particle dispersion body.

Methods for reducing or removing the liquid medium contained in the near-infrared absorbing particle dispersion liquid from the near-infrared absorbing particle dispersion liquid or the mixture of the near-infrared absorbing particle dispersion liquid and the solid medium are not particularly limited. For example, it is preferable to dry the near infrared absorbing particle dispersion liquid or the like under reduced pressure. Specifically, the near infrared absorbing particle dispersion liquid or the like are dried under reduced pressure while stirring to separate the composition containing the near infrared absorbing particles from the components of the liquid medium. A vacuum agitator type dryer may be used for the depressurization drying, but it can be any device with the above functions and is not particularly limited. In addition, the pressure value during the depressurization of the drying process is appropriately selected.

By using the depressurization drying method, the removal efficiency of the liquid medium derived from the near-infrared absorbing particle dispersion liquid is improved, and the near-infrared absorbing particle dispersion powder obtained after the depressurization drying and the near-infrared absorbing particle dispersion liquid which is the raw material are not exposed to high temperature for a long time. Therefore, it is preferable because the near-infrared absorbing particle dispersion powder and the near-infrared absorbing particles dispersed in the near-infrared absorbing particle dispersion liquid are not agglomerated. Furthermore, it is preferable because the productivity of the near-infrared absorbing particle dispersion powder and the like is also improved, and the solvent such as the evaporated liquid medium can be readily recovered, which is also preferable for environmental consideration.

In the near-infrared absorbing particle dispersion powder and the like obtained after the drying process, it is preferable to sufficiently remove the solvent component with a boiling point of 120° C. or less. For example, it is preferable that the residual amount of the solvent component is 2.5% by mass or less. This is because when the residual solvent component is 2.5% by mass or less, bubbles will not be generated when the near-infrared absorbing particle dispersion powder or the like is processed into, for example, the near-infrared absorbing particle dispersion body, and the appearance and optical properties will be well maintained. Also, when the residual solvent component in the near-infrared absorbing particle dispersion powder is 2.5% by mass or less, when the near-infrared absorbing particle dispersion powder is stored for a long period of time, the residual solvent component will not be agglomerated due to natural drying, and long-term stability will be maintained.

The obtained masterbatch may be adjusted in its dispersion concentration by adding the solid medium and kneading, while the dispersion state of the near-infrared absorbing particles contained in the near-infrared absorbing particle dispersion body is maintained.

In addition, the method for producing the near-infrared absorbing particle dispersion body of the present embodiment may have a molding step for molding the obtained masterbatch or the one in which the solid medium is added to the masterbatch as described above, as needed, to form the near-infrared absorbing particle dispersion body in a desired shape.

The specific method for molding the near-infrared absorbing particle dispersion body is not particularly limited, but methods such as the well-known extrusion molding method and injection molding method may be used.

In the molding step, for example, the near-infrared absorbing particle dispersion body provided in the form of a sheet, a board, or a film, which is molded into a flat or curved shape, may be produced. There is no particular limitation on the method for molding into the form of the sheet, the board, or the film, and various known methods may be used. For example, the calendar roll method, extrusion method, casting method, inflation method, and the like may be used.

The method for producing the near-infrared absorbing particle dispersion body of the present embodiment is not limited to the embodiments having the masterbatch preparation step described above.

For example, the method for producing the near-infrared absorbing particle dispersion body of the present embodiment may also be the embodiment having the following steps.

A precursor solution preparation step in which a near-infrared absorbing particle dispersion body precursor solution is prepared by mixing a monomer or oligomer of the solid medium or an uncured liquid precursor of the solid medium with the near-infrared absorbing particles (the near-infrared absorbing particle dispersion powder) or the near-infrared absorbing particle dispersion liquid.

A near-infrared absorbing particle dispersion body preparation step in which the near-infrared absorbing particle dispersion body is prepared by curing the precursor of the solid medium such as the above monomer by chemical reactions such as condensation or polymerization.

For example, when an acrylic resin is used as the solid medium, the near-infrared absorbing particle dispersion body precursor solution may be obtained by mixing an acrylic monomer or an acrylic ultraviolet curing resin with the near-infrared absorbing particles.

Then, the near-infrared absorbing particle dispersion body precursor solution is filled in a predetermined mold or the like and radical polymerization is performed, and a near-infrared absorbing particle dispersion body using the acrylic resin is obtained.

When a resin cured by crosslinking is used as the solid medium, the dispersion body may also be obtained by crosslinking the near-infrared absorbing particle dispersion body precursor solution as in the case of using the acrylic resin described above.

(3) Additives

When resins are used as the solid medium, the near-infrared absorbing particle dispersion body of the present embodiment may also contain known additives, such as plasticizers, flame retardants, coloring inhibitors, and fillers, which are usually added to the resins. The solid medium is not limited to the resins as described above, and binders using metal alkoxides may also be used.

The shape of the near-infrared absorbing particle dispersion body is not particularly limited, but it may be provided in the form of, for example, a sheet, a board, or a film, as described above.

When the near-infrared absorbing particle dispersion body provided in the form of a sheet, a board, or a film, is used as a transparent base material intermediate layer such as laminated glass, the solid medium contained in the near-infrared absorbing particle dispersion body may not have sufficient flexibility or adhesion to the transparent base material as it is. In this case, the near-infrared absorbing particle dispersion body preferably contains a plasticizer. Specifically, for example, when the solid medium is a polyvinyl acetal resin and is used for the above application, the near-infrared absorbing particle dispersion body preferably further contains the plasticizer.

As the above plasticizer, a substance used as plasticizers in the solid medium used for the near-infrared absorbing particle dispersion body of the present embodiment may be used. For example, plasticizers used for the near-infrared absorbing particle dispersion body composed of a polyvinyl acetal resin include a plasticizer that is a compound of a monovalent alcohol and an organic acid ester; an ester-based plasticizer such as a polyvalent alcohol organic acid ester compound; and a phosphate-based plasticizer such as an organophosphate-based plasticizer. Any of these plasticizers is preferably liquid at room temperature. Among them, plasticizers that are ester compounds synthesized from polyalcohols and fatty acids are preferable.

(4) Application Examples

The near-infrared absorbing particle dispersion body of the present embodiment may be used in various forms, and their use and application are not particularly limited. As application examples of the near-infrared absorbing particle dispersion body of the present embodiment, a near-infrared absorbing transparent base material, a near-infrared absorption interlayer, and a near-infrared absorbing laminate are described below.

(4-1) Near-Infrared Absorbing Transparent Base Material

The near-infrared absorbing transparent base material of the present embodiment includes a transparent base material and a near-infrared absorbing layer on at least one side of the transparent base material, and the near-infrared absorbing layer may be the near-infrared absorbing particle dispersion body described above.

Figure 14:
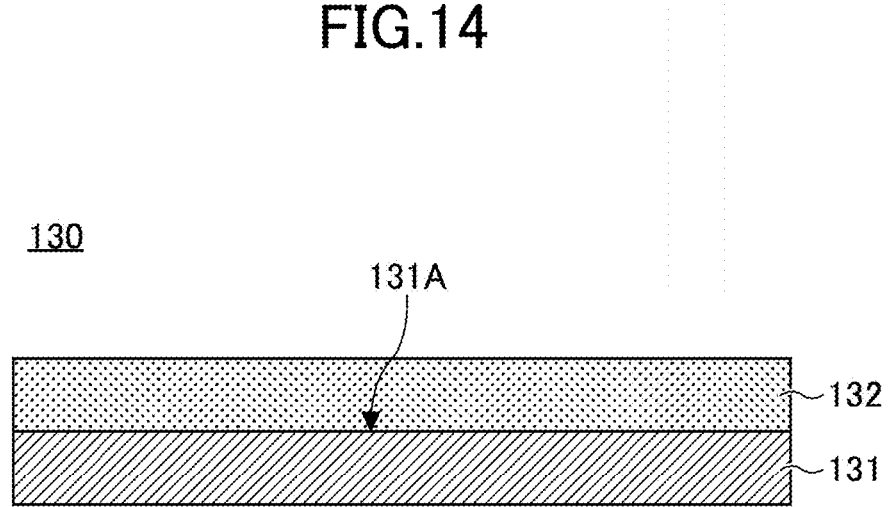
FIG. 14 is a schematic diagram of a near-infrared absorbing transparent base material.

Specifically, a near-infrared absorbing transparent base material 130 may include a transparent base material 131 and a near-infrared absorbing layer 132, as illustrated in FIG. 14, which is a schematic sectional view along the lamination direction of the transparent base material and the near-infrared absorbing layer. The near-infrared absorbing layer 132 may be arranged on at least one side 131A of the transparent base material 131.

The near-infrared absorbing transparent base material of the present embodiment may include the transparent base material as described above. As the transparent base material, for example, one or more materials selected from transparent film base material and transparent glass base material may be preferably used.

The film base material is not limited to the form of the film, and may be provided in the form of, for example, a board or a sheet. One or more materials selected from polyester resin, acrylic resin, urethane resin, polycarbonate resin, polyethylene resin, ethylene vinyl acetate copolymer, vinyl chloride resin, fluorine resin, and the like, may be suitably used as the film base material and may be used according to various purposes. As the film base material, polyester resin is preferable, especially polyethylene terephthalate resin (PET resin). That is, the film base material is preferably a polyester resin film, and more preferably a polyethylene terephthalate resin film.

When the film base material is used as the transparent base material, it is preferable that the surface of the film base material is surface-treated to achieve easy adhesion with the near-infrared absorbing layer.

It is also preferable that an intermediate layer is formed on the glass base material or the film base material and a near-infrared absorbing layer is formed on the intermediate layer, to improve the adhesion between the glass base material or the film base material and the near-infrared absorbing layer. The composition of the intermediate layer is not particularly limited but may be composed of, for example, a polymer film, a metal layer, an inorganic layer (inorganic oxide layers such as silica, titania, and zirconia, for example), an organic/inorganic composite layer, and the like.

Because the near-infrared absorbing particle dispersion body is already described, its explanation is omitted here. The form of the near-infrared absorbing particle dispersion body is not particularly limited, but it is preferable to be provided in the form of a sheet, a board, or a film, for example.

The method for producing the near-infrared absorbing transparent base material according to the present embodiment will be described.

The near-infrared absorbing transparent base material according to the present embodiment may be produced by forming a near-infrared absorbing layer, which is a near-infrared absorbing particle dispersion body in which the near-infrared absorbing particles are dispersed in the solid medium, on the transparent base material using, for example, the aforementioned near-infrared absorbing particle dispersion liquid.

Therefore, the method for producing the near-infrared absorbing transparent base material according to the present embodiment may have the following steps, for example.

A coating step in which a coating solution containing the aforementioned near-infrared absorbing particle dispersion liquid is applied to the surface of a transparent base material.

A near-infrared absorbing layer formation step in which a near-infrared absorbing layer is formed after the liquid medium in the coating solution is evaporated.

The coating solution used in the coating step may be prepared, for example, by adding and mixing the resin, the solid medium such as metal alkoxides, or the solid medium precursor to the aforementioned near-infrared absorbing particle dispersion liquid.

The solid medium precursor means one or more substances selected from monomers or oligomers of the solid medium, and uncured solid media, as described above.

When the near-infrared absorbing layer, which is a coating film, is formed on the transparent base material, the near-infrared absorbing layer is in a state where the near-infrared absorbing particles are dispersed in the solid medium. Therefore, the near-infrared absorbing layer becomes the near-infrared absorbing particle dispersion body. Thus, the near-infrared absorbing transparent base material may be prepared by providing the near-infrared absorbing particle dispersion body on the surface of the transparent base material.

The description of the solid medium and the solid medium precursor is omitted here because it is described in (1)

Characteristics of Solid Medium and Near-Infrared Absorbing Particle Dispersion Body and
(2) Method for Producing Near-Infrared Absorbing Particle Dispersion Body.

In order to provide the near-infrared absorbing layer on the transparent base material, the method for applying the coating solution on the transparent base material may be any method that can uniformly apply the coating solution on the surface of the transparent base material, and is not particularly limited. Examples include bar coating, gravure coating, spray coating, dip coating, spin coating, screen printing, roll coating, flow coating, and the like.

Here, the procedure for producing the near-infrared absorbing layer on the surface of the transparent base material is described, using an example in which an ultraviolet curing resin is used as the solid medium and applied using the bar coating method to form the near-infrared absorbing layer.

A coating solution, whose concentration and additives are adjusted appropriately so as to have moderate leveling properties, is applied onto the transparent base material using a wire bar with a bar number that can satisfy the target thickness of the near-infrared absorbing layer and the target content of the near-infrared absorbing particles. Then, a coating layer, which is the near-infrared absorbing layer, may be formed on the transparent base material by drying out the solvent such as a liquid medium contained in the coating solution and then irradiating it with ultraviolet light to harden it.

The drying condition of the coating film depends on each component, the type or the ratio of solvents, but it is usually 20 seconds or more and 10 minutes or less at a temperature of 60° C. or more and 140° C. or less. There is no particular restriction on the ultraviolet irradiation, but an ultraviolet exposure machine such as an ultra-high pressure mercury lamp, for example, may be suitably used.

In addition, the adhesion between the base material and the near-infrared absorbing layer, the smoothness of the coating film during coating, and the dryness of organic solvents may be manipulated by the processes before and after the formation of the near-infrared absorbing layer (a pre-process and a post-process). As the processes before and after the formation of the near-infrared absorbing layer, for example, the surface treatment process of the base material, the pre-baking (pre-heating of the base material) process, the post-baking (post-heating of the base material) process, and the like may be selected as appropriate. Preferably, the heating temperature in the pre-baking and/or post-baking process is 80° C. or more and 200° C. or less and the heating time is 30 seconds or more and 240 seconds or less.

The method for producing the near-infrared absorbing transparent base material of the present embodiment is not limited to the above method. As another configuration example of the method for producing the near-infrared absorbing transparent base material of the present embodiment, a configuration having the following steps is also mentioned.

A near-infrared absorbing particle dispersion liquid coating and drying step in which the near-infrared absorbing particle dispersion liquid described above is applied to the surface of the transparent base material and dried.

A binder application and curing step in which the resin, the solid medium such as metal alkoxides, or the binder using the solid medium precursor is applied and cured on the surface applied with the near-infrared absorbing particle dispersion liquid.

In this case, by the near-infrared absorbing particle dispersion liquid application and drying process, a film in which the near-infrared absorbing particles are dispersed is formed on the surface of the transparent base material. The near-infrared absorbing particle dispersion liquid may be applied by the same method as described above for the coating step of the method for producing the near-infrared absorbing transparent base material.

Then, the binder is applied and hardened on the film in which the near-infrared absorbing particles are dispersed, and the hardened binder is placed between the near-infrared absorbing particles to form the near-infrared absorbing layer.

The near-infrared absorbing transparent base material may also include an additional coat layer on the surface of the near-infrared absorbing particle dispersion body. That is, the near-infrared absorbing transparent base material may include a multilayer film.

The coat layer may be a coating film of oxide including, for example, one or more elements selected from Si, Ti, Zr, and Al. In this case, the coat layer may be formed, for example, by applying a coating solution containing one or more components selected from an alkoxide containing one or more elements of Si, Ti, Zr, and Al, and a partially hydrolyzed condensed polymer of the alkoxide, onto the near-infrared absorbing layer, and then heating.

By providing the coat layer, the coated component fills the gaps between the deposited near-infrared absorbing particles in the first layer and reduces refraction of visible light, so that the haze value of the film is further reduced and the visible light transmittance can be improved. In addition, the adhesion of the near-infrared absorbing particles to the base material can be improved.

Here, as a method for forming the coating film consisting of the alkoxide containing one or more elements of Si, Ti, Zr, and Al, or the partially hydrolyzed condensed polymer of the alkoxide, on each of the near-infrared absorbing particles or on the film containing the near-infrared absorbing particles, a coating method is preferable from the viewpoint of ease and cost of film formation operation.

As a coating solution used in the above coating method, a coating solution containing one or more of the alkoxide containing one or more elements of Si, Ti, Zr, and Al, or the partially hydrolyzed condensed polymer of the alkoxide in a solvent such as water or alcohol, may be suitably used. The content of the above alkoxide or the like in the above coating solution is not particularly limited, but preferably 40% by mass or less in terms of the oxide in the coating obtained after heating, for example. The pH may also be adjusted by adding an acid or an alkali, if necessary.

By applying the coating solution as a second layer on the film composed mainly of the near-infrared absorbing particles and heating, an oxide film containing one or more elements selected from Si, Ti, Zr, and Al as the coat layer is readily formed. It is also preferable to use an organosilazane solution as a binder component or a component of the coating solution used in the coating solution according to the present embodiment.

The heating temperature of the base material after the application of the inorganic binder, the near-infrared absorbing particle dispersion liquid as the coating film containing the metal alkoxides of one or more components of Si, Ti, Zr, and Al, and the hydrolyzed polymers thereof, or the coating solution, is not particularly limited. For example, the heating temperature of the base material is preferably 100° C. or more, and more preferably the boiling point or more of the solvent in the coating solution such as the near-infrared absorbing particle dispersion liquid.

This is because the polymerization reaction of the metal alkoxides or the hydrolyzed polymers of the metal alkoxides contained in the coating film can be completed when the base material heating temperature is 100° C. or more. In addition, when the base material heating temperature is 100° C. or more, water or organic solvents, which are solvents, rarely remain in the film, and therefore these solvents are not a cause of reduction in the visible light transmittance of the film after heating.

The thickness of the near-infrared absorbing layer on the transparent base material of the near-infrared absorbing transparent base material of the present embodiment is not particularly limited, but it is preferable in practical use to be 10 µm or less, and more preferable to be 6 µm or less. This is because when the near-infrared absorbing layer is 10 µm or less in thickness, not only does it exhibit sufficient pencil hardness and have abrasion resistance, but also process abnormalities such as warpage of the base material film can be avoided when the solvent in the near-infrared absorbing layer is evaporated and the binder is hardened.

(4-2) Near-Infrared Absorption Interlayer, and Near-Infrared Absorbing Laminate

The near-infrared absorbing laminate of the present embodiment may have a laminated structure including the aforementioned near-infrared absorbing particle dispersion body and the transparent base material. The near-infrared absorbing laminate of the present embodiment includes the aforementioned near-infrared absorbing particle dispersion body and the transparent base material as components, and may be a laminate in which these are laminated.

As the near-infrared absorbing laminate, for example, two or more transparent base materials and the aforementioned near-infrared absorbing particle dispersion body are laminated. In this case, the near-infrared absorbing particle dispersion body may be arranged, for example, between the transparent base materials and used as a near-infrared absorption interlayer.

Figure 13:
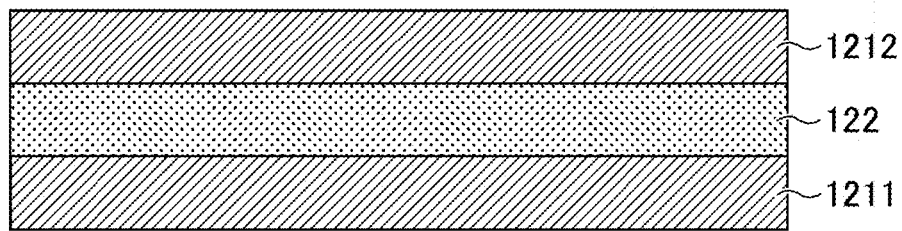
FIG. 13 is a schematic diagram of a near-infrared absorbing laminate.

In this case, specifically, as illustrated in FIG. 13, which is a schematic cross-sectional view along the lamination direction of the transparent base material and the near-infrared absorbing particle dispersion body, a near-infrared absorbing laminate 120 may include multiple transparent base materials 1211 and 1212 and a near-infrared absorbing particle dispersion body 122. The near-infrared absorbing particle dispersion body 122 may be arranged between the multiple transparent base materials 1211 and 1212. In FIG. 13, an example of having two transparent base materials 1211 and 1212 is illustrated, but it is not limited to this configuration.

It is preferable that the above near-infrared absorption interlayer is provided in the form of any of a sheet, a board, or a film.

As the transparent base material, one or more materials selected from plate glass, plate-like plastic, and film-like plastic, that are transparent in the visible light region, may be used suitably.

When plastic is used as the transparent base material, the material of the plastic can be selected according to the application, not particularly limited, and one or more materials selected from, for example, polycarbonate resin, acrylic resin, polyester resin, polyamide resin, vinyl chloride resin, olefin resin, epoxy resin, polyimide resin, ionomer resin, fluorine resin, and the like, may be used. Polyethylene terephthalate resin may be suitably used as the polyester resin.

The transparent base material may contain particles having a solar shielding function. As the particles having a solar shielding function, near-infrared absorbing particles having near-infrared shielding properties may be used.

When the near-infrared absorbing particle dispersion body is interposed as a component of an intermediate layer sandwiched between two or more transparent base materials, it is possible to obtain a solar shielding laminated structure, which is a kind of the near-infrared absorbing laminate, that has a more neutral tone of transmitted color while decreasing the solar transmittance and can also ensure the transmission of the sensor wavelength.

It is also possible to obtain the aforementioned near-infrared absorbing laminate by bonding and integrating two or more transparent base materials facing each other and sandwiching the near-infrared absorbing particle dispersion body, in a known manner.

When the aforementioned near-infrared absorbing particle dispersion body is used as the near-infrared absorption interlayer, examples of the solid medium includes the one described above for the near-infrared absorbing particle dispersion body. From the viewpoint of enhancing the adhesion strength between the near-infrared absorption interlayer and the transparent base material, the solid medium is preferably a polyvinyl acetal resin.

The near-infrared absorption interlayer of the present embodiment may be produced by the method for producing the near-infrared absorbing particle dispersion body described above, and may be, for example, a near-infrared absorption interlayer provided in the form of any of a sheet, a board, or a film.

When the near-infrared absorption interlayer does not have sufficient flexibility or adhesion to the transparent base material, it is preferable to add a liquid plasticizer for the medium resin. For example, when the medium resin used for the near-infrared absorption interlayer is a polyvinyl acetal resin, the addition of the liquid plasticizer for the polyvinyl acetal resin is beneficial for improving adhesion to the transparent base material.

As the plasticizer, a substance used as a plasticizer for the resin of the solid medium may be used. Examples of the plasticizers used for infrared shielding films composed of polyvinyl acetal resin include plasticizers that are compounds of monovalent alcohol and organic acid esters; plasticizers that are esters such as polyvalent alcohol organic acid ester compounds; and phosphate-based plasticizers such as organophosphate-based plasticizers. All plasticizers are preferably liquid at room temperature. Among them, plasticizers that are ester compounds synthesized from polyalcohols and fatty acids, are preferred.

At least one compound selected from the group consisting of silane coupling agents, metal salts of carboxylic acids, metal hydroxides, and metal carbonates may also be added to the near-infrared absorption interlayer. Metals constituting the metal salts of carboxylic acids, the metal hydroxides, and the metal carbonates are not particularly limited, but at least one metal selected from sodium, potassium, magnesium, calcium, manganese, cesium, lithium, rubidium, and zinc is preferred. In the near-infrared absorption interlayer, it is preferred that the content of at least one compound selected from the group consisting of the metal salts of carboxylic acids, the metal hydroxides, and the metal carbonates is 1% by mass or more and 100% by mass or less with respect to the near-infrared absorbing particles.

Further, the near-infrared absorption interlayer may also contain, in addition to the aforementioned near-infrared absorbing particles, at least one kind of particles selected from oxide particles, composite oxide particles, and boride particles, that contains two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Tb, Dy, Ho, Y, Sm, Eu, Er, Tm, Tb, Lu, Sr, and Ca, as needed. The near-infrared absorption interlayer may contain such particles in the range of 5% by mass or more and 95% by mass or less when the sum of the particles and the near-infrared absorbing particles is 100% by mass.

The near-infrared absorbing laminate may contain an ultraviolet absorber in at least one layer of the interlayer arranged between the transparent base materials. Examples of the ultraviolet absorber include one or more kinds selected from compounds having a malonate structure, compounds having an oxalate anilide structure, compounds having a benzotriazole structure, compounds having a benzophenone structure, compounds having a triazine structure, compounds having a benzoate structure, compounds having a hindered amine structure, and the like.

The intermediate layer of the near-infrared absorbing laminate may of course be composed only of the near-infrared absorption interlayer according to the present embodiment.

The near-infrared absorption interlayer described here is one form of the near-infrared absorbing particle dispersion body. The near-infrared absorbing particle dispersion body according to the present embodiment may of course be used without being sandwiched between two or more transparent base materials that transmit visible light. That is, the near-infrared absorbing particle dispersion body according to the present embodiment may be provided as the near-infrared absorbing particle dispersion body alone.

The near-infrared absorbing laminate according to the present embodiment is not limited to the configuration in which the near-infrared absorbing particle dispersion body is arranged between transparent base materials as described above, but any configuration may be adopted as long as the laminated structure includes the near-infrared absorbing particle dispersion body and the transparent base material.

EXAMPLES

The present invention will be described specifically below with reference to examples. However, the present invention is not limited to the following examples.
(Evaluation Method)
The evaluation method in the following examples and comparative examples will be explained first.
(Chemical Analysis)
The obtained near-infrared absorbing particles were chemically analyzed by atomic absorption spectrometry (AAS) for Cs, and ICP optical emission spectrometry (ICP-OES) for W (tungsten). For O, a light element analyzer (ON-836) manufactured by LECO was used.
(X-Ray Diffraction Measurement)
X-ray diffraction measurements were performed by powder XRD measurements using Cu-Kα rays with the X'Pert-PRO/MPD device manufactured by Spectris Co., Ltd.
(Optical Properties of Near-Infrared Absorbing Transparent Base Material)
The visible light transmittance (VLT) and the solar transmittance (ST21) of the near-infrared absorbing transparent base material were measured in accordance with ISO 9050 and JIS R 3106 (2019). Specifically, transmittance was measured using a spectrophotometer U-4100 manufactured by Hitachi High-Tech Co., Ltd., and was calculated by multiplying by a factor corresponding to the spectrum of sunlight. In measuring transmittance, measurements were performed at 5 nm intervals over a wavelength range of 300 nm or more and 2100 nm or less. The L*a*b* color index was determined in accordance with JIS Z 8729 (2004) by calculating the tristimulus values X, Y, and Z for a D65 standard light source and a light source angle of 10° in accordance with JIS Z 8701 (1999).

Example 1

(Production and Evaluation of Near-Infrared Absorbing Particles)
A total of 20 g of cesium carbonate ($Cs_2CO_3$) and tungsten trioxide ($WO_3$) were weighed, mixed and kneaded to achieve a molar ratio of $Cs_2CO_3:WO_3=1:6$, and the obtained kneaded material was placed in a carbon boat and dried in atmospheric air at 110° C. for 12 hours. Thus, a cesium tungsten oxide precursor powder, which is a compound raw material containing Cs and W, was obtained.

The above cesium tungsten oxide precursor powder was placed on an alumina boat in a heated muffle furnace, and heated to 550° C. and held for 1 hour under the flow of a mixture gas of superheated stream:nitrogen gas=50:50 by volume ratio. The mixture gas is described as "50% $N_2$-50% superheated $H_2O$" in Table 1. Next, the gas to be supplied was changed to 100 volume % nitrogen gas, and it was held at 550° C. for 0.5 hours and then heated and held at 800° C. for 1 hour under the flow of the nitrogen gas. Then, it was cooled to room temperature, and a slightly greenish white powder was obtained (a first heat treatment step).

The X-ray powder diffraction pattern of the white powder was identified as $Cs_4W_{11}O_{35}$ (ICDD 00-51-1891).

Next, the white powder was placed in a carbon boat in a tubular furnace, and heated under the flow of 1 volume % $H_2$—Ar (in Table 1, it is described as "1% $H_2$—Ar"), and held at 550° C. for 1 h for reduction. Then, the gas to be supplied was changed to 100 volume % Ar gas and it was kept at 550° C. for 30 min under the flow of the Ar gas. Then, it was raised to 800° C. and held for 1 h, and then lowered to room temperature to obtain a pale light blue powder A (a second heat treatment step).

Table 1 summarizes the conditions for producing the near-infrared absorbing particles. The following evaluation results are also described in Table 2.

Figure 2:
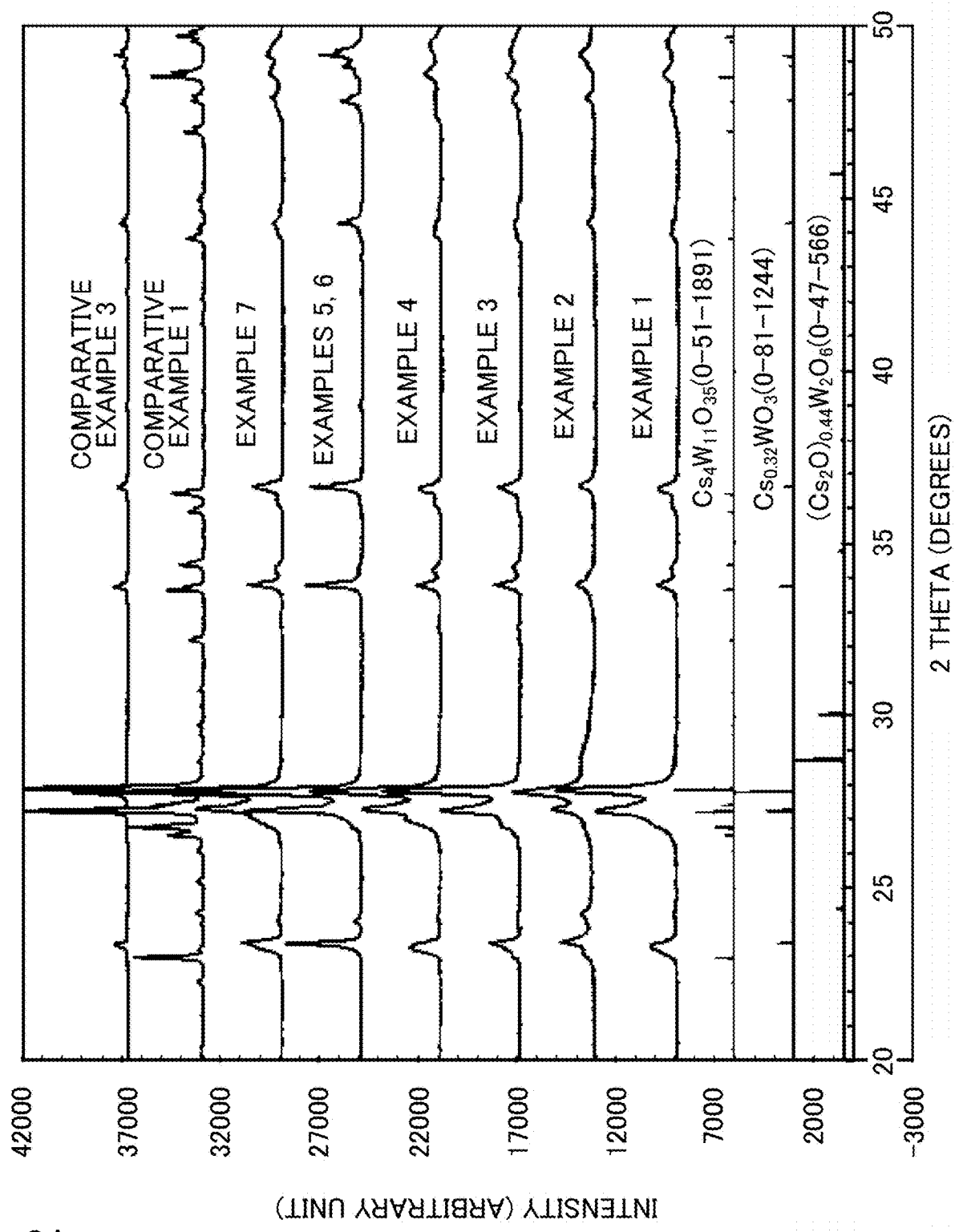
FIG. 2 is powder XRD diffraction patterns of near-infrared absorbing particles prepared in Examples 1 to 7 and Comparative Examples 1 and 3.

The XRD powder pattern of the powder A obtained here exhibited a broad two-phase mixed pattern, in which the main phase is hexagonal $Cs_{0.32}WO_3$ and the second phase is orthorhombic $Cs_4W_{11}O_{35}$, as illustrated in FIG. 2. Chemical analysis of the powder A yielded a Cs/W ratio of 0.33 in terms of the molar ratio. The composition ratios of the other components are described in Table 2. The XRD powder pattern in this case was a mixture of the diffraction lines of both hexagonal $Cs_{0.32}WO_3$ and orthorhombic $Cs_4W_{11}O_{35}$, but the diffraction lines of $Cs_4W_{11}O_{35}$ were slightly shifted from the ideal position and intensity. No data were found in the ICDD database that perfectly matched this diffraction pattern.

Figure 4:
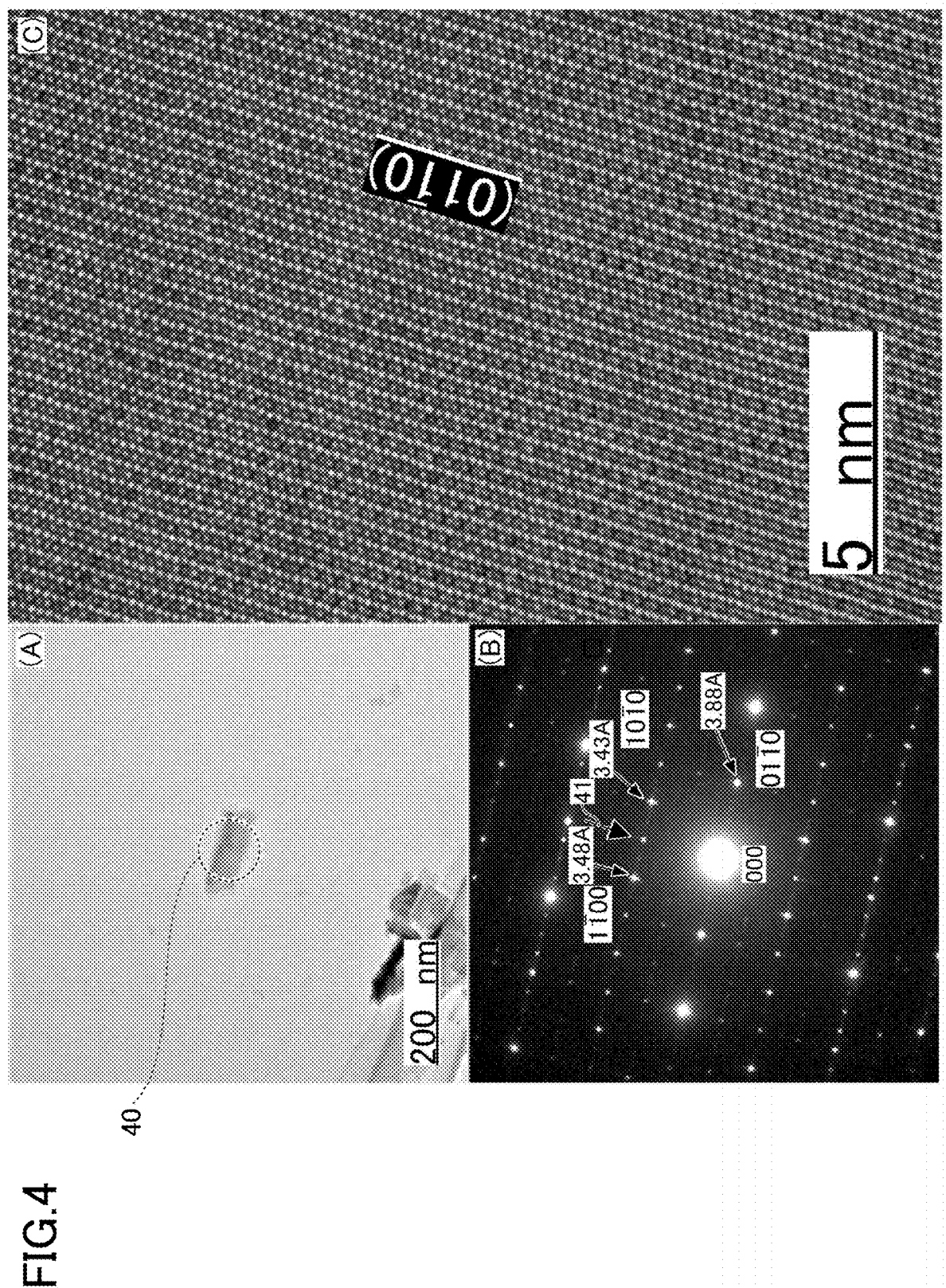
FIG. 4 is a transmission electron microscope bright field image, a selected area electron diffraction image, and a high angle annular dark field (HAADF) image of the near-infrared absorbing particles prepared in Example 1.

When the powder was observed under a transmission electron microscope (HF-2200, manufactured by Hitachi High-Tech Co., Ltd.), a fine particle 40 as illustrated in FIG. 4 (A) were observed. The crystals of each fine particle were observed as a single-phase structure rather than a mixed structure in which two phases of a hexagonal crystal and an orthorhombic crystal were separated, as illustrated in the selected area electron diffraction pattern in FIG. 4 (B). The electron diffraction pattern illustrated in FIG. 4 (B) is a pattern corresponding to the hexagonal [0001] crystal zone, and the diffraction spots represent the plane index when the crystal is regarded as a hexagonal crystal. When the corresponding plane spacing is obtained from the nearest neighbor diffraction spots in the three directions, only the (01-10) plane spacing of 3.88 Å was significantly larger than the values of 3.48 Å and 3.43 Å in the other two directions, deviating from exact hexagonal symmetry. Note that, in crystallography, a negative index is indicated by a bar above the number, but for the convenience of description, a minus sign is added in front of the number in this specification.

FIG. 4 (C) illustrates an atomic image taken by the STEM-HAADF method (high-angle annular dark-field observation in the scanning electron mode). In the HAADF method, the larger the atomic number and the higher the density of atoms in the projection direction, the brighter and stronger the atomic spots are obtained. Therefore, when combined with the projection plane information of the [0001] crystal zone, the atomic species on the image can be identified. In FIG. 4 (C), the strongest spot is W atom, and it is aligned along the (01-10) plane, but no similar alignment is found along the equivalent (1-100) plane or (10-10) plane in the hexagonal crystal. The streaks in the (01-10) spot direction in FIG. 4 (C) illustrate that many planar defects (W and O deficiency) were inserted only in the (01-10) plane, which is interpreted as an increase in the spacing of the (01-10) plane. It can be seen that few defects were introduced in the (01-10), (1-100), and (10-10) planes, which intersect at 60° in the original hexagonal crystal, and that many planar defects were inserted only in the (01-10) plane, resulting in a loss of hexagonal symmetry and modulation to the orthorhombic crystal. Due to the ordered spots of arrows 41 in FIG. 4 (B), this W-deficient plane is introduced with an approximately double period of 3.88 Å. As described above, it was found that the near-infrared absorbing particles were single crystal particles of the cesium tungstate with a pseudo hexagonal crystal structure modulated to the orthorhombic crystal.

Furthermore, when the powder of the obtained near-infrared absorbing particles was irradiated with 25 W Al-Kα X-rays by X-ray photoelectron spectroscopy (XPS-Versa Probe II manufactured by ULVAC-PHI, Inc.) and the excited photoelectrons were observed, it was found that the O1s peak around 530.45 eV had a shoulder on the high-energy side. A peak separation was performed assuming that the component around 532.80 eV was due to $H_2O$, and it was found that a large amount of $OH_2$ was contained. Thermal desorption spectroscopy indicated that OH and $OH_2$ were released from the crystal in the temperature range of 500° C. or more and 700° C. or less when heated. Based on these observations, considering that OH and $OH_2$ were contained in the cesium tungstate of the powder A and the voids were present in the uniaxially elongated pseudo hexagonal crystals, it is inferred that they penetrated the window voids in the hexagonal tunnel. It is considered that because the crystallization occurred in superheated stream, water and its decomposed products introduced into the crystals, and that the $H^+$ and $H_3O^+$ ions produced at that time competed with the positive W ions, leading to the partial desorption of W ions.

(Production and Evaluation of Near-Infrared Absorbing Particle Dispersion Liquid and Near-Infrared Absorbing Particle Dispersion Body)

Then, 20% by mass of the prepared powder A, 10% by mass of an acrylic polymer dispersant (hereinafter referred to as "dispersant a") having a group containing an amine as a functional group, and 70% by mass of methyl isobutyl ketone (MIBK) as a solvent were weighed. These weighed materials were placed in a glass container with silica beads of 0.3 mm diameter, dispersed and pulverized using a paint shaker for 5 hours to obtain a dispersion liquid A.

Here, the average particle diameter (a dispersion particle diameter measured by ELS-8000 manufactured by Otsuka Electronics Co., Ltd., a particle size measuring device based on the dynamic light scattering method) of the near-infrared absorbing particles in dispersion liquid A was measured to be 31.4 nm.

To 100 parts by mass of the dispersion liquid A, 50 parts by mass of ultraviolet curing resin for hard coat (ARONIX UV-3701 manufactured by Toagosei Co., Ltd.) was mixed to make a near-infrared absorbing particle coating solution A. Then, the coating solution obtained by diluting the near-infrared absorbing coating solution as appropriate was applied onto a polyethylene terephthalate (PET) resin film (HPE-50 manufactured by Teijin Ltd., hereinafter also referred to as "PET film") as a transparent film base using a bar coater to form a coating film. The same PET film was used as a transparent base in other examples.

The PET film with the coating film was dried at 80° C. for 5 minutes to evaporate the organic solvent as a liquid medium, and then the ultraviolet curing resin for hard coat was cured with a high-pressure mercury lamp to produce a near-infrared absorbing film A with a coating layer containing near-infrared absorbing particles. The coating layer is a near-infrared absorbing dispersion body, and the near-infrared absorbing film is one form of a near-infrared absorbing transparent base material.

The transmittance of the obtained near-infrared absorbing film A was measured by a U-4100 spectrophotometer manufactured by Hitachi High-Tech Co., Ltd., and the spectral transmittance profile was obtained. The profile is illustrated in FIG. 5.

Figure 5:
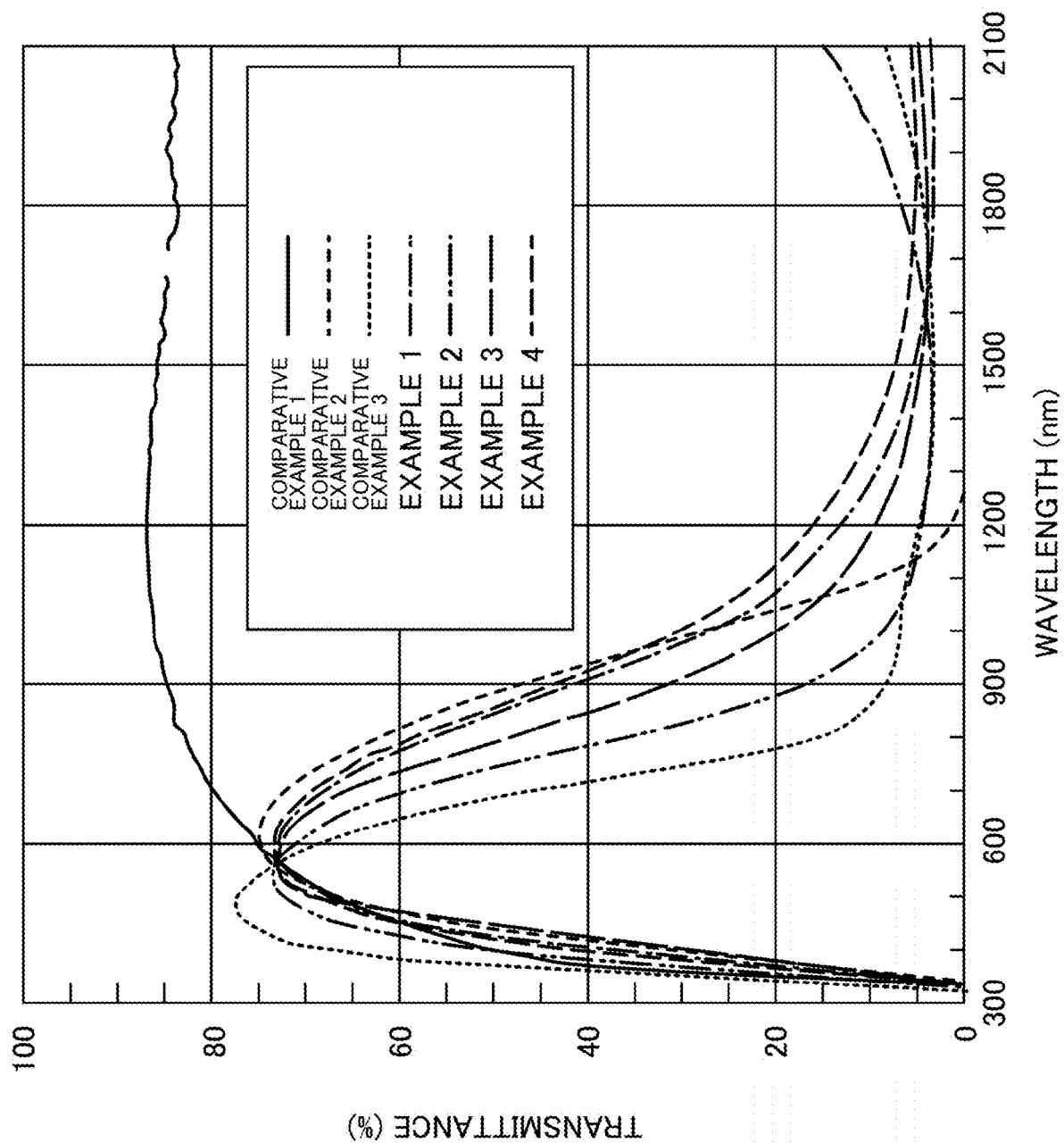
FIG. 5 is spectral transmittance profiles of near-infrared absorbing films prepared in Examples 1 to 4 and Comparative Examples 1 to 3.

According to the profile illustrated in FIG. 5, the strong absorption in the near-infrared region with the bottom of the transmittance near 2100 nm and the high transmittance in the visible light region (380 nm or more and 780 nm or less) are observed.

The visible light transmittance (VLT) and the solar transmittance (ST21) were measured as VLT=72.31% and ST21=46.47%, respectively, which indicates that the film is transparent in visible light and has a strong near-infrared absorption effect.

The color index of the near-infrared absorbing film A was $L^*$=87.91, $a^*$=−2.72, and $b^*$=9.33, indicating a very weak blue color close to a neutral color, that is, a neutral tone. This is evident from the fact that, as indicated in the comparison with the transmission profile of the bluish CWO dispersion film illustrated in Comparative Example 3 in FIG. 5, the transmittance decreases significantly compared with the CWO dispersion film at around 400 nm for the blue wavelength and increases significantly compared with the CWO dispersion film at around 700 nm for the red wavelength.

Figure 7:
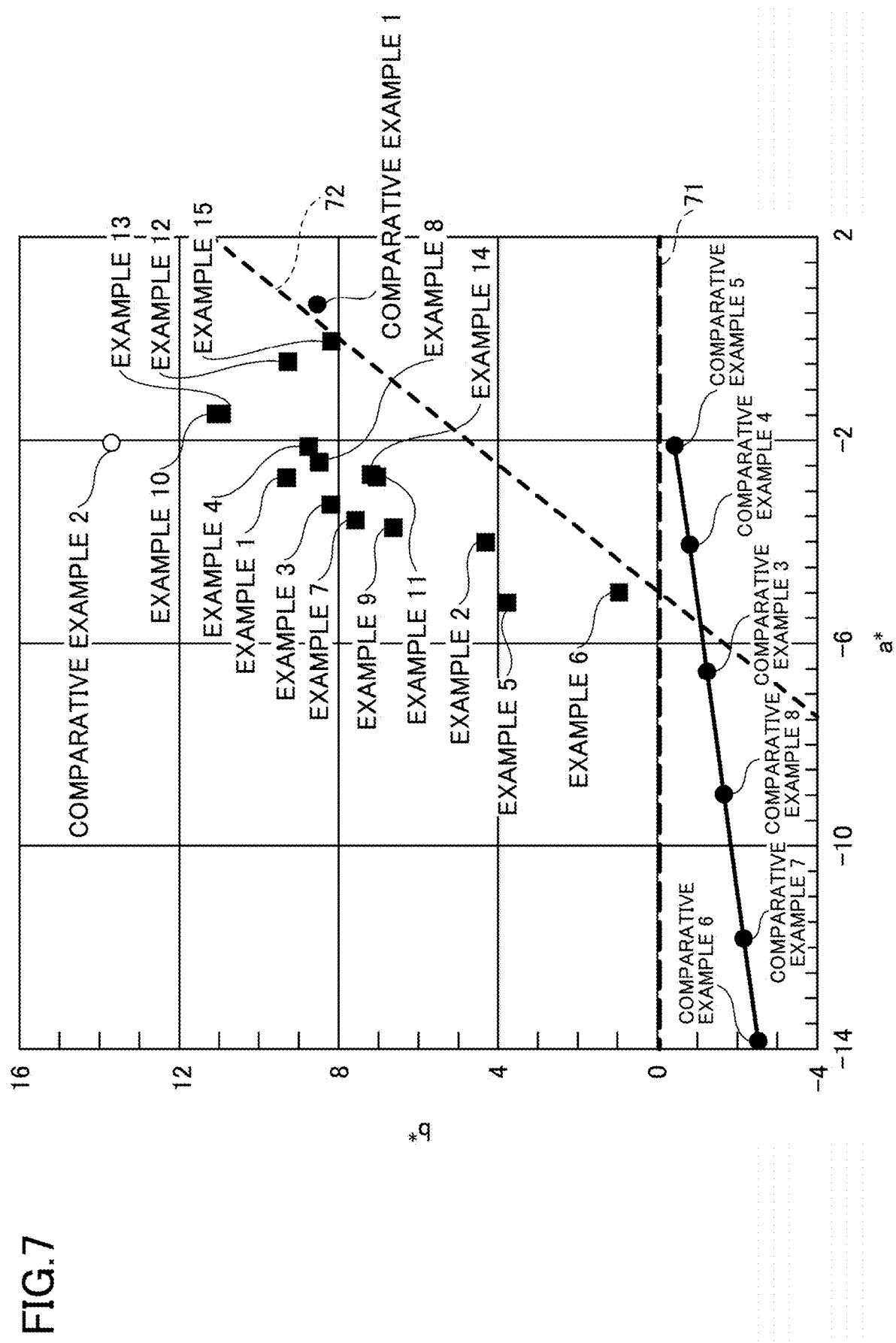
FIG. 7 is a plot of b* values against a* values, which are the Hunter color indices, of near-infrared absorbing particle dispersion bodies prepared in Examples 1 to 15 and Comparative Examples 1 to 8.

In addition, the numerical values of the color index sufficiently satisfy $b^* \geq 0$ and $b^* \geq 1.6 \times a^* + 8.0$ for the $L^*$=88 cross section, as illustrated in FIG. 7. In FIG. 7, a line 71 denotes $b^*$=0 and a line 72 denotes $b^*$=1.6×$a^*$+8.0.

Figure 8:
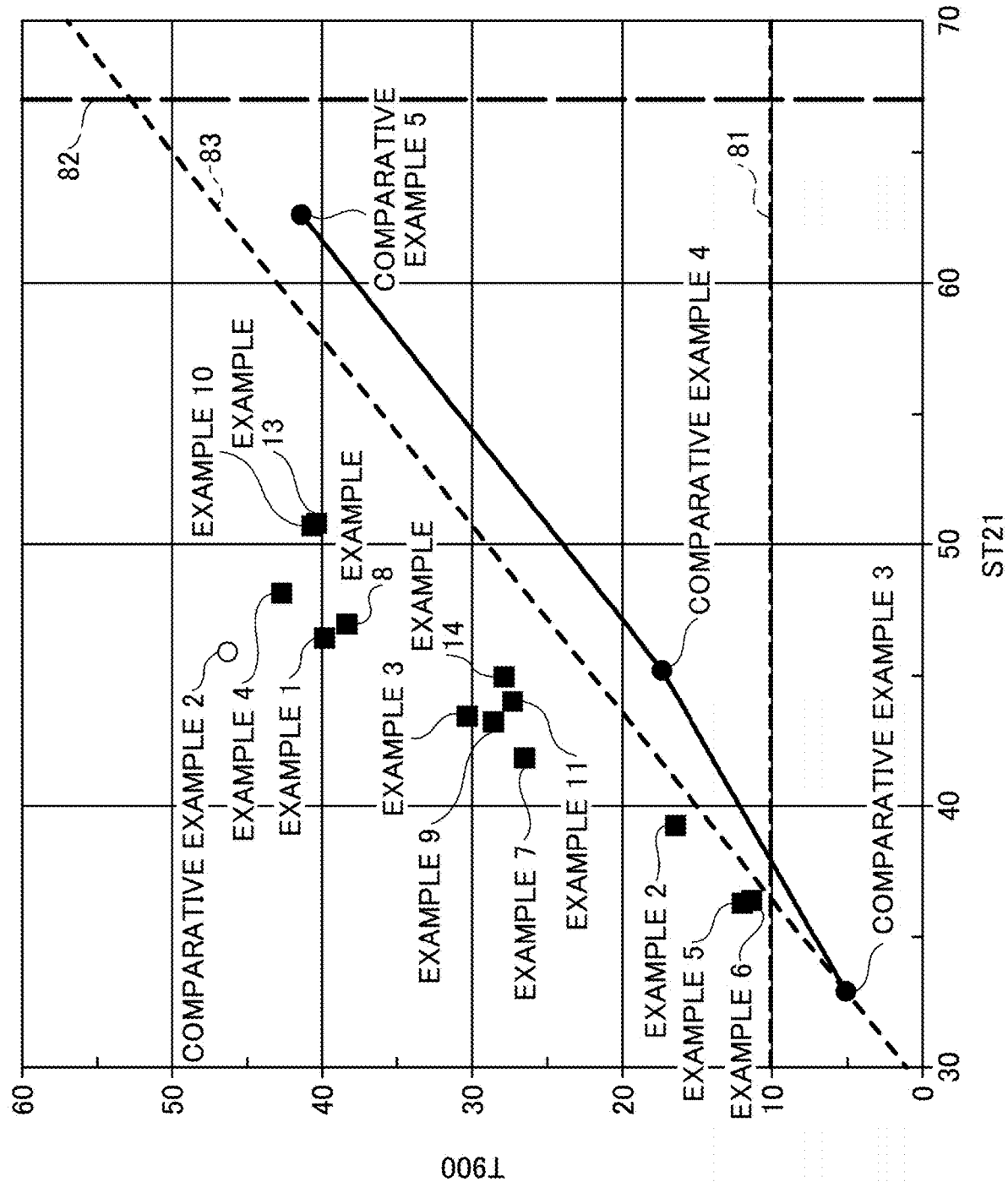
FIG. 8 is a plot of transmittances (T900) at a wavelength of 900 nm against solar transmittances (ST21) of the near-infrared absorbing particle dispersion bodies prepared in Examples 1 to 11, 13, and 14 and Comparative Examples 2 to 5.

Also, as illustrated in FIG. 8, it is found that T900 in the $L^*$=88 cross section is 39.84%, which sufficiently satisfies T900≥10%, and that the solar shielding property ST21 satisfies ST21≤67%, and further sufficiently satisfies T900≥1.4×ST21−41.0, with sufficient sensor wavelength transmittance. In FIG. 8, a line 81 denotes T900=10, a line 82 denotes ST21=67, and a line 83 denotes T900=1.4×ST21−41.0.

Comparative Example 1

(Production and Evaluation of Near-Infrared Absorbing Particles)

The cesium tungsten oxide precursor powder obtained in Example 1 was placed in a carbon boat, heated to 850° C. and held for 20 hours in atmospheric air in a tubular furnace, and once cooled to room temperature, pulverized and mixed by a pulverizing machine. After that, it was heated again to 850° C. in atmospheric air, held for 20 hours, and then cooled to room temperature to obtain a very thin greenish white powder i. The X-ray powder diffraction pattern of this powder i was almost identified as $Cs_4W_{11}O_{35}$ single phase (ICDD 0-51-1891) with a slight mixture of $Cs_6W_{11}O_{36}$ as illustrated in FIG. 2. Chemical analysis of the powder i indicated Cs/W=0.36. The composition ratios of the other components are described in Table 2.

(Production and Evaluation of Near-Infrared Absorbing Particle Dispersion Liquid and Near-Infrared Absorbing Particle Dispersion Body)

Dispersion and pulverization were performed in the same manner as in Example 1 except that the powder i was used to obtain a dispersion liquid i. The color of the dispersion liquid i was grayish white, and the average particle diameter of the near-infrared absorbing particles in the dispersion liquid i was 32.0 nm.

Figure 6:
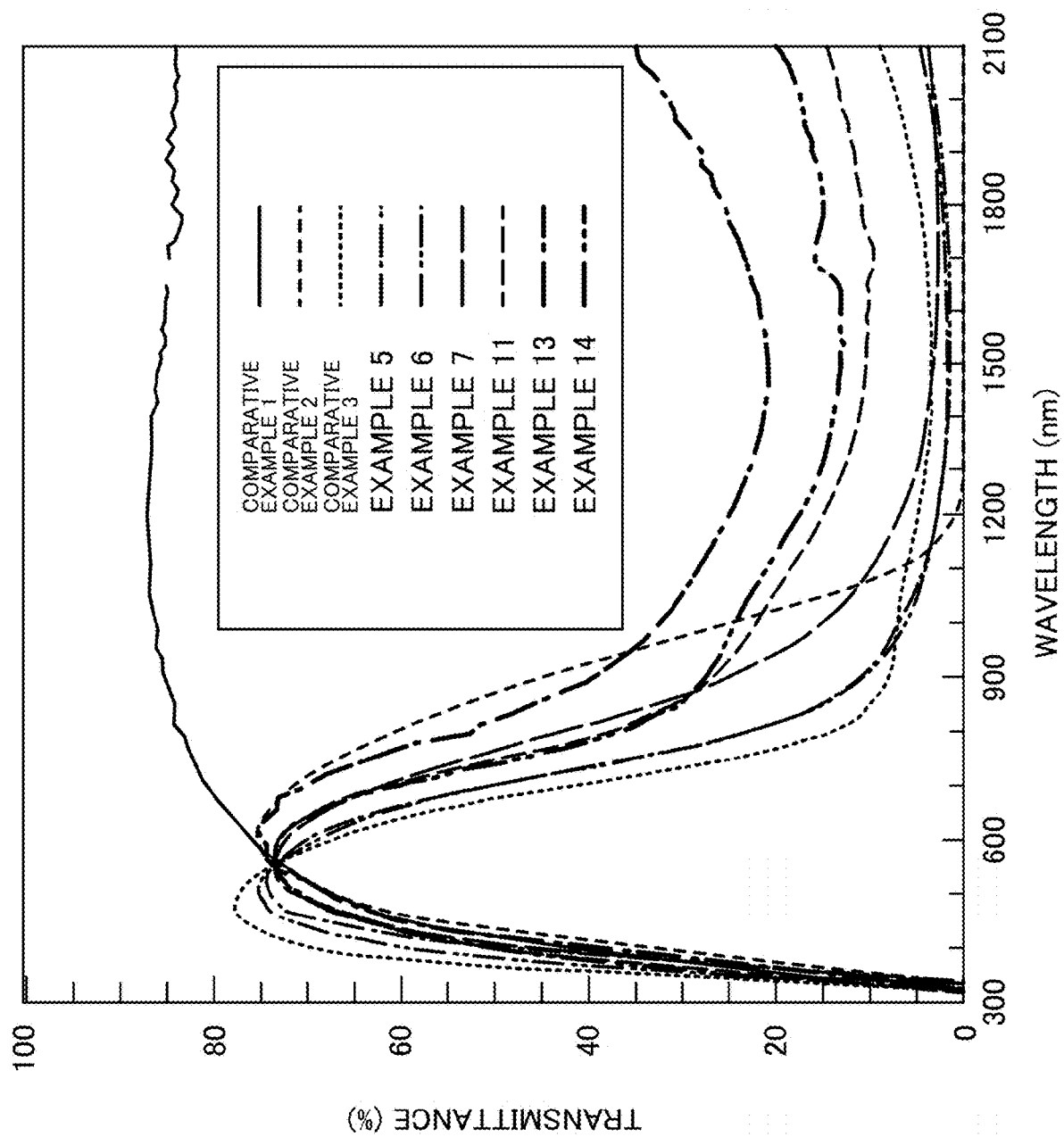
FIG. 6 is spectral transmittance profiles of near-infrared absorbing films prepared in Examples 5 to 7, 11, 13, and 14 and Comparative Examples 1 to 3.

As in the procedure performed in Example 1, ultraviolet curing resin was added to the dispersion liquid i, mixed to obtain a coating solution i, and then a near-infrared absorbing film i was obtained. The transmission profile of the near-infrared absorbing film i is illustrated in FIGS. 5 and 6. VLT=73.33% and ST21=78.73% were obtained as spectroscopic characteristics at this time, and it was found that there was almost no absorption effect of infrared rays.

The Hunter color index was the values of $a^*=0.70$ and $b^*=8.53$ in the $L^*=88$ cross section. These values were found not to satisfy $b^* \geq 1.6 \times a^* + 8.0$ as illustrated in FIG. 7. T900 in the $L^*=88$ cross section was 96.20%, indicating a high transmittance, and T900≥10% was fully satisfied, but in FIG. 8, it was plotted on the right side outside the figure, and the solar shielding property did not satisfy ST21≤67% at all.

Comparative Example 2

A dispersion liquid of colorless, transparent, neutral-toned $In_2O_3$:Sn (hereinafter referred to as "ITO"), which is known as a transparent conductive oxide, was prepared. ITO fine particles are known to have neutral tones, but there are various kinds, ranging from slightly bluish to brownish, depending on the reduction and preparation methods. In this study, an ITO powder (a powder ii) manufactured by ENAM Co., Ltd., which has a nearly pure transparent color, was used.

Dispersion and pulverization were performed in the same manner as in Example 1 except that the powder ii was used to obtain a dispersion liquid ii. The color of the dispersion liquid ii was light blue, and the average particle diameter of particles in the dispersion liquid ii was 30.2 nm.

As in the procedure performed in Example 1, the ultraviolet curing resin was added to the dispersion liquid ii, mixed to obtain a coating solution ii, and then a near-infrared absorbing film ii was obtained. As illustrated in FIG. 5 and FIG. 6, the transmission profile of the near-infrared absorbing film ii peaked around 600 nm and exhibited a curve with high red wavelength transmittance. At this time, VLT=72.33% and ST21=45.94% were obtained, indicating the infrared absorption effect. However, this infrared absorption characteristic was low among the examples.

The Hunter color index was the values of $a^*=-2.04$, $b^*=13.68$ in the $L^*=88$ cross section. These values satisfied $b^* \geq 1.6 \times a^* + 8.0$ in the $L^*=88$ cross section, as illustrated in FIG. 7, indicating the neutrality of the color tone.

T900 in the $L^*=88$ cross section was 46.39%, indicating a high transmittance, and T900≥10% was fully satisfied. It is also found that the solar shielding property satisfies ST21≤67% and T900≥1.4×ST21−41.0 as illustrated in FIG. 8. However, compared with the present invention, ST21 exhibited a higher value and the solar shielding property was lower than the present invention. It is also found that the amount of ITO fine particles required to obtain the same solar shielding property is approximately 5 times that of CPT particles and more ITO raw materials are required.

Comparative Example 3

The cesium tungsten oxide precursor powder obtained in Example 1 was placed in a carbon boat, held at 550° C. for 2 hours under a flow of 1 volume % $H_2$ gas with $N_2$ gas as a carrier, then changed to a flow of 100 volume % $N_2$ gas, held for 1 hour, raised to 800° C., held for 1 hour, and slowly cooled to room temperature to obtain a powder iii. The color of the powder iii was deep blue. The X-ray powder diffraction pattern of the powder i, identified as $Cs_{0.32}WO_3$ single phase (ICDD 0-81-1244), is hexagonal cesium tungsten oxide, as illustrated in FIG. 2. Chemical analysis of the powder iii indicated Cs/W=0.34. The composition ratios of the other components are described in Table 2.

Dispersion and pulverization were performed in the same manner as in Example 1 except that the powder iii was used to obtain a dispersion liquid iii. The color of the dispersion liquid iii was blue, and the average particle diameter of the particles in the dispersion liquid iii was 24.6 nm.

As in the procedure performed in Example 1, the ultraviolet curing resin was added to the dispersion liquid iii and mixed to obtain a coating solution iii, and then the near-infrared absorbing film iii was obtained. The transmission profile of the near-infrared absorbing film iii, as illustrated in FIG. 5 and FIG. 6, exhibited a curve with high blue wavelength transmittance, and VLT=72.19% and ST21=32.88% were obtained as spectroscopic characteristics, indicating the very excellent infrared absorption effect.

However, the Hunter color index, as illustrated in FIG. 7, was the values of $a^*=-6.57$ and $b^*=-1.25$ in the $L^*=88$ cross section, and the b* value became negative, indicating a color tone in which blue is prominent. However, $b^* \geq 1.6 \times a^* + 8.0$ was satisfied.

As illustrated in FIG. 8, the solar shielding property fully satisfied ST21≤67% and excellent solar shielding property was observed, but T900≥1.4×ST21−41.0 was not satisfied and T900 in the $L^*=88$ cross section was as small as 4.85%, indicating the sensor wavelength transmittance was low.

Figure 9A:
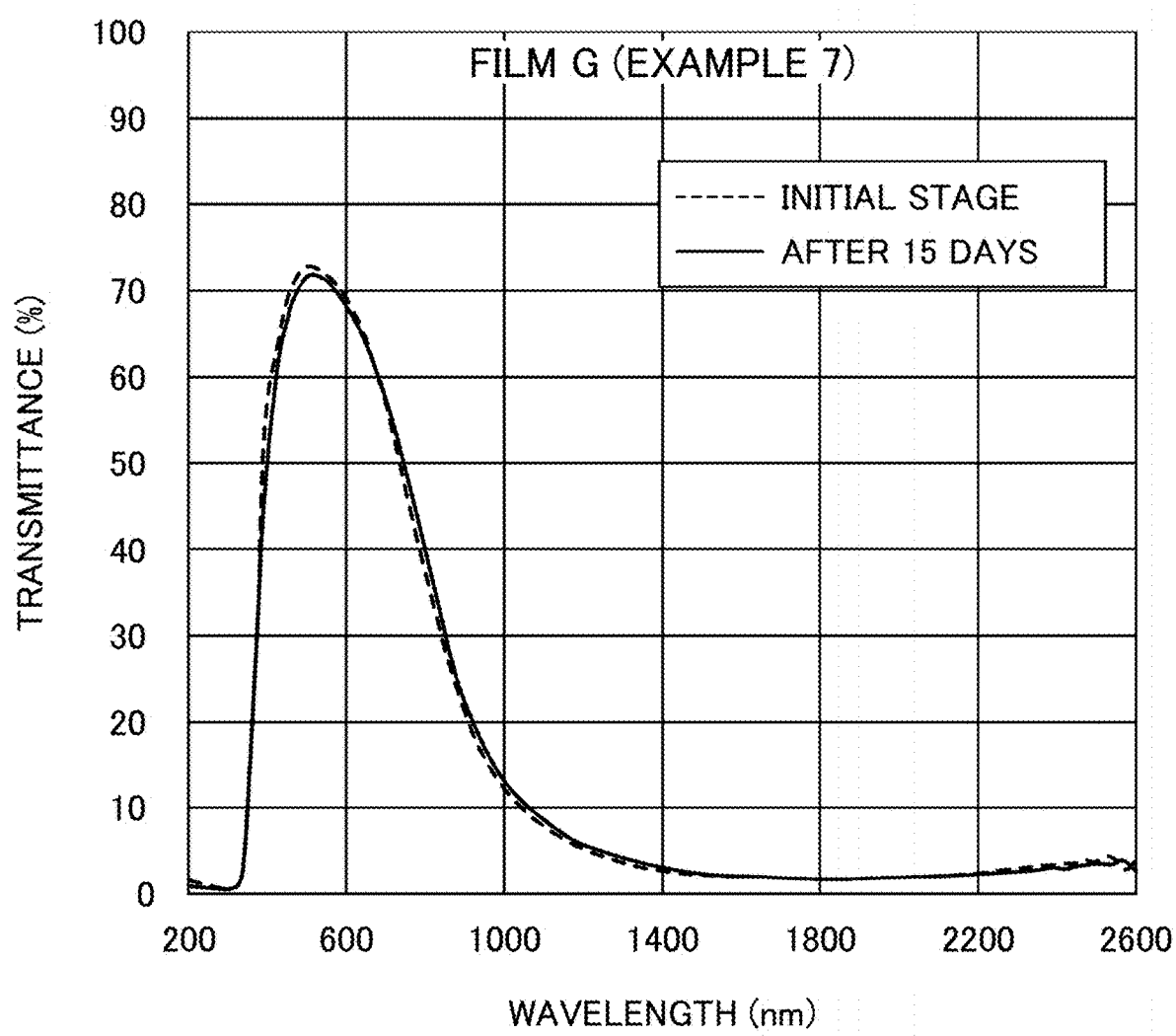
FIG. 9A is a diagram illustrating wet and heat resistance of the near-infrared absorbing film prepared in Example 7.
Figure 9B:
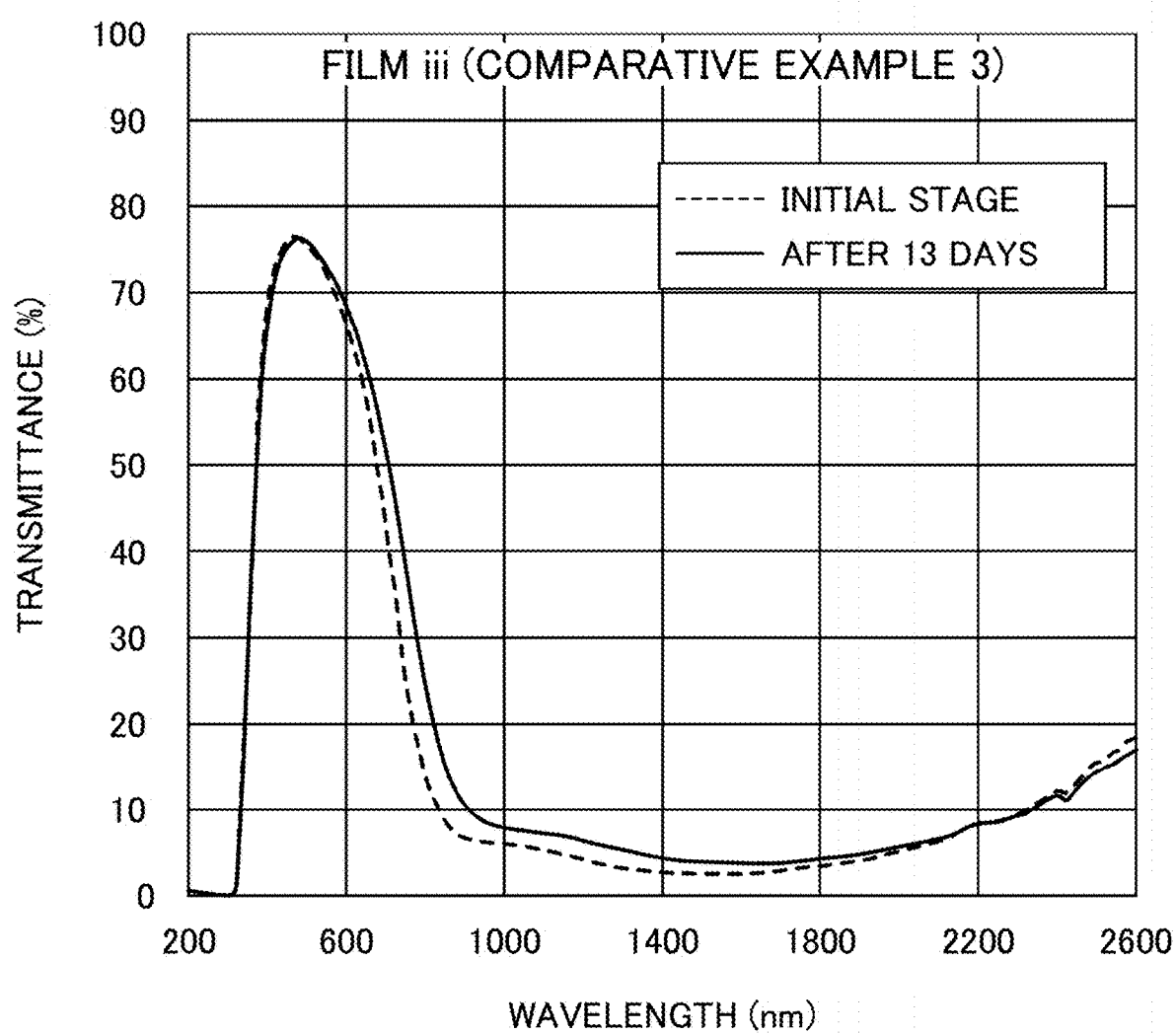
FIG. 9B is a diagram illustrating wet and heat resistance of the near-infrared absorbing film prepared in Comparative Example 3.

Further, the near-infrared absorbing film iii was placed in a constant temperature and humidity machine, and after it was kept in an environment with a temperature of 85° C. and a relative humidity of 90% for 13 days, the transmission profile was measured and compared with the profile before the holding ("initial stage" in the drawings). The results are illustrated in FIG. 9B.

Comparative Example 4 to Comparative Example 8

A series of near-infrared absorbing films iv to viii with different particle concentrations were prepared by appropriately changing the MIBK dilution ratio of the near-infrared absorbing particles coating solution iii prepared in Comparative Example 3. The values of the optical properties are summarized in Table 2. The tones of the films are b*<0 when viewed in a*-b* space of the L*=88 cross section illustrated in FIG. 7, and the bluish tones are not improved. That is, the blueness remains even when the CWO dispersion liquid with blue tones is simply diluted, suggesting that the physical properties of the material itself must be changed to improve the tones. As for the sensor wavelength transmittance, as illustrated in FIG. 8, Comparative Example 4 and Comparative Example 5 had too weak infrared absorption and did not satisfy T900≥1.4×ST21−41.0. Except for Comparative Example 4 and Comparative Example 5, T900<10, which is too low.

Although the color tone (especially a*), T900 and ST21 can be changed by changing the concentration of near-infrared absorbing particles in the film in this way, it can be seen that the physical properties and electronic structure of the material itself need to be changed to satisfy every condition in a balanced manner.

Example 2

(Production and Evaluation of Near-Infrared Absorbing Particles)

The cesium tungsten oxide precursor powder produced in Example 1 was placed in a heated muffle furnace on an alumina boat, and the temperature was raised to 150° C. under the flow of 100 volume % nitrogen gas. The gas supplied here was changed to a gas (in Table 1, it is described as "1% $H_2$—49% $N_2$—50% superheated $H_2O$") of 50:1:49 volume ratio of superheated stream, hydrogen gas, and nitrogen gas, and the temperature was raised to 550° C. and held for 1 hour under the flow of the mixture gas. This was cooled to room temperature as it was, and a light blue powder B was obtained (the first heat treatment step).

The X-ray powder diffraction pattern of this powder, as illustrated in FIG. 2, has broad diffraction lines and exhibited a pattern in which hexagonal $Cs_{0.32}WO_3$ is the main phase and the diffraction lines of orthorhombic $Cs_4W_{11}O_{35}$ and $(Cs_2O)_{0.44}W_2O_6$ phase of the pyrochlore phase are mixed as different phases. The diffraction lines of this pyrochlore phase are broad and the reflection position is slightly shifted. It is considered that O derived from water, OH, $OH_2$, and $OH_3$ were incorporated into the pyrochlore cavity. The (111) plane of the cubic pyrochlore phase is a plane with hexagonal symmetry similar to the hexagonal base, and the pyrochlore cavity corresponds to the void in the hexagonal or trigonal cavity in the hexagonal crystal. The XRD powder patterns in other Examples were often observed to contain a small amount of reflection of the pyrochlore phase.

When one particle of the powders was observed by transmission electron microscope from the (0001) direction, the position of the prismatic plane spot appearing in the electron diffraction image was only one short, and it was accompanied by a weak streak. Therefore, it was found to be a orthorhombic crystal in which a hexagonal crystal was modulated by prismatic plane defects.

Chemical analysis of the powder B indicated Cs/W=0.32. The composition ratios of the other components are described in Table 2.

(Production and Evaluation of Near-Infrared Absorbing Particle Dispersion Liquid and Near-Infrared Absorbing Particle Dispersion Body)

A dispersion liquid B was obtained in the same manner as in Example 1 except that the prepared powder B was used. The average particle diameter of the near-infrared absorbing particles in the dispersion liquid B was measured to be 26.3 nm by dynamic light scattering.

In the same manner as in Example 1 except that the dispersion liquid B was used, a coating film was formed on the PET film, and the ultraviolet curing resin was cured to prepare a near-infrared absorbing film B with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film B obtained by U-4100 spectrophotometer manufactured by Hitachi High-Tech Co., Ltd. is illustrated in FIG. 5. According to the profile illustrated in FIG. 5, strong absorption in the near-infrared region with transmittance bottoms around 1405 nm and transmission in the visible light region of 380 nm or more and 780 nm or less were observed. It was observed that the transmittance in the blue region significantly decreased compared with the near-infrared absorbing film iii in Comparative Example 3, and that the transmittance of near-infrared light near 900 nm remarkably decreased compared with the near-infrared absorbing film ii using ITO in Comparative Example 2.

The visible light transmittance (VLT) and the solar transmittance (ST21) were measured to be VLT=72.20% and ST21=39.29%, respectively, indicating that the film is transparent in visible light and has a strong near-infrared absorption effect.

The color indices of the near-infrared absorbing film B were L*=87.93, a*=−4.02, and b*=4.29, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6× a*+8.0 in the L*=88 cross section, as illustrated in FIG. 7.

It was also found, as illustrated in FIG. 8, that T900 in the L*=88 cross section is 16.32% and satisfies T900≥10%, indicating the sensor wavelength transmission, and that the solar shielding property sufficiently satisfies T900≥1.4× ST21−41.0 while satisfying ST21≤67%, with sufficient sensor wavelength transmittance.

Example 3

(Production and Evaluation of Near-Infrared Absorbing Particles)

The light blue powder B obtained in Example 2 was laid on a carbon boat and held at 550° C. for 2 hours under the flow of 1 volume % $H_2$—Ar. Next, the gas to be supplied was changed to 100 volume % nitrogen gas, which was held at 550° C. for 0.5 hours under the flow of the nitrogen gas, then warmed and held at 800° C. for 1 hour. By lowering the temperature to room temperature, a light blue powder C was obtained (the second heat treatment step).

Chemical analysis of the powder C yielded a Cs/W ratio of 0.31 in terms of the mass ratio. The composition ratios of the other components are described in Table 2.

As illustrated in FIG. 2, the X-ray powder diffraction pattern of the powder C has a broader diffraction line compared to Examples 1 and 2, and was a mixed pattern of the diffraction lines of hexagonal $Cs_{0.32}WO_3$ and orthorhombic $Cs_4W_{11}O_{35}$. However, the diffraction line position and intensity of $Cs_4W_{11}O_{35}$ did not completely match the ICDD data.

When one particle of the powder was observed by transmission electron microscope from the (0001) direction, the position of the prismatic plane spot appearing in the electron diffraction image was only one short, and it was accompanied by a weak streak. Therefore, it was found to be a orthorhombic crystal in which a hexagonal crystal was modulated by prismatic plane defects.

(Production and Evaluation of Near-Infrared Absorbing Particle Dispersion Liquid and Near-Infrared Absorbing Particle Dispersion Body)

A dispersion liquid C was prepared in the same manner as in Example 1 except that powder C was used. The average particle diameter of near-infrared absorbing particles in the dispersion liquid C was measured to be 29.6 nm by dynamic light scattering.

In the same manner as in Example 1 except that the dispersion liquid C was used, a coating film was formed on the PET film, and the ultraviolet curing resin was cured to prepare near-infrared absorbing film C with a coating layer containing near-infrared absorbing particles. The coating layer is the near-infrared absorbing particle dispersion body, and the near-infrared absorbing film is one form of the near-infrared absorbing transparent base material.

The spectral transmittance profiles of the obtained near-infrared absorbing film C is illustrated in FIG. 5. Strong absorption in the near-infrared region with a bottom around 1800 nm and transmission in the visible light region were observed. Transmittance in the blue and red regions decreased and increased, respectively, compared with the near-infrared absorbing film iii in Comparative Example 3, and the color tone was improved to a neutral color. In addition, transmittance of near-infrared light near 900 nm was significantly decreased compared with the near-infrared absorbing film ii using ITO in Comparative Example 2, and it was observed that the near-infrared absorption effect was stronger than that of the near-infrared absorbing film ii using ITO.

VLT=72.31% and ST21=43.45% were measured, illustrating that the film is transparent in visible light and has a stronger near-infrared absorption effect. The color index of the near-infrared absorbing film C is $L^*$=87.93, $a^*$=−3.24, and $b^*$=8.19, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy $b^*$≥0 and $b^*$≥1.6×$a^*$+8.0 in the $L^*$=88 cross section, as illustrated in FIG. 7.

Also, as illustrated in FIG. 8, it was found that T900 in the $L^*$=88 cross section is 30.10% and satisfies T900≥10%, indicating the sensor wavelength transmission, and that the solar shielding property satisfies T900≥1.4×ST21−41.0 while satisfying ST21≤67%.

Example 4

(Production and Evaluation of Near-Infrared Absorbing Particles)

The pale light blue powder B obtained in Example 2 was spread on a carbon boat, heated under the flow of 100 volume % Ar, and held at 800° C. for 1 hour. Then, the temperature was lowered to room temperature to obtain light blue powder D.

The X-ray powder diffraction pattern of the powder D has broad diffraction lines as illustrated in FIG. 2, and exhibited a mixed pattern of diffraction lines of hexagonal $Cs_{0.32}WO_3$ and orthorhombic $Cs_4W_{11}O_{35}$. The diffraction line position and intensity of $CS_4W_{11}O_{35}$ did not completely match the ICDD data.

When one of the powders was observed by transmission electron microscope from the (0001) direction, the position of the prismatic plane spot appearing in the electron diffraction image was only one short and was accompanied by a weak streak. Therefore, it was found to be a orthorhombic crystal in which a hexagonal crystal was modulated by prismatic plane defects.

Chemical analysis of the powder D indicated Cs/W=0.33. The composition ratios of the other components are described in Table 2.

(Production and Evaluation of Near-Infrared Absorbing Particle Dispersion Liquid and Near-Infrared Absorbing Particle Dispersion Body)

A dispersion liquid D was obtained in the same manner as in Example 1 except that prepared powder D was used.

The average particle diameter of near-infrared absorbing particles in the dispersion liquid D was measured to be 32.1 nm by dynamic light scattering.

In the same manner as in Example 1, except that the dispersion liquid D was used, a coating film was formed on the PET film, and the ultraviolet curing resin was cured to prepare a near-infrared absorbing film D with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film D is illustrated in FIG. 5. Strong absorption in the near-infrared region with a bottom around 1950 nm and transmission in the visible light region were observed. Transmittance in the blue and red regions decreased and increased, respectively, compared with the near-infrared absorbing film iii in Comparative Example 3, and the color tone was improved to a neutral color. In addition, transmittance of near-infrared light near 900 nm was significantly decreased compared with the near-infrared absorbing film ii using ITO in Comparative Example 2, and it was observed that the near-infrared absorption effect was stronger than that of the near-infrared absorbing film ii using ITO.

VLT=72.20% and ST21=48.19% were measured, illustrating that the film is transparent in visible light and has a stronger near-infrared absorption effect. The color indices of the near-infrared absorbing film D are $L^*$=87.85, $a^*$=−2.11, and $b^*$=8.75, indicating a weak blue color close to a neutral color, that is, a neutral tone. In the dilute dispersion film of the near-infrared absorbing particles at VLT=70 to 80%, which is the range used for automobile windshields, it can be said that the film is hardly bluish. These values satisfy $b^*$≥0 and $b^*$≥1.6×$a^*$+8.0 in the $L^*$=88 cross section, as illustrated in FIG. 7.

It is also found, as illustrated in FIG. 8, that T900 in the $L^*$=88 cross section is 42.56% and satisfies T900≥10%, indicating the sensor wavelength transmission, and that the solar shielding property satisfies T900≥1.4×ST21−41.0 while satisfying ST21≤67%.

Example 5

(Production and Evaluation of Near-Infrared Absorbing Particles)

The pale light blue powder B obtained in Example 2 was spread on a carbon boat and heated to 800° C. under the flow of 100 volume % Ar. Here, the gas to be supplied was changed to 1 volume % $H_2$—Ar and held at 800° C. for 10 minutes under the flow of the gas. Then, the temperature was lowered to room temperature to obtain a light blue powder E.

The X-ray powder diffraction pattern of the powder E has broad diffraction lines as illustrated in FIG. 2, and exhibited a mixed pattern of diffraction lines of hexagonal $Cs_{0.32}WO_3$ and orthorhombic $Cs_4W_{11}O_{35}$. The diffraction line position and intensity of $Cs_4W_{11}O_{35}$ did not completely match the ICDD data.

When one particle of the powder was observed by transmission electron microscope from the (0001) direction, the position of the prismatic plane spot appearing in the electron diffraction image was only one short, and it was accompanied by a weak streak. Therefore, it was found to be a orthorhombic crystal in which a hexagonal crystal was modulated by prismatic plane defects.

Chemical analysis of the powder E indicated Cs/W=0.32. The composition ratios of the other components are described in Table 2.

(Production and Evaluation of Near-Infrared Absorbing Particle Dispersion Liquid and Near-Infrared Absorbing Particle Dispersion Body)

A dispersion liquid E was obtained in the same manner as in Example 1 except that prepared powder E was used.

The average particle diameter of the near-infrared absorbing particles in the dispersion liquid E was measured to be 25.0 nm by dynamic light scattering.

In the same manner as in Example 1 except that the dispersion liquid E was used, a coating film was formed on the PET film, and the ultraviolet curing resin was cured to prepare the near-infrared absorbing film E with a coating layer containing the near-infrared absorbing particles. The coating layer is the near-infrared absorbing particle dispersion body, and the near-infrared absorbing film is one form of a near-infrared absorbing transparent base material.

The spectral transmittance profiles of the obtained near-infrared absorbing film E is illustrated in FIG. 6. Strong absorption in the near-infrared region with a bottom around 1600 nm and transmission in the visible light region were observed. Transmittance in the blue and red regions decreased and increased, respectively, compared with the near-infrared absorbing film iii in Comparative Example 3, and the color tone was improved to a neutral color. In addition, transmittance of near-infrared light near 900 nm was significantly decreased compared with the near-infrared absorbing film ii using ITO in Comparative Example 2, and it was observed that the near-infrared absorption effect was stronger than that of the near-infrared absorbing film ii using ITO.

VLT=72.38% and ST21=36.29% were measured and found to be transparent in visible light and to have a strong near-infrared absorption effect. The color indices of the near-infrared absorbing film E were $L^*$=88.12, $a^*$=−5.17, and $b^*$=3.79, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy $b^*\geq 0$ and $b^*\geq 1.6\times a^*+8.0$ in the $L^*$=88 cross section, as illustrated in FIG. 7.

It is also found, as illustrated in FIG. 8, that T900 in the $L^*$=88 cross section is 11.80% and satisfies T900≥10%, indicating the sensor wavelength transmission, and that the solar shielding property satisfies T900≥1.4×ST21−41.0 while satisfying ST21≤67%.

Example 6

(Production and Evaluation of Near-Infrared Absorbing Particle Dispersion Liquid and Near-Infrared Absorbing Particle Dispersion Body)

A dispersion liquid F was obtained in the same manner as in Example 1 except that the light blue powder E obtained in Example 5 was used and the dispersion time was doubled.

The average particle diameter of near-infrared absorbing particles in the dispersion liquid F was measured to be 23.7 nm by dynamic light scattering.

In the same manner as in Example 1 except that the dispersion liquid F was used, a coating film was formed on the PET film, and the ultraviolet curing resin was cured to prepare a near-infrared absorbing film F with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film F is illustrated in FIG. 6. Strong absorption in the near-infrared region with a bottom around 1600 nm and transmission in the visible light region were observed. The profile was almost the same as that of the near-infrared absorbing film E made in Example 5, except that the transmittance in the blue region was slightly increased. The average particle diameter decreased with increasing dispersion time, and therefore the transmittance of the blue wavelength increased due to the effect of Mie scattering. Although the color tone was slightly bluer compared to Example 5, the transmission profile indicated that the color tone was improved compared to the near-infrared absorbing film iii in Comparative Example 3.

VLT=72.28% and ST21=36.40% were measured, indicating that the film is transparent in visible light and has a strong near-infrared absorption effect. The color indices of the near-infrared absorbing film F are $L^*$=88.15, $a^*$=−5.00, and $b^*$=0.93, indicating a weak blue color close to a neutral color, that is, a neutral tone, compared with the near-infrared absorbing film iii in Comparative Example 3.

These values are found to satisfy $b^*\geq 0$ and $b^*\geq 1.6\times a^*+8.0$ in the $L^*$=88 cross section, as illustrated in FIG. 7.

It is also found, as illustrated in FIG. 8, that T900 in the $L^*$=88 cross section is 11.24% and satisfies T900≥10%, indicating the sensor wavelength transmission, and that the solar shielding property satisfies T900≥1.4×ST21−41.0 while satisfying ST21≤67%.

Example 7

(Production and Evaluation of Near-Infrared Absorbing Particles)

The pale light blue powder B obtained in Example 2 was laid on a carbon boat and held for 30 minutes at 500° C. under the flow of 1 volume % $H_2$—Ar. Next, the gas supplied was changed to 100 volume % nitrogen gas and held for 30 minutes at 550° C. under the flow of the nitrogen gas, and then further warmed to 800° C. for 1 hour. Then, the temperature was lowered to room temperature to obtain light blue powder G.

The X-ray powder diffraction pattern of the powder G has broad diffraction lines as illustrated in FIG. 2, and exhibited a mixed pattern of diffraction lines of hexagonal $Cs_{0.32}WO_3$ and orthorhombic $Cs_4W_{11}O_{35}$. The diffraction line position and intensity of $CS_4W_{11}O_{35}$ did not completely match the ICDD data.

When one particle of the powder was observed by transmission electron microscope from the (0001) direction, the position of the prismatic plane spot appearing in the electron diffraction image was only one short, and it was accompanied by a weak streak. Therefore, it was found to be a orthorhombic crystal in which a hexagonal crystal was modulated by prismatic plane defects.

Chemical analysis of the powder G indicated Cs/W=0.31. The composition ratios of the other components are described in Table 2.

(Production and Evaluation of Near-Infrared Absorbing Particle Dispersion Liquid and Near-Infrared Absorbing Particle Dispersion Body)

A dispersion liquid G was obtained in the same manner as in Example 1 except that prepared powder G was used.

The average particle diameter of near-infrared absorbing particles in the dispersion liquid G was measured to be 31.8 nm by dynamic light scattering.

In the same manner as in Example 1 except that the dispersion liquid G was used, a coating film was formed on the PET film, and the ultraviolet curing resin was cured to prepare a near-infrared absorbing film G with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film G is illustrated in FIG. 6. Strong absorption in the near-infrared region with a bottom around 1850 nm and transmission in the visible light region were observed. Transmittance in the blue and red regions decreased and increased, respectively, compared with the near-infrared absorbing film iii in Comparative Example 3, and the color tone was improved to a neutral color. In addition, transmittance of near-infrared light near 900 nm was significantly decreased compared with the near-infrared absorbing film ii using ITO in Comparative Example 2, and it was observed that the near-infrared absorption effect was stronger than that of the near-infrared absorbing film ii using ITO.

VLT=72.29% and ST21=41.88% were measured, illustrating that the film is transparent in visible light and has a stronger near-infrared absorption effect. The color index of the near-infrared absorbing film G is $L^*=87.94$, $a^*=-3.54$, and $b^*=7.59$, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy $b^*\geq 0$ and $b^*\geq 1.6\times a^*+8.0$ in the $L^*=88$ cross section, as illustrated in FIG. 7.

Also, as illustrated in FIG. 8, it was found that T900 in the $L^*=88$ cross section is 26.36% and satisfies T900≥10%, indicating the sensor wavelength transmission, and that the solar shielding property satisfies T900≥1.4×ST21−41.0 while satisfying ST21≤67%.

After the near-infrared absorbing film G was placed in a thermostatic hygroscopic machine and kept in an environment with a temperature of 85° C. and a relative humidity of 90% for 15 days, the transmission profile was measured and compared with the profile before holding. The results are illustrated in FIG. 9A. As described above, a similar test was performed on the near-infrared absorbing film iii made in Comparative Example 3 (the retention period being 13 days) and compared with the pre-test profile. As a result, as illustrated in FIG. 9 A and FIG. 9B, the change of ST21 in the near-infrared absorbing film G of Example 7 was almost unchanged at 0.04%, while in the near-infrared absorbing film iii of Comparative Example 3, it was observed that the intensity of near-infrared absorption slightly decreased and ST21 changed by 3.47%.

Example 8

A total of 20 g of cesium carbonate ($Cs_2CO_3$) and tungsten trioxide ($WO_3$) were weighed, mixed and kneaded to a molar ratio of $Cs_2CO_3:WO_3=1:10$, and the obtained kneaded material was placed in a carbon boat and dried in air at 110° C. for 12 hours. Cesium tungsten oxide precursor powder, which is a raw material for compounds containing Cs and W, was thus obtained.

Then, the first heat treatment step was performed under the same conditions as in Example 2 except that the cesium tungsten oxide precursor powder mentioned above was used.

The powder obtained in the first heat treatment step was spread on a carbon boat, and the temperature was raised to 800° C. in a stream of 100 volume % Ar. Then, the gas to be supplied was changed to a 1 volume % $H_2$—Ar stream, and it was kept at 800° C. for 10 minutes under the flow of the gas, and the temperature was lowered to room temperature to obtain a light blue powder H.

The X-ray powder diffraction pattern of the powder H exhibited a broad diffraction line and a mixed pattern of the diffraction lines of hexagonal $Cs_{0.20}WO_3$ (ICDD 0-083-1333) and orthorhombic $Cs_4W_{11}O_{35}$. The diffraction line position and intensity of $Cs_4W_{11}O_{35}$ did not completely match the ICDD data.

When one particle of the powder was observed by transmission electron microscope from the (0001) direction, the position of the prismatic plane spot appearing in the electron diffraction image was only one short, and it was accompanied by a weak streak. Therefore, it was identified to be a orthorhombic crystal in which a hexagonal crystal was modulated by prismatic plane defects.

Chemical analysis of the powder H indicated Cs/W=0.20. The composition ratios of the other components are described in Table 2.

(Production and Evaluation of Near-Infrared Absorbing Particle Dispersion Liquid and Near-Infrared Absorbing Particle Dispersion Body)

A dispersion liquid H was obtained in the same manner as in Example 1 except that prepared powder H was used.

The average particle diameter of near-infrared absorbing particles in the dispersion liquid H was measured to be 28.6 nm by dynamic light scattering.

In the same manner as in Example 1 except that the dispersion liquid H was used, a coating film was formed on the PET film, and the ultraviolet curing resin was cured to prepare a near-infrared absorbing film H with a coating layer containing near-infrared absorbing particles. The coating layer is a near-infrared absorbing particle dispersion body, and the near-infrared absorbing film is one form of a near-infrared absorbing transparent base material.

From the spectral transmittance profiles of the obtained near-infrared absorbing film H, measured VLT=72.32% and ST21=46.98%, it was found to be transparent in visible light and to have a strong near-infrared absorption effect. The color indices of the near-infrared absorbing film H were $L^*=88.04$, $a^*=-2.40$, and $b^*=8.51$, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6×a*+8.0 in the L*=88 cross section, as illustrated in FIG. 7.

It is also found, as illustrated in FIG. 8, that T900 in the L*=88 cross section is 38.30% and satisfies T900≥10%, indicating the sensor wavelength transmission, and that the solar shielding property satisfies T900≥1.4×ST21−41.0 while satisfying ST21≤67%.

Example 9

A total of 20 g of cesium carbonate ($Cs_2CO_3$) and tungsten trioxide ($WO_3$) were weighed, mixed and kneaded to achieve a molar ratio of $Cs_2CO_3:WO_3=3:10$, and the obtained kneaded material was placed in a carbon boat and dried in air at 110° C. for 12 hours. Cesium tungsten oxide precursor powder, which is a raw material for compounds containing Cs and W, was thus obtained.

Then, the first heat treatment step was performed under the same conditions as in Example 2 except that the cesium tungsten oxide precursor powder mentioned above was used.

The powder obtained in the first heat treatment step was spread on a carbon boat, and the temperature was raised to 800° C. in a stream of 100 volume % Ar. Then, the gas to be supplied was changed to 1 volume % $H_2$—Ar, and after holding at 800° C. for 10 minutes under the flow of the gas, the temperature was lowered to room temperature to obtain light blue powder I.

The X-ray powder diffraction pattern of the powder I had a broad diffraction line and exhibited a pattern in which rhombohedral $Cs_6W_{11}O_{36}$ and $Cs_{8.5}W_{15}O_{48}$ were the main phases with a slight mixture of the diffraction lines of hexagonal $Cs_{0.32}WO_3$ and tetragonal $Cs_2W_3O_{10}$. However, the diffraction line positions and intensities of $Cs_6W_{11}O_{36}$ and $Cs_{8.5}W_{15}O_{48}$ did not completely match the ICDD data.

When one particle of the powders was observed by transmission electron microscope from the (0001) direction, the positions of prismatic plane spots appearing in the electron diffraction image differed beyond the experimental error range in all three particles. Therefore, it was found that a rhombohedral crystal in which a hexagonal crystal was modulated by basal plane defects, is dominant.

Chemical analysis of the powder I indicated Cs/W=0.59. The composition ratios of the other components are described in Table 2.
(Production and Evaluation of Near-Infrared Absorbing Particle Dispersion liquid and Near-Infrared Absorbing Particle Dispersion Body)

A dispersion liquid I was obtained in the same manner as in Example 1 except that prepared powder I was used.

The average particle diameter of near-infrared absorbing particles in dispersion liquid I was measured to be 30.4 nm by dynamic light scattering.

In the same manner as in Example 1, except that the dispersion liquid I was used, a coating film was formed on the PET film and the ultraviolet curing resin was cured to prepare near-infrared absorbing film I with a coating layer containing near-infrared absorbing particles. The coating layer is a near-infrared absorbing particle dispersion body, and the near-infrared absorbing film is one form of a near-infrared absorbing transparent base material.

From the spectral transmittance profiles of the obtained near-infrared absorbing film I, measured VLT=72.27% and ST21=43.25%, it was found that the film is transparent in visible light and has a strong near-infrared absorption effect. The color indices of the near-infrared absorbing film I are L*=87.97, a*=−3.70, and b*=6.61, indicating a weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6×a*+8.0 in the L*=88 cross section, as illustrated in FIG. 7.

It is also found, as illustrated in FIG. 8, that T900 in the L*=88 cross section is 28.51% and satisfies T900≥10%, indicating the sensor wavelength transmission, and that the solar shielding property satisfies T900≥1.4×ST21−41.0 while satisfying ST21≤67%.

Example 10

A total of 20 g of cesium carbonate ($Cs_2CO_3$) and tungsten trioxide ($WO_3$) were weighed, mixed and kneaded to achieve a molar ratio of $Cs_2CO_3:WO_3=2:11$, and the obtained kneaded material was placed in a carbon boat and dried in air at 110° C. for 12 hours. Thus, cesium tungsten oxide precursor powder, which is a raw material for compounds containing Cs and W, was obtained.

Then, the first heat treatment step was performed under the same conditions as in Example 2 except that the above-mentioned cesium tungsten oxide precursor powder was used, and a pale green powder J was obtained.

The X-ray powder diffraction pattern of the powder J had a broad diffraction line and exhibited a pattern in which pyrochlore phase $(Cs_2O)_{0.44}W_2O_6$ was the main phase with a slight mixture of the diffraction lines of hexagonal $Cs_{0.32}WO_3$ and orthorhombic $Cs_4W_{11}O_{35}$. However, the diffraction line positions and intensities of $(Cs_2O)_{0.44}W_2O_6$ and $Cs_4W_{11}O_{35}$ did not completely match the ICDD data.

From transmission electron microscopy of the powder, a cubic electron diffraction pattern was observed.

Chemical analysis of the powder J indicated Cs/W=0.36. The composition ratios of the other components are described in Table 2.
(Production and Evaluation of Near-Infrared Absorbing Particle Dispersion Liquid and Near-Infrared Absorbing Particle Dispersion Body)

A dispersion liquid J was obtained in the same manner as in Example 1 except that prepared powder J was used.

The average particle diameter of near-infrared absorbing particles in the dispersion liquid J was measured to be 31.6 nm by dynamic light scattering.

In the same manner as in Example 1 except that the dispersion liquid J was used, a coating film was formed on the PET film, and the ultraviolet curing resin was cured to prepare a near-infrared absorbing film J with a coating layer containing near-infrared absorbing particles. The coating layer is a near-infrared absorbing particle dispersion, body and the near-infrared absorbing film is one form of a near-infrared absorbing transparent base material.

From the spectral transmittance profiles of the obtained near-infrared absorbing film J, measured VLT=72.37% and ST21=50.79%, it was found that the film is transparent in visible light and has a strong near-infrared absorption effect. The color index of the near-infrared absorbing film J was L*=87.87, a*=−1.44, b*=11.06, indicating a very weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6×a*+8.0 in the L*=88 cross section, as illustrated in FIG. 7.

It is also found, as illustrated in FIG. 8, that T900 in the L*=88 cross section is 40.60% and satisfies T900≥10%, indicating the sensor wavelength transmission, and that the solar shielding property satisfies T900≥1.4×ST21−41.0 while satisfying ST21≤67%.

Example 11

(Production and Evaluation of Near-Infrared Absorbing Particles)

Powder J produced in Example 10 was spread on a carbon boat and heated to 800° C. under the flow of 100 volume % Ar gas. Then, the gas to be supplied was changed to 1 volume % $H_2$—Ar, and after holding at 800° C. for 10 minutes under the flow of the gas, the temperature was lowered to room temperature to obtain light blue powder K.

Figure 3:
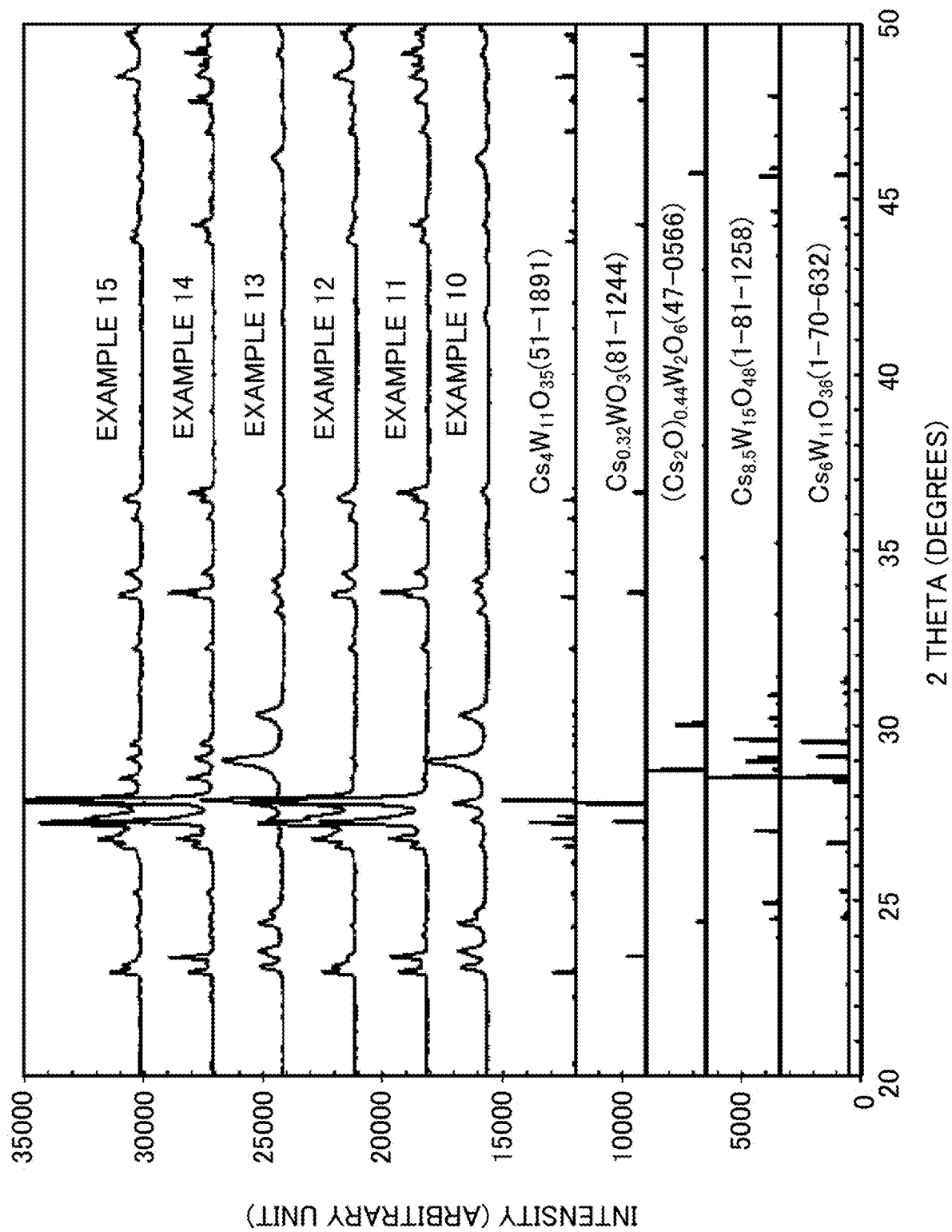
FIG. 3 is powder XRD diffraction patterns of near-infrared absorbing particles prepared in Examples 10 to 15.

The X-ray powder diffraction pattern of this powder exhibited a mixed pattern of the diffraction lines of hexagonal $CS_{0.32}WO_3$, orthorhombic $CS_4W_{11}O_{35}$, rhombohedral $Cs_6W_{11}O_{36}$ and $Cs_{8.5}W_{15}O_{48}$, as illustrated in FIG. 3. However, the diffraction line positions and intensities of $Cs_4W_{11}O_{35}$, $Cs_6W_{11}O_{36}$ and $Cs_{8.5}W_{15}O_{48}$ did not completely match the ICDD data.

When one particle of the powder was observed by transmission electron microscope from the (0001) direction, the positions of prismatic plane spots appearing in the electron diffraction image differed beyond the experimental error range in all three particles. Therefore, it was found that a rhombohedral crystal in which a hexagonal crystal was modulated by basal plane defects, is dominant.

Chemical analysis of the powder K indicated Cs/W=0.36. The composition ratios of the other components are described in Table 2.

(Production and Evaluation of Near-Infrared Absorbing Particle Dispersion Liquid and Near-Infrared Absorbing Particle Dispersion Body)

A dispersion liquid K was obtained in the same manner as in Example 1 except that the prepared powder K was used.

The average particle diameter of the near-infrared absorbing particles in the dispersion liquid K was measured to be 27.5 nm by dynamic light scattering.

In the same manner as in Example 1, except that the dispersion liquid K was used, a coating film was formed on the PET film and the ultraviolet curing resin was cured to prepare the near-infrared absorbing film K with a coating layer containing the near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film K obtained by U-4100 spectrophotometer manufactured by Hitachi High-Tech Co., Ltd. is illustrated in FIG. 6. According to the profile illustrated in FIG. 6, strong absorption in the near-infrared region with a transmittance bottom around 1650 nm and transmission in the visible light region of 380 nm or more and 780 nm or less were observed. The transmittance in the blue and red regions decreased and increased, respectively, compared with the near-infrared absorbing film iii in Comparative Example 3, and the color tone was improved to a neutral color. Moreover, the transmittance of near-infrared light near 900 nm significantly increased compared with the near-infrared absorbing film iii in Comparative Example 3, and it was observed that the sensor wavelength transmission was strong.

The visible light transmittance (VLT) and the solar transmittance (ST21) were measured as VLT=72.36% and ST21=44.01%, respectively, indicating that the material is transparent in visible light and has a strong near-infrared absorption effect.

The color indices of the near-infrared absorbing film K were L*=88.10, a*=−2.72, and b*=7.05, indicating a very weak blue color close to a neutral color, that is, a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6×a*+8.0 in the L*=88 cross section, as illustrated in FIG. 7.

It was also found, as illustrated in FIG. 8, that T900 in the L*=88 cross section is 27.21% and satisfies T900≥10%, indicating the sensor wavelength transmission, and that the solar shielding property sufficiently satisfies T900≥1.4× ST21−41.0 while satisfying ST21≤67%.

Example 12

(Production and Evaluation of Near-Infrared Absorbing Particles)

The powder J produced in Example 10 was laid on a carbon boat and held in a 1 volume % $H_2$—Ar stream at 500° C. for 30 minutes. Then, the gas to be supplied was changed to 100 volume % nitrogen gas, and after holding at 800° C. for 1 hour under the flow of the nitrogen gas, the temperature was lowered to room temperature to obtain light blue powder L.

The X-ray powder diffraction pattern of this powder exhibited a mixed pattern of the diffraction lines of hexagonal $Cs_{0.32}WO_3$, orthorhombic $Cs_4W_{11}O_{35}$, rhombohedral $Cs_6W_{11}O_{36}$ and $Cs_{8.5}W_{15}O_{48}$, as illustrated in FIG. 3. However, the diffraction line positions and intensities of $Cs_4W_{11}O_{35}$, $Cs_6W_{11}O_{36}$ and $Cs_{8.5}W_{15}O_{48}$ did not completely match the ICDD data.

When one particle of the powder was observed by transmission electron microscope from the (0001) direction, the positions of prismatic plane spots appearing in the electron diffraction image differed beyond the experimental error range in all three particles. Therefore, it was found that a rhombohedral crystal in which a hexagonal crystal was modulated by basal plane defects, is dominant.

Chemical analysis of the powder L indicated Cs/W=0.35. The composition ratios of the other components are described in Table 2.

(Production and Evaluation of Near-Infrared Absorbing Particle Dispersion Liquid and Near-Infrared Absorbing Particle Dispersion Body)

A dispersion liquid L was obtained in the same manner as in Example 1 except that the prepared powder L was used.

The average particle diameter of near-infrared absorbing particles in the dispersion liquid L was measured to be 28.6 nm by dynamic light scattering.

In the same manner as in Example 1 except that the dispersion liquid L was used, a coating film was formed on the PET film, and the ultraviolet curing resin was cured to prepare a near-infrared absorbing film L with a coating layer containing near-infrared absorbing particles. The coating layer is a near-infrared absorbing particle dispersion body, and the near-infrared absorbing film is one form of a near-infrared absorbing transparent base material.

The spectral transmittance of the obtained near-infrared absorbing film L was measured to be VLT=72.35% and ST21=60.85%, indicating that it is transparent in visible light and has a strong near-infrared absorption effect.

The color index of the near-infrared absorbing film L was L*=87.89, a*=−0.44, b*=9.26, indicating a very weak blue color close to a neutral color, that is, a neutral tone. These values were found to satisfy b*≥0 and b*≥1.6×a*+8.0 in the L*=88 cross section, as illustrated in FIG. 7.

It was also found that T900 in the L*=88 cross section is 64.02% and satisfies T900≥10%, indicating the sensor wavelength transmission, and that the solar shielding property sufficiently satisfies T900≥1.4×ST21−41.0 while satisfying ST21≤67%.

Example 13

A total of 20 g of cesium carbonate ($Cs_2CO_3$) and tungsten trioxide ($WO_3$) were weighed, mixed and kneaded to achieve a molar ratio of $Cs_2CO_3:WO_3$=1:5, and the obtained kneaded material was placed in a carbon boat and dried in air at 110° C. for 12 hours. Cesium tungsten oxide precursor powder, which is a raw material for compounds containing Cs and W, was thus obtained.

Then, the precursor powder was placed on an alumina boat in a heated muffle furnace, and the temperature was raised to 150° C. under the flow of 100 volume % nitrogen gas. The gas supplied was then changed to a gas of 50:1:49 volume ratio of superheated stream, hydrogen gas, and nitrogen gas, and heated to 550° C. and held for 1 hour under the flow of the mixture gas. This was allowed to cool to room temperature as it was, and a light blue powder M was obtained (the first heat treatment step).

The X-ray powder diffraction pattern of the powder M had a broad diffraction line similar to that of Example 10. That is, the pyrochlore phase $(Cs_2O)_{0.44}W_2O_6$ was the main phase with a slight mixture of the diffraction lines of hexagonal $Cs_{0.32}WO_3$ and orthorhombic $Cs_4W_{11}O_{35}$. However, the diffraction line positions and intensities of $(Cs_2O)_{0.44}W_2O_6$ and $CS_4W_{11}O_{35}$ did not completely match the ICDD data.

From transmission electron microscopy of the powder, a cubic electron diffraction pattern was observed.

Chemical analysis of the powder M indicated Cs/W=0.40. The composition ratios of the other components are described in Table 2.

(Production and Evaluation of Near-Infrared Absorbing Particle Dispersion Liquid and Near-Infrared Absorbing Particle Dispersion Body)

A dispersion liquid M was obtained in the same manner as in Example 1 except that the prepared powder M was used.

The average particle diameter of near-infrared absorbing particles in the dispersion liquid M was measured to be 32.3 nm by dynamic light scattering.

In the same manner as in Example 1 except that the dispersion liquid M was used, a coating film was formed on the PET film and the ultraviolet curing resin was cured to prepare a near-infrared absorbing film M with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film M obtained by U-4100 spectrophotometer manufactured by Hitachi High-Tech Co., Ltd. is illustrated in FIG. 6. According to the profile illustrated in FIG. 6, strong absorption in the near-infrared region with transmittance bottoms around 1470 nm and transmission in the visible light region of 380 nm or more and 780 nm or less were observed. Transmittance in the blue and red regions decreased and increased, respectively, compared with the near-infrared absorbing film iii in Comparative Example 3, and the color tone was improved to a neutral color. In addition, transmittance of near-infrared light near 900 nm significantly increased compared with the near-infrared absorbing film iii in Comparative Example 3, and it was observed that the sensor wavelength transmission was strong.

The visible light transmittance (VLT) and the solar transmittance (ST21) were measured as VLT=72.38% and ST21=50.81%, respectively, indicating that the film is transparent in visible light and has a strong near-infrared absorption effect.

The color indices of the near-infrared absorbing film M were L*=87.87, a*=−1.46, and b*=10.98, indicating a very weak blue color and a neutral tone. In the dilute dispersion film of the near-infrared absorbing particles at VLT=70 to 80%, which is the range used for automobile windshields, it can be said that the film has almost no blueness. These values satisfy b*≥0 and b*≥1.6×a*+8.0 in the L*=88 cross section, as illustrated in FIG. 7.

Also, as illustrated in FIG. 8, it was found that T900 in the L*=88 cross section is 40.43% and satisfies T900≥10%, indicating the sensor wavelength transmission, and that the solar shielding property sufficiently satisfies T900≥1.4× ST21−41.0 while satisfying ST21≤67%.

Example 14

(Production and Evaluation of Near-Infrared Absorbing Particles)

The powder M produced in Example 13 was spread on a carbon boat and heated to 800° C. under the flow of 100 volume % Ar gas. Then, the gas to be supplied was changed to 1 volume % $H_2$—Ar, and after holding at 800° C. for 10 minutes under the flow of the gas, the temperature was lowered to room temperature to obtain light blue powder N.

The X-ray powder diffraction pattern of this powder exhibited a mixed pattern of the diffraction lines of hexagonal $Cs_{0.32}WO_3$, orthorhombic $CS_4W_{11}O_{35}$, rhombohedral $Cs_6W_{11}O_{36}$ and $Cs_{8.5}W_{15}O_{48}$, as illustrated in FIG. 3. However, the diffraction line positions and intensities of $Cs_4W_{11}O_{35}$, $Cs_6W_{11}O_{36}$, and $CS_{8.5}W_{15}O_{48}$ did not completely match the ICDD data.

When one particle of the powder was observed by transmission electron microscope from the (0001) direction, the positions of prismatic plane spots appearing in the electron diffraction image differed beyond the experimental error range in all three particles. Therefore, it was found that a rhombohedral crystal in which a hexagonal crystal was modulated by basal plane defects, is dominant.

Chemical analysis of the powder N indicated Cs/W=0.42. The composition ratios of the other components are described in Table 2.

(Production and Evaluation of Near-Infrared Absorbing Particle Dispersion Liquid and Near-Infrared Absorbing Particle Dispersion Body)

The dispersion liquid N was obtained in the same manner as in Example 1 except that the prepared powder N was used.

The average particle diameter of near-infrared absorbing particles in the dispersion liquid N was measured to be 25.2 nm by dynamic light scattering.

In the same manner as in Example 1 except that the dispersion liquid N was used, a coating film was formed on the PET film and the ultraviolet curing resin was cured to prepare a near-infrared absorbing film N with a coating layer containing near-infrared absorbing particles. The coating layer is a near-infrared absorbing particle dispersion body, and the near-infrared absorbing film is one form of a near-infrared absorbing transparent base material.

The spectral transmittance profiles of the obtained near-infrared absorbing film N obtained by U-4100 spectrophotometer manufactured by Hitachi High-Tech Co., Ltd. is illustrated in FIG. 6. According to the profile illustrated in FIG. 6, strong absorption in the near-infrared region with a transmittance bottom around 1630 nm and transmission in the visible light region of 380 nm or more and 780 nm or less were observed. The transmittance in the blue and red regions decreased and increased, respectively, compared with the near-infrared absorbing film iii in Comparative Example 3, and the color tone was improved to a neutral color. Moreover, the transmittance of near-infrared light near 900 nm significantly increased compared with the near-infrared absorbing film iii in Comparative Example 3, and it was observed that the sensor wavelength transmission was strong.

The visible light transmittance (VLT) and the solar transmittance (ST21) were measured as VLT=72.32% and ST21=44.99%, respectively, illustrating that the film is transparent in visible light and has a strong near-infrared absorption effect.

The color index of the near-infrared absorbing film N was $L^*=88.01$, $a^*=-2.66$, and $b^*=7.17$, indicating a very weak blue color and a neutral tone. In the dilute dispersion film of the near-infrared absorbing particles at VLT=70 to 80%, which is the range used for automobile windshields, it can be said that the film is hardly bluish. These values satisfy $b^*\geq 0$ and $b^*\geq 1.6\times a^*+8.0$ in the $L^*=88$ cross section, as illustrated in FIG. 7.

It was also found, as illustrated in FIG. 8, that T900 in the $L^*=88$ cross section is 27.74% and satisfies T900≥10%, indicating the sensor wavelength transmission, and that the solar shielding property sufficiently satisfies T900≥1.4×ST21−41.0 while satisfying ST21 S 67%.

Example 15

(Production and Evaluation of Near-Infrared Absorbing Particles)

The powder M prepared in Example 13 was spread on a carbon boat and held in a 1 volume % $H_2$—Ar stream at 500° C. for 30 minutes. Then, the gas to be supplied was changed to 100 volume % Ar and held at 550° C. for 30 minutes under the flow of the gas, and the temperature was further raised and held at 800° C. for 1 hour, and then cooled to room temperature to obtain a light blue powder 0.

The X-ray powder diffraction pattern of this powder exhibited a mixed pattern of the diffraction lines of hexagonal $Cs_{0.32}WO_3$, orthorhombic $Cs_4W_{11}O_{35}$, rhombohedral $Cs_6W_{11}O_{36}$ and $Cs_{8.5}W_{15}O_{48}$, as illustrated in FIG. 3. However, the diffraction line positions and intensities of $Cs_4W_{11}O_{35}$, $Cs_6W_{11}O_{36}$, and $Cs_{8.5}W_{15}O_{48}$ did not completely match the ICDD data.

When one particle of the powder was observed by transmission electron microscope from the (0001) direction, the positions of prismatic plane spots appearing in the electron diffraction image differed beyond the experimental error range in all three particles. Therefore, it was found that a rhombohedral crystal in which a hexagonal crystal was modulated by basal plane defects, is dominant.

Chemical analysis of the powder O indicated Cs/W=0.42. The composition ratios of the other components are described in Table 2.

(Production and Evaluation of Near-Infrared Absorbing Particle Dispersion Liquid and Near-Infrared Absorbing Particle Dispersion Body)

A dispersion liquid O was obtained in the same manner as in Example 1 except that the prepared powder O was used.

The average particle diameter of the near-infrared absorbing particles in the dispersion liquid O was measured to be 29.9 nm by dynamic light scattering.

In the same manner as in Example 1, except that the dispersion liquid O was used, a coating film was formed on the PET film, the ultraviolet curing resin was cured, and the near-infrared absorbing film O with a coating layer containing the near-infrared absorbing particles was prepared. The coating layer is a near-infrared absorbing particle dispersion body, and the near-infrared absorbing film is one form of a near-infrared absorbing transparent base material.

As a result of measuring the spectral transmittance of the obtained near-infrared absorbing film O, VLT=72.35% and ST21=65.41% were obtained, illustrating that the film is transparent in visible light and has a near-infrared absorption effect.

The color index of the near-infrared absorbing film O was $L^*=87.91$, $a^*=-0.03$, and $b^*=8.21$, indicating a very weak blue color and a neutral tone similar to ITO. These values satisfy $b^*\geq 0$ and $b^*\geq 1.6\times a^*+8.0$ in the $L^*=88$ cross section, as illustrated in FIG. 7.

It is also found that T900 in the $L^*=88$ cross section is 70.15% and satisfies T900≥10%, indicating the sensor wavelength transmission, and that the solar shielding property sufficiently satisfies T900≥1.4×ST21−41.0 while satisfying ST21≤67%.

TABLE 1

| | TARGET COMPOSITION AT WEIGHING (MOLAR RATIO) | | | FIRST HEAT TREATMENT STEP | | SECOND HEAT TREATMENT STEP | | |
| --- | --- | --- | --- | --- | --- | --- | --- | --- |
| | | | | TEMPERATURE (° C.)/ | | TEMPERATURE (° C.)/ | | |
| | Cs | W | O | TIME (HR) | STREAM | TIME (MIN) | STREAM | POWDER |
| EXAMPLE 1 | 1 | 3 | 9 | 550/1 | 50% $N_2$-50% SUPERHEATED $H_2O$ | 550/60 | 1% $H_2$—Ar | A |
| EXAMPLE 2 | 1 | 3 | 9 | 550/1 | 1% $H_2$-49% $N_2$-50% SUPERHEATED $H_2O$ | NOT PERFORMED | NOT PERFORMED | B |
| EXAMPLE 3 | 1 | 3 | 9 | 550/1 | 1% $H_2$-49% $N_2$-50% SUPERHEATED $H_2O$ | 550/120 | 1% $H_2$—Ar | C |
| EXAMPLE 4 | 1 | 3 | 9 | 550/1 | 1% $H_2$-49% $N_2$-50% SUPERHEATED $H_2O$ | 800/60 | 100% Ar | D |
| EXAMPLE 5 | 1 | 3 | 9 | 550/1 | 1% $H_2$-49% $N_2$-50% SUPERHEATED $H_2O$ | 800/10 | 1% $H_2$—Ar | E |

TABLE 1-continued

| | TARGET COMPOSITION AT WEIGHING (MOLAR RATIO) | | | FIRST HEAT TREATMENT STEP | | SECOND HEAT TREATMENT STEP | | |
|---|---|---|---|---|---|---|---|---|
| | Cs | W | O | TEMPERATURE (° C.)/ TIME (HR) | STREAM | TEMPERATURE (° C.)/ TIME (MIN) | STREAM | POWDER |
| EXAMPLE 6 | 1 | 3 | 9 | 550/1 | 1% $H_2$-49% $N_2$-50% SUPERHEATED $H_2O$ | 800/10 | 1% $H_2$—Ar | F |
| EXAMPLE 7 | 1 | 3 | 9 | 550/1 | 1% $H_2$-49% $N_2$-50% SUPERHEATED $H_2O$ | 500/30 | 1% $H_2$—Ar | G |
| EXAMPLE 8 | 2 | 10 | 31 | 550/1 | 1% $H_2$-49% $N_2$-50% SUPERHEATED $H_2O$ | 800/10 | 1% $H_2$—Ar | H |
| EXAMPLE 9 | 6 | 10 | 33 | 550/1 | 1% $H_2$-49% $N_2$-50% SUPERHEATED $H_2O$ | 800/10 | 1% $H_2$—Ar | I |
| EXAMPLE 10 | 4 | 11 | 35 | 550/1 | 1% $H_2$-49% $N_2$-50% SUPERHEATED $H_2O$ | NOT PERFORMED | NOT PERFORMED | J |
| EXAMPLE 11 | 4 | 11 | 35 | 550/1 | 1% $H_2$-49% $N_2$-50% SUPERHEATED $H_2O$ | 800/10 | 1% $H_2$—Ar | K |
| EXAMPLE 12 | 4 | 11 | 35 | 550/1 | 1% $H_2$-49% $N_2$-50% SUPERHEATED $H_2O$ | 500/30 | 1% $H_2$—Ar | L |
| EXAMPLE 13 | 2 | 5 | 16 | 550/1 | 1% $H_2$-49% $N_2$-50% SUPERHEATED $H_2O$ | NOT PERFORMED | NOT PERFORMED | M |
| EXAMPLE 14 | 2 | 5 | 16 | 550/1 | 1% $H_2$-49% $N_2$-50% SUPERHEATED $H_2O$ | 800/10 | 1% $H_2$—Ar | N |
| EXAMPLE 15 | 2 | 5 | 16 | 550/1 | 1% $H_2$-49% $N_2$-50% SUPERHEATED $H_2O$ | 500/30 | 1% $H_2$—Ar | O |
| COMPARATIVE EXAMPLE 1 | 4 | 11 | 35 | 850/20/TWICE | ATMOSPHERIC AIR | NOT PERFORMED | NOT PERFORMED | i |
| COMPARATIVE EXAMPLE 2 | | | | | — | | | ii |
| COMPARATIVE EXAMPLE 3 | 1 | 3 | 9 | 550/2 | 1% $H_2$-99% $N_2$ | 800/60 | 100% $N_2$ | iii |
| COMPARATIVE EXAMPLE 4 | 1 | 3 | 9 | 550/2 | 1% $H_2$-99% $N_2$ | 800/60 | 100% $N_2$ | iv |
| COMPARATIVE EXAMPLE 5 | 1 | 3 | 9 | 550/2 | 1% $H_2$-99% $N_2$ | 800/60 | 100% $N_2$ | v |
| COMPARATIVE EXAMPLE 6 | 1 | 3 | 9 | 550/2 | 1% $H_2$-99% $N_2$ | 800/60 | 100% $N_2$ | vi |
| COMPARATIVE EXAMPLE 7 | 1 | 3 | 9 | 550/2 | 1% $H_2$-99% $N_2$ | 800/60 | 100% $N_2$ | vi |
| COMPARATIVE EXAMPLE 8 | 1 | 3 | 9 | 550/2 | 1% $H_2$-99% $N_2$ | 800/60 | 100% $N_2$ | viii |

TABLE 2

| | CHEMICAL ANALYSIS | | | | | AVERAGE PARTICLE DIAMETER (nm) | OPTICAL PROPERTIES OF NEAR-INFRARED ABSORBING PARTICLE DISPERSION BODY | | | | | |
|---|---|---|---|---|---|---|---|---|---|---|---|---|
| | Cs | W | O | Cs/W | CRYSTAL SYSTEM | | L* | a* | b* | VLT (%) | ST21 (%) | T900 (%) |
| EXAMPLE 1 | 7.8 | 23.8 | 68.4 | 0.33 | ORTHORHOMBIC CRYSTAL | 31.4 | 87.91 | −2.72 | 9.33 | 72.31 | 46.47 | 39.84 |
| EXAMPLE 2 | 8.2 | 25.9 | 65.9 | 0.32 | ORTHORHOMBIC CRYSTAL | 26.3 | 87.93 | −4.02 | 4.29 | 72.20 | 39.29 | 16.32 |
| EXAMPLE 3 | 8.1 | 25.8 | 66.1 | 0.31 | ORTHORHOMBIC CRYSTAL | 29.6 | 87.93 | −3.24 | 8.19 | 72.31 | 43.45 | 30.10 |
| EXAMPLE 4 | 8.2 | 24.6 | 67.2 | 0.33 | ORTHORHOMBIC CRYSTAL | 32.1 | 87.85 | −2.11 | 8.75 | 72.20 | 48.19 | 42.56 |
| EXAMPLE 5 | 7.7 | 24.4 | 68.0 | 0.32 | ORTHORHOMBIC CRYSTAL | 25.0 | 88.12 | −5.17 | 3.79 | 72.38 | 36.29 | 11.80 |
| EXAMPLE 6 | 7.7 | 24.4 | 68.0 | 0.32 | ORTHORHOMBIC CRYSTAL | 23.7 | 88.15 | −5.00 | 0.93 | 72.28 | 36.40 | 11.24 |
| EXAMPLE 7 | 7.6 | 24.2 | 68.3 | 0.31 | ORTHORHOMBIC CRYSTAL | 31.8 | 87.94 | −3.54 | 7.59 | 72.29 | 41.88 | 26.36 |
| EXAMPLE 8 | 4.8 | 24.3 | 70.9 | 0.20 | ORTHORHOMBIC CRYSTAL | 28.6 | 88.04 | −2.40 | 8.51 | 72.32 | 46.98 | 38.30 |
| EXAMPLE 9 | 13.9 | 23.6 | 62.5 | 0.59 | RHOMBOHEDRAL CRYSTAL | 30.4 | 87.97 | −3.70 | 6.61 | 72.27 | 43.25 | 28.51 |
| EXAMPLE 10 | 8.9 | 24.6 | 66.5 | 0.36 | CUBIC CRYSTAL | 31.6 | 87.87 | −1.44 | 11.06 | 72.37 | 50.79 | 40.60 |
| EXAMPLE 11 | 8.9 | 24.5 | 66.6 | 0.36 | RHOMBOHEDRAL CRYSTAL | 27.5 | 88.10 | −2.72 | 7.05 | 72.36 | 44.01 | 27.21 |

TABLE 2-continued

| | CHEMICAL ANALYSIS | | | | AVERAGE PARTICLE DIAMETER | OPTICAL PROPERTIES OF NEAR-INFRARED ABSORBING PARTICLE DISPERSION BODY | | | | | |
|---|---|---|---|---|---|---|---|---|---|---|---|
| | | | | | | | | | VLT | ST21 | T900 |
| | Cs | W | O | Cs/W | CRYSTAL SYSTEM | (nm) | L* | a* | b* | (%) | (%) | (%) |
| EXAMPLE 12 | 8.5 | 24.1 | 67.4 | 0.35 | RHOMBOHEDRAL CRYSTAL | 28.6 | 87.89 | −0.44 | 9.26 | 72.35 | 60.85 | 64.02 |
| EXAMPLE 13 | 9.7 | 24.4 | 65.9 | 0.40 | CUBIC CRYSTAL | 32.3 | 87.87 | −1.46 | 10.98 | 72.38 | 50.81 | 40.43 |
| EXAMPLE 14 | 10.4 | 24.7 | 64.9 | 0.42 | RHOMBOHEDRAL CRYSTAL | 25.2 | 88.01 | −2.66 | 7.17 | 72.32 | 44.99 | 27.74 |
| EXAMPLE 15 | 9.5 | 22.7 | 67.8 | 0.42 | RHOMBOHEDRAL CRYSTAL | 29.9 | 87.91 | −0.03 | 8.21 | 72.35 | 65.41 | 70.15 |
| COMPARATIVE EXAMPLE 1 | 8.0 | 22.2 | 69.8 | 0.36 | ORTHORHOMBIC CRYSTAL | 32.0 | 88.36 | 0.70 | 8.53 | 73.33 | 78.73 | 96.20 |
| COMPARATIVE EXAMPLE 2 | | — | | | CUBIC CRYSTAL | 30.2 | 87.78 | −2.04 | 13.68 | 72.33 | 45.94 | 46.39 |
| COMPARATIVE EXAMPLE 3 | 8.7 | 25.3 | 66.0 | 0.34 | HEXAGONAL CRYSTAL | 24.6 | 88.19 | −6.57 | −1.25 | 72.19 | 32.88 | 4.85 |
| COMPARATIVE EXAMPLE 4 | 8.7 | 25.3 | 66.0 | 0.34 | HEXAGONAL CRYSTAL | 24.6 | 92.94 | −4.06 | −0.78 | 82.65 | 45.20 | 17.13 |
| COMPARATIVE EXAMPLE 5 | 8.7 | 25.3 | 66.0 | 0.34 | HEXAGONAL CRYSTAL | 24.6 | 96.41 | −2.11 | −0.41 | 90.89 | 62.71 | 41.39 |
| COMPARATIVE EXAMPLE 6 | 8.7 | 25.3 | 66.0 | 0.34 | HEXAGONAL CRYSTAL | 24.6 | 71.76 | −13.83 | −2.50 | 42.90 | 15.74 | 0.04 |
| COMPARATIVE EXAMPLE 7 | 8.7 | 25.3 | 66.0 | 0.34 | HEXAGONAL CRYSTAL | 24.6 | 77.30 | −11.83 | −2.14 | 51.66 | 19.80 | 0.21 |
| COMPARATIVE EXAMPLE 8 | 8.7 | 25.3 | 66.0 | 0.34 | HEXAGONAL CRYSTAL | 24.6 | 83.24 | −8.99 | −1.68 | 62.28 | 25.62 | 1.21 |

The XRD powder patterns of the powders prepared in Examples 1 to 8 all exhibited a mixed phase pattern of hexagonal $Cs_{0.32}WO_3$ and orthorhombic $Cs_4W_{11}O_{35}$, but the intensity ratios and positions of the diffraction lines were shifted from the ICDD data, which may be due to the effect of the irregular insertion of planar defects into the prismatic plane. In the (0001) electron diffraction pattern, one of the prismatic plane spots exhibited an increase in the plane spacing, and the modulation of the crystal structure to orthorhombic crystal was observed. In the XRD powder pattern of the powders prepared in Examples 9 to 15, the mixture of hexagonal $Cs_{0.32}WO_3$ and rhombohedral $Cs_6W_{11}O_{36}$, $Cs_{8.5}W_{15}O_{48}$ or pyrochlore phase $(Cs_2O)_{0.44}W_2O_6$ was observed in all the samples, but the diffraction line positions and intensity distributions of the rhombohedral crystal and pyrochlore phases were shifted from the ICDD data. In the (0001) electron diffraction pattern, all three prismatic plane spots were accompanied by a change in plane spacing, and the modulation of the crystal structure to the rhombohedral phase was observed. In the powder whose pyrochlore phase pattern was identified by XRD, a cubic electron diffraction pattern was observed. That is, it was confirmed that the cesium tungstate contained in the powder prepared in Examples 1 to 15 had a pseudo hexagonal crystal structure.

As illustrated in the transmission profiles of FIGS. 5 and 6, in Examples 1 to 7, 11, 13, and 14, large near-infrared absorption occurs with absorption bottoms in the wavelength range of 1400 nm to 2000 nm. Also, in the visible wavelength, they are located between the profiles of the near-infrared absorbing film iii of Comparative Example 3, which exhibits strong blue, and the near-infrared absorbing film ii of Comparative Example 2, which is neutral, and have profiles that are weaker blue and stronger red than that of the near-infrared absorbing film iii, indicating an improvement in the neutral direction of the color tone.

In the a*-b* space in the L*=88 cross section of FIG. 7, the near-infrared absorbing films of Examples 1 to 15 are located between the plots of the near-infrared absorbing film ii of Comparative Example 2 and the near-infrared absorbing film iii of Comparative Example 3, and the neutralization of the color tone was observed.

Further, in terms of low solar transmittance and high sensor wavelength transmittance, as illustrated in FIG. 8 and Table 2, the near-infrared absorbing films of Examples 1 to 15, including the near-infrared absorbing film ii of Comparative Example 2, were in the desired range.

According to the result in FIG. 9A, it was observed that even when the near-infrared absorbing film G of Example 7 was placed in a constant temperature and humidity machine and kept for 15 days in an environment where the temperature was 85° C. and the relative humidity was 90%, the optical profile did not change. In contrast, it was observed that the near-infrared absorbing film iii of Comparative Example 3 changed.

The X-ray powder diffraction pattern of the powder G of Example 7, as illustrated in FIG. 2, has a broad diffraction line and exhibits a mixed pattern of the diffraction lines of hexagonal $Cs_{0.32}WO_3$ and orthorhombic $Cs_4W_{11}O_{35}$. Therefore, both the cavity and the window of the hexagonal tunnel, which is the main diffusion path of oxygen diffusion, are considered to be filled with Cs, O, OH, $OH_2$, and $OH_3$ so that the substitution reaction between Cs and water molecules, which is the cause of humidity degradation and water degradation of the hexagonal tungsten bronze, can be prevented.

In contrast, the powder iii in Comparative Example 3 was identified as $Cs_{0.32}WO_3$ single phase (ICDD 0-81-1244) as illustrated in FIG. 2, which is a hexagonal cesium tungsten oxide, and because the cavity and the window of the hexagonal tunnel were not sufficiently filled, it is considered that it was difficult to prevent the substitution reaction between Cs and water molecules as a result.

The present application claims priority to Japanese Patent Application No. 2020-173574, filed Oct. 14, 2020, with the Japanese Patent Office. The contents of which are incorporated herein by reference in their entirety.

DESCRIPTION OF THE REFERENCE NUMERAL

91 Coating
100 Near-infrared absorbing particle dispersion liquid
90, 101, 111 Near-infrared absorbing particles
102 Liquid medium
110 Near-infrared absorbing particle dispersion body
112 Solid medium
120 Near-infrared absorbing laminate
1211, 1212 Transparent base material
122 Near-infrared absorbing particle dispersion body
130 Near-infrared absorbing transparent base material
131 Transparent base material
131A One side
132 Near infrared absorbing layer

The invention claimed is:

1. Near-infrared absorbing particles comprising:
a cesium tungstate, wherein
the cesium tungstate has a pseudo hexagonal crystal structure in which a hexagonal crystal is modulated to one or more crystal structures selected from orthorhombic crystal, rhombohedral crystal, and cubic crystal, by regular or random insertion of Cs-rich planes into a prismatic plane or a basal plane of the hexagonal crystal,
an X-ray diffraction (XRD) powder pattern of the pseudo hexagonal crystal structure is shifted from a mixed pattern of hexagonal crystal structure and the one or more crystal structures selected from orthorhombic crystal, rhombohedral crystal, and cubic crystal, and
the cesium tungstate is represented by a general formula $Cs_xW_yO_z$, and has a composition within a region surrounded by four straight lines of $x=0.6y$, $z=2.5y$, $y=5x$, and $Cs_2O:WO_3=m:n$ (m and n are integers) in a ternary composition diagram with Cs, W, and O at each vertex.

2. The near-infrared absorbing particles according to claim 1, wherein the near-infrared absorbing particles include one or more additive components selected from O, OH, $OH_2$, and $OH_3$.

3. The near-infrared absorbing particles according to claim 2, wherein the one or more additive components are present in one or more positions selected from a hexagonal window, a hexagonal cavity, and a trigonal cavity, formed by a $WO_6$ octahedron of a crystal of the cesium tungstate.

4. The near-infrared absorbing particles according to claim 1, wherein a part of one or more elements selected from Cs and W that constitute a crystal of the cesium tungstate, is deficient, and x and y of the general formula $Cs_xW_yO_z$ satisfy a relationship of $0.2 \leq x/y \leq 0.6$.

5. The near-infrared absorbing particles according to claim 1, wherein a part of O of a $WO_6$ octahedron that constitutes a crystal of the cesium tungstate, is deficient.

6. The near-infrared absorbing particles according to claim 1, wherein a part of Cs is substituted by an additive element, the additive element being one or more elements selected from Na, Tl, In, Li, Be, Mg, Ca, Sr, Ba, Al, and Ga.

7. The near-infrared absorbing particles according to claim 1, wherein an average particle diameter of the near-infrared absorbing particles is 0.1 nm or more and 200 nm or less.

8. The near-infrared absorbing particles according to claim 1, wherein surfaces of the near-infrared absorbing particles are coated with a compound containing one or more atoms selected from Si, Ti, Zr, and Al.

9. A method for producing the near-infrared absorbing particles of claim 1, the method comprising:
heating a compound raw material containing Cs and W in an atmosphere containing water vapor or in an atmosphere containing water vapor and a reducing gas, at a temperature of 400° C. or more and 650° C. or less.

10. The method for producing near-infrared absorbing particles according to claim 9, wherein the method includes further heating the compound raw material at a temperature of 500° C. or more and 950° C. or less in an atmosphere containing the reducing gas.

11. A near-infrared absorbing particle dispersion body comprising: the near-infrared absorbing particles of claim 1 and a solid medium.

12. The near-infrared absorbing particle dispersion body according to claim 11, wherein the solid medium is a resin.

13. The near-infrared absorbing particle dispersion body according to claim 12, wherein the resin is selected from a resin group consisting of polyester resin, polycarbonate resin, acrylic resin, styrene resin, polyamide resin, polyethylene resin, vinyl chloride resin, olefin resin, epoxy resin, polyimide resin, fluorine resin, ethylene/vinyl acetate copolymer, polyvinyl acetal resin, and ultraviolet curing resin, or is a mixture of two or more resins selected from the resin group.

14. The near-infrared absorbing particle dispersion body according to claim 11, wherein the near-infrared absorbing particle dispersion body is provided in a form of a sheet, a board, or a film.

15. The near-infrared absorbing particle dispersion body according to claim 11, wherein, in an $L^*=88$ section of a Hunter color index, the near-infrared absorbing particle dispersion body has a solar transmittance of 67% or less and satisfies $b^* \geq 0$ and $b^* \geq 1.6 \times a^* + 8.0$.

16. The near-infrared absorbing particle dispersion body according to claim 11, wherein
in an $L^*=88$ section of a Hunter color index, the near-infrared absorbing particle dispersion body has a T900, which is a transmittance at a wavelength of 900 nm, of 10% or more, and an ST21(%), which is a solar transmittance, of 67% or less, and the T900 and the ST21 satisfy a following formula: $T900 \geq 1.4 \times ST21 - 41.0$.

17. A near-infrared absorbing laminate comprising: a laminated structure including the near-infrared absorbing particle dispersion body of claim 11 and a transparent base material.

18. A near-infrared absorbing transparent base material comprising:
a transparent base material; and
a near-infrared absorbing layer on at least one side of the transparent base material, wherein
the near-infrared absorbing layer is the near-infrared absorbing particle dispersion body of claim 11.

* * * * *